(12) United States Patent
Goulding

(10) Patent No.: US 8,630,763 B2
(45) Date of Patent: Jan. 14, 2014

(54) METHOD OF OPERATING AN IN-LINE LEGGED ROBOT VEHICLE

(71) Applicant: John R. Goulding, Tucson, AZ (US)

(72) Inventor: John R. Goulding, Tucson, AZ (US)

(*) Notice: Subject to any disclaimer, the term of this patent is extended or adjusted under 35 U.S.C. 154(b) by 0 days.

(21) Appl. No.: 13/874,848

(22) Filed: May 1, 2013

(65) Prior Publication Data

US 2013/0238183 A1  Sep. 12, 2013

Related U.S. Application Data

(63) Continuation of application No. 13/052,821, filed on Mar. 21, 2011, now Pat. No. 8,457,830.

(60) Provisional application No. 61/316,213, filed on Mar. 22, 2010.

(51) Int. Cl.
*G01C 22/00* (2006.01)

(52) U.S. Cl.
USPC ............... 701/26; 318/568.2; 318/568.11; 318/568.12; 700/245; 700/258

(58) Field of Classification Search
USPC ............ 318/568.2, 568.11, 568.12; 700/245, 700/258, 280; 701/26; 180/8.1, 8.6, 8.2, 180/8.3; 414/217, 730, 680; 320/107, 113, 320/115; 901/1; 74/490.05
See application file for complete search history.

(56) References Cited

U.S. PATENT DOCUMENTS

| | | | |
|---|---|---|---|
| 5,929,585 A | * | 7/1999 | Fujita .................... 318/568.2 |
| 8,041,456 B1 | * | 10/2011 | Blackwell et al. ............ 700/245 |
| 2005/0085948 A1 | * | 4/2005 | Herr et al. ..................... 700/258 |
| 2007/0059124 A1 | | 3/2007 | Eldershaw et al. |
| 2007/0173973 A1 | * | 7/2007 | Wagner ........................ 700/245 |

FOREIGN PATENT DOCUMENTS

EP  1864763 A1  12/2007

OTHER PUBLICATIONS

Notification of Transmittal of the International Search Report and the Written Opinion of the International Searching Authority for PCT Application No. PCT/US2011/029417, mailing date of Nov. 8, 2011, Korean Intellectual Property Office, Republic of Korea.

(Continued)

*Primary Examiner* — Behrang Badii
(74) *Attorney, Agent, or Firm* — Thomas E Lees, LLC

(57) ABSTRACT

A single track in-line legged vehicle is controlled to coordinate movement along a desired single-track trajectory by causing each in-line leg to selectively perform a stance-to-flight phase, a flight phase, a flight-to-stance phase, and a stance phase. During the stance-to-flight phase, reaction forces and torques between a foot and the ground are unloaded to lift the foot off the ground. During the flight phase, a foot moves in the same general direction and at a generally faster rate as a major direction of motion of the vehicle body. During the flight-to-stance phase, foot positioning is controlled to place a foot on the ground according to the desired single-track trajectory. During the stance phase, foot-to-ground interaction develops reaction forces and torques that are transferred from the foot through the corresponding in-line leg to propel, torque, and stabilize the body in the x, y, z, pitch, roll, and yaw axes.

26 Claims, 51 Drawing Sheets

(56) References Cited

OTHER PUBLICATIONS

International Preliminary Report on Patentability for PCT Application No. PCT/US2011/029417, dated Sep. 25, 2012, The International Bureau of WIPO, Geneva, Switzerland.

J. Heaston et al., "STriDER: Self-Excited Tripedal Dynamic Experimental Robot"; 2007 IEEE International Conference on Robotics and Automation, Roma, Italy, Apr. 10-14, 2007, pp. 2776-2777.

D. M. Lyons et al., "Rotational Legged Locomotion", 12th International Conference on Advanced Robotics, Seattle, USA, Jul. 17-20, 2005, pp. 223-228.

A. Madhani et al., "Motion Planning of Mobile Multi-Limb Robotic Systems Subject to Force and Friction Constraints", 1992 IEEE International Conference on Robotics and Automation, Nice, France, May 12-14, 1992, pp. 233-239.

\* cited by examiner

METHOD OF OPERATING AN IN-LINE LEGGED ROBOT VEHICLE

CROSS-REFERENCE TO RELATED APPLICATIONS

This application is a continuation of U.S. patent application Ser. No. 13/052,821, filed Mar. 21, 2011, entitled "IN-LINE LEGGED ROBOT VEHICLE AND METHOD FOR OPERATING", now allowed, which claims the benefit of U.S. Provisional Patent Application No. 61/316,213 filed on Mar. 22, 2010, the disclosures of which are fully incorporated herewith by reference.

FIELD OF THE INVENTION

The present invention relates to a legged mobile robot and, more particularly, to a legged mobile robot having a plurality of legs arranged in a narrow profile to walk and maneuver along paths by placing successive footfalls in a generally single-track or inline fashion. Furthermore, the invention relates to an automatic system for sensing and preventing turnover of single-track legged mobile robots while enabling normal riding techniques in all but out of control situations.

BACKGROUND OF THE INVENTION

Prior-art legged vehicles, especially those adapted for moving over rough or uneven terrain have been proposed. The terms vehicle, walking machine, and robot are to be construed broadly and includes any means of transportation, whether merely of itself or of objects other than itself. As early as 1898, H. G. Wells described a fictional 100 foot tall, three-legged walking machine in his science fiction novella entitled "War of the Worlds", and it was first drawn by Warwick Globe circa 1898. In the drawing, the three legs are symmetrically positioned in a triangular pattern to form a tripod stance. About that same time Muybridge used stop-motion photography to study legged locomotion in animals (Muybridge 1899) and later humans (Muybridge 1901). His work provided a method for structuring classical quadruped and biped walking gaits in biologically-inspired legged machines.

Further developments in legged locomotion occurred in the 1960's when research progressed from observation to modeling. It was believed that legged locomotion would increase the speed of vehicles traversing unimproved or rough terrain by a factor of 10×. That is, animals were observed traversing rough terrain at 35 mph while wheeled vehicles managed only 3-5 mph. Additionally, legged locomotion promised better isolation from terrain irregularities. Researchers have investigated four-bar linkages, cam linkages, pantograph mechanisms, and so on, and have built a walking machine with four rectangular frames, controlled by a set of double-rocker linkages, using non-circular gears to produce uniform walking velocity. Additionally, a hexapod and an eight-legged walking machine were developed for lunar rover application. Both walking machines were controlled using mechanical, cam-linkage mechanisms. These designs employed statically stable, symmetric walking gaits, and required moving pairs of opposing legs to keep the body in static equilibrium at all times. These gaits have also been modeled mathematically and diagrammatically, wherein fundamental terminology was defined, such as stance, swing, stride length, duty factor, phase, stability, and so on. For example, a leg is either on the ground, called the stance state or phase, or in the air, called the swing or flight state or phase, and a stride measures the distance the body moves in one stance-to-swing locomotion cycle. The aforementioned prior art vehicles are generally very large, bulky, and cumbersome, and such prior art legged vehicles generally move slower than comparable wheeled vehicles. This highly limits their usefulness.

Further developments in legged walking machines used a computer to control the motion of an eight degrees-of-freedom (DOF) quadruped. The quadruped had two degrees-of-freedom (DOF) for each leg, one DOF at the hip and one DOF at the knee, with independent electromechanical actuators at each leg joint. Using the computer to coordinate or orchestrate the leg joint movements, it demonstrated the classical quadruped walk and trot gaits. Also about that time, General Electric Corporation built a 3000 pound, hydraulically-actuated quadruped that had three DOF per leg, two DOF at the hip and one DOF at the knee. Their quadruped was controlled by a human operator, and it demonstrated that legged machines can move effectively on rough terrain and climb over obstacles, with a human providing control and sensing. Such efforts led to the development of various theories and algorithms for coordinating leg movements in bipeds, quadrupeds, hexapods, and other symmetric legged walking machines to walk over rough terrain, evaluate footholds, and walk outdoors on various types of terrain. In 1968, researchers at Ohio State University proved mathematically that there is an optimal gait for a quadruped that maximizes the longitudinal stability margin. They built a 300 pound hexapod that used force sensors, gyroscopes, proximity sensors, and a camera system to study control algorithms for legged walking machines. Finally, various experiments have been performed on quadruped robots to study walking gaits when one leg is inoperative. In such work, two legs are in-line and the third leg is offset with one of the in-line legs, as in a right-angle triangle orientation, and the two offset legs walk in a predominately bipedal gait with the single in-line leg implementing a hopping motion.

Further developments in legged machines were made to investigate unstable or dynamic legged machines by studying balance of one, two, and four-leg hopping machines. Legged vehicles with less than six legs generally require some degree of dynamic balance to stabilize the body against roll and pitch. The danger of overturning is increased when the legged vehicle is carrying at least one rider or passenger because the rider may make moves which can upset the control system, destroying the normal lateral balance of the legged vehicle and thus causing overturning of the legged vehicle. Prior art stabilization techniques, for example, involve the development of a factor of safety with regard to keeping the center of gravity within the center of pressure of the legs, using a large passive gyro and its precessional momentum to control body pitch and roll, or using retractable outrigger wheels to catch the fall. Such prior art are unsuitable both in terms of weight and use in rugged and uneven terrain. A one-legged hopping machine was investigated. The leg hopping machine was statically unstable and would fall down without constant placement-thrust movement of the foot to compensate for instability. The one-legged hopping machine was modeled as an inverted pendulum and decomposed control into three separate elements: 1) supporting the body by controlling the vertical hopping height, 2) positioning the feet in key locations on each step using symmetry principles to keep the robots balanced, and 3) controlling the body attitude by controlling hip torque during the stance phase such that the dynamic momentum state of the body is estimated ahead in time to calculate the future foot placement and thrust needed to develop complementary dynamic momentum and achieve a desired hopping height, running velocity, and body attitude. This seminal control system demonstrated dynamic re-stabilization against overturning when subject to unexpected forces that destroy the normal lateral balance of the vehicle, thus cause overturning, or when moving on unstable or slippery surfaces, the latter conditions causing foot slip to occur and thus cause overturning. The concept of a virtual leg was developed for modeling dynamic gaits, such as the trot and the pace gaits, whereby symmetric multi-leg machines are modeled as one-leg hopping machines. In other words, for dynamic gaits a biped is modeled as a one-leg machine that alternates the use of left and right legs for support, a quadruped is an extension of a biped when pairs of legs (diagonal pairs for the trot and lateral pairs for the pace) move together and can be modeled as a single virtual leg, and so on. However, this research did not include the bounding gait, where front and rear pairs of legs are moved together, in the same class as the aforementioned trot and pace gaits because it requires using a multi-segmented body to position the virtual foot under the center of mass to provide support, given a body length greater than the leg reach. About the same time, others realized a stable bounding gait for quadruped robots by controlling hip torque during the stance period using a quasi-static slip control algorithm. It was also shown that a simplified control rule stabilizes running without velocity and trunk angle feedback.

Further developments in legged machines have come about because of advances in high-accuracy, high-pressure servo hydraulics combined with real-time low-level control systems. Such legged actuator systems servo positions and forces at the actuated joints to regulate ground reaction forces, maintain support, position, and traction. For example, Boston Dynamics Company built and demonstrated the Big-Dog quadruped robot. The BigDog quadruped robot has multi jointed legs adapted for limited oscillatory movement and exhibits a variety of locomotion behaviors: stand up, squat down, walk with a crawling gait that lifts just one leg at a time, walk with a trotting gait that lifts diagonal legs in pairs, trot with a running gait that includes a flight phase, and bound in a special gallop gait. For example, BigDog walks with a dynamically balanced trot gait. It balances using an estimate of its lateral velocity and acceleration, determined from the sensed behavior of the legs during stance combined with the inertial sensors. A high-level control system coordinates behaviors of the legs to regulate the velocity, attitude, and altitude of the body during locomotion. For example, the BigDog control system coordinates the kinematic and ground reaction forces of the robot while responding to basic postural commands. Load is distributed over the stance legs to optimize the load-carrying ability. The vertical loading across limbs is kept as equal as possible while individual legs are encouraged to generate ground reactions towards the hips, thus lowering required joint torques and actuator efforts. A gait coordination algorithm, responsible for inter-leg communication, initiates leg stance transitions to produce a stable gait. A virtual leg model coordinates the legs. The control system adapts to terrain changes through terrain sensing and posture control.

Further developments in legged machines have been realized by improvements in low-power, high computational throughput, self-contained computer systems capable of receiving sensory input, calculating the system and leg kinematics, and controlling each leg joint. For example, a novel tripod robot was designed with omnidirectional legs and body such that the body rotates in the pitch and yaw axis allowing a leg to swing under the body to afford pairs of legs to contact the ground simultaneously. For example, a machine vision algorithm developed by this inventor uses visual data to find the gravity vector in man-made environments, a form of dead reckoning used for balance.

SUMMARY OF THE INVENTION

A vehicle with legs can go where wheeled or tracked vehicles cannot go. Legged vehicles have improved mobility over rugged terrain with unstable footholds, such as mountain slopes and piles of rubble. Legged vehicles choose discrete, optimal foot placement and vary the length of the leg with respect to the body. Additionally, legged vehicles can bound, leap, or jump over areas of ground that do not have a continuous path of support or closely spaced footholds. Moreover, legged vehicles are able to move in man-made or cultural environments, traversing obstacles such as curbs, stairs, and narrow passageways. With respect to wheeled vehicles, legged vehicles reduce body motion. This characteristic is especially well suited to the comfort of a rider or passenger.

The term robot is to be construed broadly and includes any means of vehicular transportation, whether merely of itself or of objects other than itself, relating to a device and method that works autonomously or semi-autonomously whereas the term machine or vehicle, as in the motorcycle or bicycle, relates to an operated device. The robot/vehicle of the present invention takes people places they normally cannot go. It is designed with a narrow profile to walk and maneuver along narrow trails and paths, such as for example horse trails found in parks and wilderness areas. Hopping, bounding, leaping, and jumping enable it to traverse terrain that is too difficult for comparable wheeled machines. Because it has legs like a horse, it does not damage the environment like bicycles, motorcycles, and 4×4 vehicles do. It brings back the thrill of trail riding to improve human health and emotional development. It may also be used as a "pack mule" to carry heavy loads and accompany hikers.

Compared to a quadruped or four-legged mobile robot, the present invention uses 3/4 fewer parts, and would thus have higher reliability and cost less to manufacture. Like the quadruped, the single track design is a statically stable design, because the legs can be positioned in a tripod stance. Unlike biped or two-legged mobile robots that must simultaneously maintain balance in both the pitch and roll directions, the robot's/vehicle's balance is controlled in the roll direction. Further, a three-legged design enables the present invention to maintain (or regain) stability of balance at rest and during locomotion, by repeating intervals of dynamic momentum followed by the stable tripod stance. The present invention has the following key features, functions, and benefits:

- Bounding, leaping, or jumping over areas of ground that do not have a continuous path of support or closely spaced footholds
- Carries rider, passenger, and/or cargo
- High-speed legged locomotion—Unlike biped and quadruped designs, the tri-leg gate repeats intervals of the tripod stance for stability of balance
- High-speed turns—Like two-wheeled motorcycles, the legged mobile robot executes a single-track turn by leaning the body into the turn to develop a torque about the roll axis to counteract the outward centripetal force
- Improved ride quality—Single track legs reduce body motion compared to biped and quadruped designs and wheels in rough terrain; this characteristic is especially well suited to the comfort of a rider, passenger, and/or fragile cargo Light weight, have fewer mechanical components, increased reliability, high energy efficiency, and fast acceleration compared to quadruped robots Low environmental impact—The feet of legged mobile robots are stationary with respect to footholds during the support period Multiple terrain capability—Interchangeable feet for different conditions, e.g., paved roads, snow (skis), beaches (sand), etc.

Operator interface—Communicates status through an operator interface

Robotic control system—Relies on riders for high-level control and stability, but also allows semi-autonomous behavior, such as self-guided, GPS-based tours Self-recovery from slips and falls—Able to place a leg in the direction of fall to regain support during operation/motion Stable stance—Unlike two-wheeled motorcycles, three legs may be positioned in a tripod stance to enable the legged robot to achieve stability of balance without motion Traverses man-made obstacles such as curbs, stairs, and narrow passageways—legged vehicles chooses optimal foot placement by varying the length of the leg.

Like wheeled motorcycles and bicycles, the legged mobile robot of the present invention executes a single-track turn by leaning the body into the turn, thus developing a torque about the roll axis to counteract the outward centripetal force. The single track or in-line legged mobile robot is inherently stable along the length of the body or major axis of motion. The control strategy decouples the leg positioning along the length of the body or major axis of motion and the leg positioning along the width of the body or normal to major axis of motion. That is, legged vehicles heretofore must simultaneously maintain stability of balance in the pitch and roll direction. The single track or in-line legged mobile robot controls stability of balance in the roll direction and (for the most part) not in the pitch direction. Like a quadruped, yaw is controlled by developing torque about any two legs during the stance phase. This device and method drastically simplifies control for many single track or in-line legged gates and modes of operation. Furthermore, the control system senses and prevents turnover of single track legged mobile robots while enabling normal riding techniques in all but out of control situations.

It has not heretofore been possible to realize a multi-legged vehicle, i.e. robot or machine, having a plurality of legs arranged in a minimally narrow profile to place successive footfalls in a predominately single-track or in-line fashion, similar in form and function to motorcycles and bicycles. In off-road environments, such as parks and wilderness areas, single track vehicles, such as motorcycles and bicycles, exhibit superior maneuverability and deployment performance in comparison to double track vehicles, such as automobiles and tanks Moreover, single track vehicles are typically lighter in weight, have fewer mechanical components, increased reliability, higher energy efficiency, and faster acceleration and deceleration. Further while the aforementioned prior art legged vehicles provide means for implementing various static and dynamic walking gaits, they do not disclose a device or method for single track or in-line multi-legged static and dynamic gaits.

According to the present invention, there is provided a single track or in-line multi-legged mobile robot which achieves the desired form and function of the motorcycle or bicycle but with the added benefit of legs and full or partial robotic control. The term robot relates to a device and method that works autonomously or semi-autonomously whereas the term machine or vehicle, as in the motorcycle or bicycle, relates to an operated device.

Briefly, a single track or in-line multi-legged mobile robot may be constructed in accordance with the teachings of the present invention comprises a device and method:

a body and three legs mounted on the body in-line with the length of the body;

at least three legs comprising a minimally narrow profile so that as a vehicle it can maneuver where prior art vehicles previously could not go, such as walking along a narrow trail or path or through a door;

each leg is connected to a single or multi-segmented body that is generally longer than it is wider;

the body length establishes the major direction of motion, such as forward and backward motion;

each of the at least three legs are spatially arranged at the hip to be generally in-line with the major direction of motion;

each of the at least three legs has at least three degrees of freedom (DOF), such as pitch and roll at the hip and extension and retraction of the foot, to position the foot anywhere within a three dimensional volume;

the at least three legs combine to form three spatial volumes for foot placement that is spatially arranged to be generally in-line with the major direction of motion;

the at least three spatial volumes overlap along the major direction of motion;

the at least three legs have sufficient reach in length, width, and height to afford the three feet to be spatially positioned 1) in a triangular (tripedal) pattern to keep the body in static equilibrium at rest, 2) in any manner of patterns to provide locomotion and dynamic attitude stabilization, and 3) for omnidirectional motion.

A control system is used to coordinate and control the legged vehicle/robot, and may includes one or more central processing units (CPU) and one or more memory components. The memory components may include one or more memory modules, such as Random Access Memory (RAM) modules, Read Only Memory (ROM) modules, Dynamic Random Access Memory (DRAM) modules, and any other suitable memory modules. The control system may also include a plurality of input/output (I/O) components that may include a variety of known I/O devices, including network connections, video and graphics cards, disk drives or other computer-readable media drives, displays, or any other suitable I/O modules. One or more data busses may operatively couple the CPU, the memory component, and the I/O component. The control system may be operatively coupled to a control component having a data display/monitor and a command/control input device (e.g. a keyboard, an audio-visual input device, handlebars, foot pegs, pressure pads, etc . . . ).

In one aspect, a machine-readable medium may be used to store a set of machine-readable instructions (e.g. a computer program or software product) into the data acquisition and control system 120, wherein the machine-readable instructions embody a method of performing one or more gaits with a legged robot/vehicle/machine in accordance with the present invention. The machine-readable medium may be any type of medium which can store data that is readable by the control system, including, for example, a floppy disk, CD ROM, optical storage disk, magnetic tape, flash memory card, digital video disk, RAM, ROM, or any other suitable storage medium. The machine-readable medium, or the instructions stored thereon, may be temporarily or permanently installed in any desired component of the control system, including, for example, the I/O component, the memory component, and in one or more other portions of the control system and the control component. Alternately, the machine-readable instructions may be implemented directly into one or more components of the control system and the control component, without the assistance of the machine-readable medium.

In accordance with a first major embodiment of the invention, a legged vehicle includes a frame, wherein the frame includes a major axis corresponding to and generally parallel to a forward/backward direction of travel; a plurality of jointed leg mechanisms attached to the frame, one behind the other, wherein each leg is attached at its proximal end at one or more discrete attachment points, wherein the attachment points are arranged substantially parallel to the major axis of the frame and the forward/backward direction of travel, each of the legs including actuators attached between the legs and the frame and between adjacent leg members, said legs being actuated for movement of a distal end in three dimensions; a control system in communication with the leg mechanisms and receiving sensed data to determine possible future states of the legged vehicle and to coordinate movements of the leg mechanisms and frame, and movement of the legged vehicle in three dimensions over the ground; and a power source connected to and driving the control system components and the plurality of actuators which drive the legs, wherein forward/backward movement of the legged vehicle is according to approximately single track foot placement. The term 'single track' shall be interpreted as referring to the general narrowness of the foot-placement patterns along a straight or curved path.

Such an arrangement, wherein the legs are attached to the frame one-behind-the other (in-line), provides numerous advantages in mobility, including the ability to travel through narrow passages, such as doorways, and along narrow paths, such as single-track trails, where traditional vehicles would be unable to go.

According to a first aspect of the invention, the legged vehicle includes three legs. Three in-line legs provide an advantage of inherent stability along the pitch axis, which is generally parallel with the major axis of the body and major direction of travel. This means that most of the stability process can be directed to a roll axis (side-to-side) and perpendicular to the pitch axis.

According to a further aspect of the invention, the legged vehicle includes more than three legs. This arrangement provides greater stability in the pitch axis, and provides multiple options for possible footholds while in motion, and also provides options for not placing a foot down over unstable terrain, and instead relying on dynamic stability and the remaining legs to traverse the terrain.

According to a further aspect of the invention, each of the plurality of legs includes a foot at the distal end. Each of the feet of the legged vehicle may include at least one of, or one or more of, plates, skids, spikes, wheels, skates, skies, slides, floats, hydroplanes, and fingers. Different combinations of the different foot-types may be used to accommodate different types of terrain. Accordingly, different gaits may be used according to the combination of foot-type and terrain. This brings tremendous flexibility to the vehicle.

According to a further aspect of the invention, the legged vehicle includes a single-piece frame. This simplifies the gaits and any necessary programming to traversing terrain.

According to a further aspect of the invention, the legged vehicle includes a frame which is jointed and includes two or more segments, each segment having a major axis corresponding to and generally parallel to a forward/backward direction of travel. The articulated frame provides an advantage in flexibility, which extends the ranges of motion of each of the legs, particularly the front-most and rear-most legs. With proper coordination, a much faster, more natural gait can be used to quickly traverse even the most challenging terrain.

According to a further aspect of the invention, control of movement of the frame and leg-positioning along the major axis corresponding to the pitch axis is decoupled from the movement of the frame and leg-positioning normal to the major axis and corresponding to the roll axis. In this manner, the legged vehicle is operated much like a motorcycle wherein the pitch axis is responsive to the terrain and the roll axis is responsive to the rider and/or control system.

According to a further aspect of the invention, at least one accelerometer and at least one gyroscope mounted on the frame and in communication with the control system, the control system receiving sensed data from the at least one accelerometer and at least one gyroscope to sense velocity, acceleration, attitude, and gravitational forces. In a preferred embodiment the at least one accelerometer and the at least one gyroscope are mounted on the frame and sensing velocity, acceleration, attitude, and gravitational forces normal to the length of the body and the major axis and sense the roll condition. Additional sensing including the pitch, yaw, x, y, and z axes may be required for omni-directional guidance, navigation and control.

According to a further aspect of the invention, the control system of the legged vehicle further includes at least one accelerometer and at least one gyroscope mounted on the frame and in communication with the control system and sensing velocity, acceleration, orientation, and gravitational forces, the control system receiving sensed data from the at least one accelerometer and the at least one gyroscope, wherein the sensed pitch angle velocity, acceleration, and orientation from the accelerometer and gyroscope which are along the length of the body and corresponding generally to the major axis is decoupled from the sensed roll angle velocity, acceleration, and orientation which are normal to the length of the body and the major axis and generally parallel to the ground when the legged vehicle is in an upright position.

The decoupling of these aspects of the control system, significantly reduces the computing and processing capacity necessary about the pitch axis, and permits greater flexibility of the legged vehicle's movements.

According to a further aspect of the invention, each leg mechanism includes position-measuring components providing feedback to the control system. These position-measuring components provide information regarding relative or absolute leg position to the control system. Such information provides the advantage of more-accurate leg-movement corrections based upon a comparison, within the control system, of commanded or desired leg placement in comparison to actual leg placement.

According to a further aspect of the invention, each leg mechanism includes force-measuring components providing feedback to the control system. These components provide numerous advantages, including accurate determination of the loaded weight of the vehicle, accurate determination of the leg energy required, via one or more actuators, to perform a desired maneuver, such as straight-line walking, and accurate measurements of forces experienced at each leg and through the frame. This permits the control system to compensate according to the desires trajectory.

According to a further aspect of the invention, each leg mechanism includes torque-measuring components providing feedback to the control system. These components provide numerous advantages, including accurate determination of the loaded weight of the vehicle, accurate determination of the leg energy required, via one or more actuators, to perform a desired maneuver, such as straight-line walking, and accurate measurements of torques experienced at each leg and through the frame. This permits the control system to compensate according to the desired trajectory.

According to a further aspect of the invention, legged movement of the vehicle is according to a gait model, wherein at least one gait model is stored in the read-only memory of the control unit. Such an embodiment, for example, may also include neural networks and the like where one or more gait models are implicitly stored in the structure of the neural network. For example, gait models may include periodic gaits, such as the wave gait, the equal phase gait, the backward wave gait, the backward equal phase gait, the dexterous periodic gate, the continuous follow-the-leader gait, and the shuffle gait, and non-periodic gaits, such as the discontinuous follow-the-leader gait, the large obstacle gait, the precision footing gait, the free gait, the vertical step crossing gait, the climbing gait (an example of which is illustrated in FIGS. 9-28), the shuffle gait, and the isolated wall crossing gait, to name but a few.

According to another aspect of the invention, the control system further comprises an omni-directional guidance, navigation, and control algorithm.

According to a further aspect of the invention, the forward velocity and body height parameters are adapted for the at least one gait model using sensed or a priori ground terrain data.

According to a further aspect of the invention, the movement range for each of the legs defines a working envelope, each of the feet having sufficient reach and movement range in length, width and height, relative to the frame, (1) to position two feet perpendicular to the major axis of the frame, with one foot positioned to the left of and one to the right of the projected center of gravity of the frame to form a generally bipedal stance along the major axis of the frame to provide a degree of stability in the roll axis, and (2) in addition to the placement of the first two feet, to displace a third foot into a position parallel to the major axis of the frame, either to the front or the rear with respect to the other feet, to form a generally tripedal stance about the projected center of gravity (center of pressure) of the frame to provide a period of stability in both the pitch and roll axes.

According to a further aspect of the invention, the movement range for each of the legs provides range-of-motion overlap in length, width and height of the working envelopes of each adjacent foot, including any foot in front of and behind each foot. This provides a tremendous amount of flexibility in achieving temporary stability while in motion and when utilizing dynamic stability, and permits a great range of possible leg positions which are necessary when traversing difficult terrain.

According to a further aspect of the invention, the feet of two adjacent legs, one in front of and one behind the other, are positionable side-by-side on a center of pressure line generally perpendicular to the frame and perpendicular to the major axis of motion to achieve a bipedal stance. This ability permits the frame to be positioned so as to bring a zero-moment line of the legged vehicle in coincidence with the center of pressure line, which allows the other legs of the legged vehicle to be raised off the ground, at least temporarily.

According to a further aspect of the invention, the control unit has or is in communication with an operator interface, which is in communication with the control system, the control system receiving sensed data from the operator. This arrangement allows the advantage of remotely-directed control of the legged vehicle, and allows a rider/operator to control the legged vehicle.

According to another aspect of the invention, the operator interface components provide at least steering angle, throttle and braking inputs into the control system. In this fashion, the legged vehicle is controlled by an operator in a manner similar to that of controlling a motorcycle, but with the benefit of discrete foot placement.

According to a further aspect of the invention, inputs to the operator interface control stability of balance in the roll axis. In other words, the operator's vestibular system may provide the function of the accelerometer and gyroscope to sense the roll condition and control the roll of the legged vehicle through the control system and its foot placement, thusly.

According to another embodiment of the invention, a method of operating a legged vehicle including a frame, wherein the frame includes a major axis corresponding to and generally parallel to a forward/backward direction of travel; a plurality of jointed leg mechanisms attached to the frame, one behind the other, wherein each leg is attached at its proximal end at one or more discrete attachment points, wherein the attachment points are arranged substantially parallel to the major axis of the frame and the forward/backward direction of travel, each of the legs including actuators attached between the legs and the frame and between adjacent leg members, said legs being actuated for movement of a distal end in three dimensions; a control system in communication with the leg mechanisms and receiving sensed data to determine possible future states of the legged vehicle and to coordinate movements of the leg mechanisms and frame, and movement of the legged vehicle in three dimensions over the ground; and a power source connected to and driving the control system components and the plurality of actuators which drive the legs, wherein forward/backward movement of the legged vehicle is according to approximately single track foot placement, the method comprising the steps of:

developing reaction forces, torques, and thrusts in a stance phase wherein leg/foot-to-ground interaction is transferred through the leg to stabilize the frame in the pitch, roll, and yaw axes and to propel the frame in the x, y, and z axes, respectively, the foot/distal end of the leg being generally stationary with respect to the ground during the stance phase and moving generally opposite to the major direction of frame motion, of a monopedal stance, a bipedal stance and a tripedal stance, according to the control system;

unloading reaction forces through the leg/foot in a stance-to-flight phase wherein the foot is lifted off the ground, controlling leg velocities, according to the control system;

repositioning the leg/foot in a flight phase wherein the distal end of the leg/foot is moved generally in the same direction as the frame and generally at a faster rate, relative to the ground, as the major direction of frame motion, controlling foot placement and leg movement to maintain an upright posture and meet foot placement constraints and desired trajectory requirements for the frame and legged vehicle, according to the control system; and placing the leg/foot to the ground and developing reaction forces, torques, and thrusts in a flight-to-stance phase;

wherein movement of each leg includes each of the four phases for each leg.

According to a further aspect of the invention, the method of operating the legged vehicle further comprises:

during the flight phase for at least one leg, controlling leg movement, torque, extension velocity and retraction to use the mass of the at least one leg to impart forces and torques to the frame in at least one dimension or axis.

According to a further aspect of the invention, the method of operating the legged vehicle further comprising the steps of:

decoupling leg-positioning along the length of the frame, corresponding to the major axis, from the leg-positioning along the width of the frame and normal to the major axis and parallel to the ground;

controlling stability of balance over time in the roll direction primarily, wherein the plurality of leg mechanisms attached to the frame, one behind the other, along the major axis reduce the need for pitch control.

According to another aspect of the invention, the method of operating the legged vehicle further includes leaning the vehicle into a desired direction of turn, wherein a projected center of gravity is laterally displaced inwardly from a point within a triangle defined by foot contact with the ground, wherein a torque is developed around the roll axis in the direction of the lean; and displacing one or more feet normal to and spatially distant from the projected center of gravity in the opposite direction of the lean to develop an outward torque about the roll axis to counteract the inward lean, wherein the trajectory becomes a curved line.

According to a further aspect of the invention, the method of operating the legged vehicle further includes developing torque from at least one leg or a combination of two or more legs to rotate the frame along a curved trajectory. This aspect is important for understanding the "lean into the turn maneuver" and may precede the turn, occur continuously or discretely during the turn, and/or provides a means for exiting the turn to pursue a different trajectory.

According to a further aspect of the invention, the method of operating the legged vehicle further includes sensing with at least one of a gyroscope and accelerometer an induced roll condition from an external force; and leaning the vehicle into the direction from which the external force is applied, wherein the roll condition is neutralized, according to the control system. Examples of external forces include, but are not limited to wind forces, impulse forces, centripetal forces, and gravitational forces (due to loss of traction causing the frame to fall over). Leaning the vehicle may be accomplished in one of several ways including but not limited to developing a foot-to-ground reaction torque about the ankle and/or placing one or more feet in the same direction as the applied external force, beyond the projected center of gravity plus a distance equal to or greater than is required to counter the estimated dynamic momentum at the time the foot is repositioned. Furthermore, the external force may be desired, to initiate a lean into a turn maneuver, for example, but ultimately the roll condition must be neutralized to maintain an upright vehicle posture.

According to a further aspect of the invention, the method of operating the legged vehicle further comprises:

leaning into a turn by balancing the centripetal forces of the frame, as exemplified through the displacement of the center of pressure from foot placement with an acceleration force of the legs. The method of turning the legged vehicle may include the steps of: leaning the vehicle into a desired direction of turn, wherein a projected center of gravity is laterally displaced inwardly from a point within a triangle defined by foot contact with the ground, wherein a torque is developed around the roll axis in the direction of the lean; and displacing one or more feet normal to and spatially distant from the projected center of gravity in the opposite direction of the lean to develop an outward torque about the roll axis to counteract the inward lean, wherein the trajectory becomes a curved line.

The outward and inward torques may be adjusted as necessary to conform to a desired radius of turn. Of course by leaning into the turn, an inward torque, toward the radius of the turn, is created by gravity due to the unstable positioning of the projected center of pressure. It is necessary to create a sufficient outward (centripetal) force from several leg movements to balance the inward force. The legs movements move the legged vehicle along the desired curved line, or around the desired radius of turn. The turn may be stopped or changed as desired through leg movements arranged to adjust the position of the projected center of pressure.

This arrangement provides a distinct advantage in that the legged vehicle may be ridden like a bicycle or motorcycle, and combining the narrow profile of a two-wheeled vehicle with the sure-footed flexibility of a legged vehicle.

According to a further aspect of the invention, the control system includes a predictive control system, wherein the predictive control system performs the steps of:

measuring forward body speed, body height, and ground contact duration for each foot;

adjusting the forward body speed, body height, and ground contact duration for each foot to achieve a set of expected values according to the desired trajectory;

continually determining deviations from the expected values;

compensating for the deviations to achieve active balance of the legged vehicle.

According to a further aspect of the invention, the states of the legged vehicle include a stance phase, a flight phase, a flight-to-stance phase, and a stance-to-flight phase for each leg. Additional states regarding the position of the frame, legs and movements and accelerations of portions of the legged vehicle may also be monitored via various sensors described herein. Accurate information regarding the positions and movement of each component of the legged vehicle permits accurate control of the individual components and the successful guidance of the legged vehicle along a desired trajectory.

According to a further aspect of the invention, the leg mechanisms, such as the actuators, are controlled by the control system to selectively induce roll, pitch and/or yaw torques between each foot and the ground.

According to a further aspect of the invention, the shape of each foot is curved normal to the major axis of travel, and having a radius of curvature between an ankle joint and a hip joint, to improve surface contact of the foot with the ground while the vehicle is leaning about a roll axis along the major axis of travel. This provides a more-predictable and stable foot-to-ground interface arrangement, which encourages more positive and predictable movement of the legged vehicle over the ground.

According to a further aspect of the invention, a bottom surface of the feet include an elastic gripping material to conform to irregular terrain and provide traction.

According to a further aspect of the invention, the body is jointed and includes two or more segments being joined by a plurality of actuators, position-sensors and elastic components. Such an arrangement provides superior flexibility and adaptability to a wide range of terrains, and enables the legged vehicle to traverse a wide range of terrains quickly.

According to a further aspect of the invention, each leg mechanism includes one or more of solid/liquid phase-measurement, temperature-measurement and texture-sensing components providing feedback to the control system. This knowledge of the various attributes of the environment the legged vehicle is traveling in permits the control system to apply a most appropriate gait for the conditions, which increases safety and efficiency.

According to a further aspect of the invention, at least one leg of the legged vehicle includes at least three degrees of freedom (DOF).

According to a further aspect of the invention, the three degrees of freedom may be defined by pitch and roll movement at a hip joint and may include extension and retraction of the leg by knee and ankle joints which define a spatial volume for possible leg placement.

According to a further aspect of the invention, the movement range for each of the legs defines a working envelope, each of the feet having sufficient reach and movement range in length, width and height, relative to the body, to be placed in a plurality of predetermined locomotion and dynamic attitude stabilization patterns.

According to a further aspect of the invention, the movement range for each of the legs defines a working envelope, each of the feet having sufficient reach and movement range in length, width and height, relative to the body, to be placed in at least one omni-directional locomotion pattern. Motion along the major axis of the frame, is only one of the possible directions of travel. The movement ranges for the legs, and the actuator/control system interface permit the legged vehicle to move in any direction along the ground. Motion normal to the major axis may be in a side-step pattern, which will be described below.

According to a further aspect of the invention, the body includes two or more segments and is jointed in at least one axis between adjacent legs such that the feet have sufficient range of movement in length, width and height to provide overlap of the working envelopes of at least two legs at any one time. This arrangement provides flexibility to place the legged vehicle into a stable bipedal or tripedal state whenever desirable.

According to a further aspect of the invention, the body is jointed in at least one axis between adjacent legs wherein the body is conformably flexible to the curvature of a single track turn maneuver. This arrangement provides a minimally narrow profile relative to the major axis of motion whereby the legged vehicle can engage in proper single-track operations, such as along a narrow trail or through a doorway.

According to a further aspect of the invention, the body is jointed in at least one axis between adjacent legs wherein the body is conformably flexible to ground undulations and uneven ground. This arrangement provides a minimally narrow profile relative to the major axis of motion wherein the legged vehicle can be engaged in proper single-track activities, such as walking along a narrow trail and walking through a doorway.

According to a further aspect of the invention, the body includes elastic energy storage and release components between body segments, wherein the elastic components operate in at least one axis, wherein the elastic components store and release kinetic energy for transfer between adjacent body segments and adjacent legs. The elastic members may be used to accept and release energy in a predictable manner. This energy may be used by the control system to supplement the leg and/or body actuators in placing legs/feet at desired footholds rapidly and accurately.

According to a further aspect of the invention, the control system further comprises an omni-directional guidance, navigation, and control algorithm. The legged vehicle is not confined to motion in a single direction. The control system may include a number of omni-directional gaits to facilitate quick and coordinated legged movement in any desired direction over the ground.

According to a further aspect of the invention, the at least one gait model comprises a clock-driven model of the support phases and swing/flight phases of the gait. This clock-driven model provides a basic amount of timing and coordination for each leg, relative to the other legs, for achieving a coordinated walking motion over the ground. Although a strict time might be inferred, the control system may include the capability to make minor adjustments to the timing of the phases of each leg to adapt to available footholds, or the lack thereof, and the velocity and trajectory guidance from a user through the control system.

According to a further aspect of the invention, the forward velocity and body height parameters are predetermined for the at least one gait model. These predetermined parameters remove the requirement for the control system to try to determine unique and optimal velocity and body height (elevation) parameters each time a certain gait is selected. Instead, predetermined parameters of this sort decrease the demands on the control system.

According to a further aspect of the invention, the forward velocity and body height parameters are adapted for the at least one gait model using sensed or a priori ground height map data.

According to a further aspect of the invention, the control system comprises at least one of gravity-based sensors, triangulation-measurement devices, echolocators, reference systems, inertial measurement units and digital image processors. Each of these devices, alone or in combination, may be used to enhance the control of the legged vehicle. Echolocators, reference systems and digital image processors may be used to find and identify possible foothold locations, for example. Each may also be used to find and determine an "up" direction with respect to the frame.

According to a further aspect of the invention, the operator interface of the control unit is in wireless communication with the control system. This means that the operator interface does not need to be closely associated with the legged vehicle. The operator interface may be remotely located, anywhere within wireless communication range, according to known techniques.

According to a further aspect of the invention, the operator interface is attached to the vehicle body. This arrangement is particularly useful where the operator is a rider or passenger aboard the legged vehicle.

According to a further aspect of the invention, the operator interface includes at least one saddle, seat, stirrup, peg, handlebar, and body skin. These features may be used to aid in the rider mounting the vehicle, as support while riding the vehicle, or to increase the rider's ability to stay in the saddle and control the vehicle.

According to a further aspect of the invention, the operator interface components may include at least one position-measuring component providing feedback to the control system. The position-measuring component here may be used to measure the position of a rider, operator, cargo or other onboard feature of the legged vehicle. The measurement of a position of someone/something aboard the legged vehicle may be used by the control system to adjust the forces applied by the actuators through each leg.

According to a further aspect of the invention, the operator interface components include at least one force-measuring component providing feedback to the control system. These components may be used to measure forces input from a rider/operator or passenger. Various attributes and control functions may be associated with different force components, such as might be used when riding a horse, bicycle or motorcycle. The force-measuring components may be placed on a saddle/seat, foot pegs, or other points of contact to measure rider inputs from hands, buttocks, thighs and feet, and to provide control inputs accordingly.

According to a further aspect of the invention, the operator interface components include at least one torque-measuring component providing feedback to the control system. Torque-measurement components permit rider/operator-induce torques, such as through handlebars, to be recognized and applied through the control system.

According to a further aspect of the invention, the inputs to the operator interface control stability of balance in the roll axis. As the legged vehicle is generally stable in the pitch axis and along the major direction, the rider inputs may be used to affect roll axis inputs.

According to a further aspect of the invention, the control system operates autonomously without operator input. A basic trajectory and/or destination may be the only requirements for input when the legged vehicle is underway.

According to a further aspect of the invention, the control system, according to an elastic leg model stored in the read-only-memory, predicts the elastic deformation of the at least one in-line legs in a support phase (contact) with the ground and/or the elastic deformation of jointed body segments to maintain body stability.

In accordance with a further embodiment of the invention, a method of operating a legged vehicle includes the steps of:
  alternating periods of dynamic momentum and periods of tripod stance;
  continually sensing body attitude and roll angle with an inertial measurement unit;
  during a flight phase for each leg, controlling leg placement and movement to maintain an upright body position, during both the flight phase and a stance phase, with the control system, based upon attitude and roll angle sensor data,
  during the stance phase for each leg, controlling leg movement, torque, extension velocity and refraction velocity to meet desired trajectory requirements.

According to yet a further embodiment of the invention, a method of operating a legged vehicle includes the steps of:
  decoupling leg-positioning along the length of the body, corresponding to the major axis, from the leg-positioning along the width of the body and normal to the major axis and parallel to the ground;
  controlling stability of balance in the roll direction primarily, wherein the orientation of the leg attachment points to the body reduce the need for pitch control.

According to a further embodiment of the invention, a method of traversing a vertical gradient from a lower ground to a higher ground with a legged vehicle includes the steps of:
  establishing a stance phase with the center of pressure of the body inside a triangle defined by three feet, which defines a triangular support pattern, including a front foot, a middle foot and a rear foot attached to separate legs which are attached to a forward, middle and rear of the body, respectively;
  lowering a portion of the body that is farthest from the vertical gradient, corresponding to a rear portion, and shifting the center of pressure rearward to approach a zero-moment line bisecting the centers of the middle and rear feet;
  lifting the body on the middle and rear legs while simultaneously lifting the front foot from the lower ground;
  repositioning the front foot beyond the vertical gradient to a position above the upper ground;
  extending the middle foot, corresponding to the front-most foot of the middle and rear feet, to a position approaching its maximum extension;
  moving the front foot forward while maintaining the center of pressure near the zero-moment line bisecting the center of the middle foot and rear foot;
  placing the front foot on the upper ground,
  re-establishing the triangular support pattern; and
  counteracting any dynamic instability with the triangular support pattern.

According to a further embodiment of the invention, a method of traversing a vertical gradient from a lower ground to a higher ground with a legged vehicle includes the steps of:
  shifting the center of pressure to a zero-moment line bisecting the center of the front foot and the rear foot;
  lifting the middle foot and repositioning the middle foot above the upper ground;
  placing the middle foot on the upper ground;
  re-establishing the triangular support pattern; and
  counteracting any dynamic instability with the triangular support pattern.

According to a further embodiment of the invention, a method of traversing a vertical gradient from a lower ground to a higher ground with a legged vehicle includes the steps of:
  shifting the center of pressure to the zero-moment line bisecting the center of the front foot and the middle foot;
  lifting the rear foot and repositioning the rear foot above the upper ground;
  placing the rear foot on the upper ground;
  re-establishing the triangular support pattern; and
  counteracting any dynamic instability with the triangular support pattern.

According to a further embodiment of the invention, a method of traversing a vertical gradient from a lower ground to a higher ground with a legged vehicle includes the steps of:
  lifting the body;
  shifting the center of pressure to the zero-moment line that bisects the centers of the front foot and the rear foot;
  repositioning the middle foot to a position forward and beyond the front foot;
  re-establishing the triangular support pattern; and
  counteracting any dynamic instability with the triangular support pattern.

According to a further embodiment of the invention, a method of traversing a vertical gradient from a lower ground to a higher ground with a legged vehicle includes the steps of:
  shifting the center of pressure to the zero-moment line that bisects the centers of the middle foot and the rear foot;
  repositioning the front foot to the forward-most position while simultaneously moving the body forward; and
  maintaining forward motion by one of a plurality of pre-determined gaits.

According to another embodiment of the invention, a method of performing a gait with a legged vehicle includes the steps of:
  determining a plurality of candidate footfall positions with a sensor in communication with the control system;
  selecting one or more footfall positions, including a most desirable footfall position based on a number of factors;
  selecting a target walking pattern model from a plurality of walking pattern models stored in ROM of the control system, wherein each target walking pattern includes a clock-driven model of the support and flight phases of the gait for each leg, wherein the selection is based upon a number of factors, including the desired velocity and the terrain;

computing a desired trajectory for the body of the vehicle, such as with heuristic and simulation algorithms;
selecting a pattern of footholds from a set of reachable footholds that most closely correspond to the desired trajectory, and which minimize dynamic momentum for lateral and roll axes;
utilizing dynamic momentum to maintain the desired body trajectory during periods of single-leg support and double-leg support;
performing at least one of repeating the walking pattern model as desired and selecting a different walking pattern model until a desired destination is achieved.

According to a further embodiment of the invention, a method of performing a wave gait with a legged vehicle according to a clock-driven model of the support and flight phases of the gait for each leg, including the steps of:
determining a master time period, including overlapping and simultaneous first, second and third time periods corresponding to first, second and third legs and feet, respectively,
driving a front foot and leg rearward with respect to the body while in a first stance phase, wherein the foot is generally stationary with respect to the ground, wherein the body moves in a forward direction according to the major axis during a first time period;
lifting the front foot and leg and swinging the front foot and leg forward during a first flight phase;
lowering the front foot and leg to the ground to end the first flight phase;
repeating the first stance and first flight phases;
driving a middle foot and leg rearward with respect to the body while in a second stance phase, wherein the body moves in a forward direction according to the major axis during a second time period;
lifting the middle foot and leg and swinging the middle foot and leg forward during a second flight phase;
lowering the middle foot and leg to the ground to end the second flight phase;
repeating the second stance and second flight phases;
driving a rear foot and leg rearward with respect to the body while in a third stance phase, wherein the body moves in a forward direction according to the major axis during a third time period;
lifting the rear foot and leg and swinging the rear foot and leg forward during a third flight phase;
lowering the rear foot and leg to the ground to end the third flight phase;
repeating the third stance and third flight phases.

According to a further aspect of the invention, the method of performing a wave gait with a legged vehicle further includes:
separating the first, second and third flight phases to eliminate overlap, wherein at least two feet are on the ground at any time.

According to a further aspect of the invention, the method of performing a wave gait with a legged vehicle further includes:
dividing the master time period and each of the first, second and third time periods into a plurality of equal sub-units, wherein the sub-units define when the first, second and third feet and legs are in the stance and flight phases.

According to a further aspect of the invention, the method of performing a wave gait with a legged vehicle further includes:
evenly spacing the flight phases for the first, second and third feet and legs, wherein at least two feet are on the ground during each sub-unit.

According to a further aspect of the invention, the method of performing a wave gait with a legged vehicle further includes:
providing at least ten sub-units in the master time period and each of the first, second and third time periods;
performing a flight phase for each leg and foot during at least one sub-unit, wherein the at least one sub-unit for each leg and foot are during different parts of the master time period and do not overlap;
performing a stance phase for each leg and foot when not in a flight phase.

According to a further aspect of the invention, the method of performing a wave gait with a legged vehicle further includes:
dividing the master time period and each of the first, second and third time periods into eleven equal sub-units, wherein the sub-units define when the first, second and third feet and legs are in the stance and flight phases,
performing the flight phase for the first leg and foot at time period eleven, a single subunit;
performing the flight phase for the second leg and foot at time period six, a single subunit;
performing the flight phase for the third leg and foot at time period one, a single subunit, wherein each stance phase for each leg is ten sub-units in duration.

According to a further aspect of the invention, the method of performing a wave gait with a legged vehicle further includes:
dividing the master time period and each of the first, second and third time periods into twelve equal sub-units, wherein the sub-units define when the first, second and third feet and legs are in the stance and flight phases,
performing the flight phase for the first leg and foot at time periods eleven and twelve, which is two sub-units;
performing the flight phase for the second leg and foot at time periods six and seven, which is two sub-units;
performing the flight phase for the third leg and foot at time periods one and two, which is two sub-units, wherein each stance phase for each leg is ten sub-units in duration.

According to a further aspect of the invention, the method of performing a wave gait with a legged vehicle further includes:
dividing the master time period and each of the first, second and third time periods into twelve equal sub-units, wherein the sub-units define when the first, second and third feet and legs are in the stance and flight phases,
performing the flight phase for the first leg and foot at time periods nine through twelve, which is four sub-units;
performing the flight phase for the second leg and foot at time periods five through eight, which is four sub-units;
performing the flight phase for the third leg and foot at time periods one through four, which is four sub-units, wherein each stance phase for each leg is eight sub-units in duration.

According to a further aspect of the invention, the method of performing a wave gait with a legged vehicle further includes:
performing one of a make before break transition and a break before make transition when two legs are scheduled to end a flight phase and begin a flight phase, respectively, at the same time,
wherein the make before break transition includes the flight phase for one leg ending before the flight phase begins for another leg, and wherein the break before make transition includes the flight phase for one leg beginning before the flight phase has ended for another leg.

According to a further aspect of the invention, the method of performing a wave gait with a legged vehicle further includes:

performing the flight phases immediately consecutively for the first, second and third feet and legs, wherein at least two feet are on the ground during each sub-unit.

According to a further aspect of the invention, the method of performing a wave gait with a legged vehicle further includes:

dividing the master time period and each of the first, second and third time periods into twelve equal sub-units, wherein the sub-units define when the first, second and third feet and legs are in the stance and flight phases, performing the flight phase for the first leg and foot at time periods eleven and twelve, which is two sub-units;

performing the flight phase for the second leg and foot at time periods nine and ten, which is two sub-units;

performing the flight phase for the third leg and foot at time periods seven and eight, which is two sub-units, wherein each stance phase for each leg is ten sub-units in duration.

According to a further aspect of the invention, the method of performing a wave gait corresponding to a trot gait with a legged vehicle further includes:

dividing the master time period and each of the first, second and third time periods into eleven equal sub-units, wherein the sub-units define when the first, second and third feet and legs are in the stance and flight phases, performing the flight phase for the first leg and foot at time periods nine through eleven, which is three sub-units;

performing the flight phase for the second leg and foot at time periods five through seven, which is three sub-units;

performing the flight phase for the third leg and foot at time periods one through three, which is three sub-units;

supporting the body with three legs twice during the master time period, wherein each stance phase for each leg is eight sub-units in duration.

According to a further aspect of the invention, the method of performing a wave gait with a legged vehicle further includes:

separating the first, second and third stance phases so that at least one, but no more than two feet are on the ground at any time.

According to a further aspect of the invention, the method of performing a wave gait corresponding to an equal phase backward wave gait with a legged vehicle further includes:

dividing the master time period and each of the first, second and third time periods into twelve equal sub-units, wherein the sub-units define when the first, second and third feet and legs are in the stance and flight phases, performing the flight phase for the first leg and foot at time periods seven through twelve, which is six sub-units;

performing the flight phase for the second leg and foot at time periods four through nine, which is six sub-units;

performing the flight phase for the third leg and foot at time periods one through six, which is six sub-units;

supporting the body with only one leg twice during the master time period, wherein each stance phase for each leg is six sub-units in duration, wherein the stance phases for each leg are equal and the flight phases for each leg are of equal duration;

performing body attitude and roll corrections during the stance phases for each of the legs based upon body attitude and roll sensory data to the control system.

According to a further aspect of the invention, the method of performing a wave gait corresponding to an equal phase backward wave gait with a legged vehicle further includes:

dividing the master time period and each of the first, second and third time periods into six equal sub-units, wherein the sub-units define when the first, second and third feet and legs are in the stance and flight phases, performing the flight phase for the first leg and foot at time periods six through one, which is two sub-units;

performing the flight phase for the second leg and foot at time periods two through four, which is two sub-units;

performing the flight phase for the third leg and foot at time periods six through one, which is two sub-units;

supporting the body with only one leg once during the master time period;

supporting the body with three legs twice during the master time period, wherein each stance phase for each leg is four sub-units in duration, wherein the stance phases for each leg are equal and the flight phases for each leg are of equal duration;

performing body attitude and roll corrections during the stance phases for each of the legs based upon body attitude and roll sensory data to the control system.

According to a further aspect of the invention, the method of performing a wave gait corresponding to an equal phase backward wave gait for trotting or pacing with a legged vehicle further includes:

dividing the master time period and each of the first, second and third time periods into twelve equal sub-units, wherein the sub-units define when the first, second and third feet and legs are in the stance and flight phases, performing the flight phase for the first leg and foot at time periods one through six, which is six sub-units;

performing the flight phase for the second leg and foot at time periods seven through twelve, which is six sub-units;

performing the flight phase for the third leg and foot at time periods one through six, which is six sub-units;

supporting the body with only one leg once during the master time period;

supporting the body with two legs once during the master time period, wherein each stance phase for each leg is six sub-units in duration, wherein the stance phases for each leg are of equal duration and the flight phases for each leg are of equal duration;

performing body attitude and roll corrections when the first and third legs are in the stance phase, based upon body attitude and roll sensory data to the control system;

utilizing dynamic momentum of the body to maintain body attitude when only the second leg is in the stance phase.

According to a further aspect of the invention, the method of performing a wave gait corresponding to a backward wave gait with a legged vehicle further includes:

dividing the master time period and each of the first, second and third time periods into twelve equal sub-units, wherein the sub-units define when the first, second and third feet and legs are in the stance and flight phases, performing the flight phase for the first leg and foot at time periods one through eight, which is eight sub-units;

performing a first flight phase for the second leg and foot at time periods two through five, which is four sub-units;

performing a second flight phase for the second leg and foot at time periods eight through eleven, which is four sub-units;

performing the flight phase for the third leg and foot at time periods five through twelve, which is eight sub-units;

supporting the body with only one leg twice during the master time period;

supporting the body with three legs, a stance phase, twice during the master time period;

performing body attitude and roll corrections during the stance phases for each of the legs based upon body attitude and roll sensory data to the control system.

According to a further aspect of the invention, the method of performing a wave gait corresponding to a backward wave gait with a legged vehicle further includes:

performing at least one of a make before break maneuver and a break before make maneuver.

According to a further aspect of the invention, the method of performing a wave gait corresponding to a backward wave gait with a legged vehicle further includes:

repositioning the second leg and foot during the master time period.

According to a further aspect of the invention, the method of performing a wave gait corresponding to a forward and backward wave gait with a legged vehicle further includes:

dividing the master time period and each of the first, second and third time periods into twelve equal sub-units, wherein the sub-units define when the first, second and third feet and legs are in the stance and flight phases, performing the flight phase for the first leg and foot at time periods three through ten, which is eight sub-units;

performing a first flight phase for the second leg and foot at time periods five through eight, which is four sub-units;

performing a second flight phase for the second leg and foot at time periods eleven through two, which is four sub-units;

performing the flight phase for the third leg and foot at time periods nine through four, which is eight sub-units;

performing body attitude and roll corrections based upon body attitude and roll sensory data to the control system.

According to a further aspect of the invention, the method of performing a wave gait corresponding to a forward and backward wave gait with a legged vehicle further includes:

performing at least one of a make before break maneuver and a break before make maneuver.

According to a further aspect of the invention, the method of performing a wave gait corresponding to a forward and backward wave gait with a legged vehicle further includes:

repositioning the second leg and foot during the master time period.

According to a further aspect of the invention, the method of performing a wave gait corresponding to a fast trot and hopping gaits with a legged vehicle further includes:

dividing the master time period and each of the first, second and third time periods into an equal number of sub-units, wherein the sub-units define when the first, second and third feet and legs are in the stance and flight phases, providing hopping force during a stance phase with the second leg for a single sub-unit;

providing pitch stability of the body during a stance phase with the first leg and third leg for a single sub-unit, performing a flight phase for all legs simultaneously for at least a single sub-unit, wherein the legged vehicle is in a ballistic flight phase;

performing body attitude and roll corrections based upon body attitude and roll sensory data to the control system, wherein the stance phase for the second leg and the stance phase for the first and third legs are separated by at least one sub-unit.

According to a further aspect of the invention, the method of performing a wave gait corresponding to a running model gait with a legged vehicle further includes:

dividing the master time period and each of the first, second and third time periods into an equal number of sub-units, wherein the sub-units define when the first, second and third feet and legs are in the stance and flight phases, providing the stance phase for the first leg for a single sub-unit;

providing the stance phase for the second leg for a single sub-unit, wherein the stance phase for the first leg and the stance phase for the second leg are separated by at least a sub-unit;

providing the stance phase for the third leg for a single sub-unit, wherein the stance phase for the second leg and the stance phase for the third leg are separated by at least a sub-unit, and wherein the stance phase for the third leg and the stance phase for the first leg are separated by at least a sub-unit;

providing pitch stability of the body during the stance phases with the first leg, second leg and third leg separately for a single sub-unit;

performing a flight phase for all legs simultaneously for at least a single sub-unit, wherein the legged vehicle is in a ballistic flight phase;

performing body attitude and roll corrections based upon body attitude and roll sensory data to the control system.

According to a further aspect of the invention, the method of performing a gait corresponding to a pronking model gait with a legged vehicle further includes:

dividing the master time period and each of the first, second and third time periods into an equal number of sub-units, wherein the sub-units define when the first, second and third feet and legs are in the stance and flight phases, providing the stance phase for the first leg, second leg and third leg simultaneously for a single sub-unit;

separating consecutive stance phases by a flight phase of at least one sub-unit;

providing pitch stability of the body during the stance phases with the first leg, second leg and third leg separately during the at least one single sub-unit;

performing the flight phase for all legs simultaneously for at least a single sub-unit, wherein the legged vehicle is in a ballistic flight phase;

performing body attitude and roll corrections based upon body attitude and roll sensor data to the control system.

According to a further aspect of the invention, the method of performing a gait corresponding to a bounding model gait with a legged vehicle further includes:

dividing the master time period and each of the first, second and third time periods into an equal number of sub-units, wherein the sub-units define when the first, second and third feet and legs are in the stance and flight phases, providing the stance phase for the first leg for time periods one through three, which is three sub-units;

providing the stance phase for the second leg for time periods two through four, which is three sub-units;

providing the stance phase for the third leg for time periods three through five, which is three sub-units, and wherein the stance phases for the first leg, second leg and third leg overlap by at least one sub-unit;

providing a flight phase for three sub-units for each leg immediately following the stance phase for each leg;

providing pitch stability of the body during the stance phases with the first leg, second leg and third leg;

performing a flight phase for all legs simultaneously for at least one single sub-unit, wherein the legged vehicle is in a ballistic flight phase;

performing body attitude and roll corrections based upon body attitude and roll sensory data to the control system.

According to a further aspect of the invention, the method of operating a legged vehicle further includes the steps of:

operating the legged vehicle in at least one of a fully autonomous mode requiring no input to achieve its destination once programmed, a partially-autonomous mode with remote control inputs, and a partially-autonomous mode with rider-operator control inputs, wherein for the fully autonomous mode, providing into the control system a desired destination and one or more of a desired route and a desired velocity, wherein for the partially-autonomous mode with remote inputs, providing temporal inputs into the control system by a remote operator interface, wherein for the partially-autonomous mode with rider-operator control inputs, providing temporal inputs into the control system by a rider-operator of the legged vehicle.

According to another embodiment of the invention, the method of operating a legged vehicle, wherein the fully autonomous control and the partially-autonomous control includes the steps of sensing terrain with a sensor in communication with the control system;

planning a path based on control inputs and sensed terrain inputs;

selecting footholds for each foot according to the walking gait model selected, the path planned, and the sensed terrain.

According to a further aspect of the invention, the method of operating a legged vehicle, wherein the fully autonomous control and the partially-autonomous control further includes the step of:

adjusting forward- and side-step length according to the foothold selections.

According to a further aspect of the invention, the method of operating a legged vehicle, wherein the fully autonomous control and the partially-autonomous control further includes the step of:

actively maintaining stabilization and balance of the body.

According to another embodiment of the invention, the method of operating a legged vehicle with a predictive control system, including the steps of:

measuring forward body speed, body height, and ground contact duration for each foot;

adjusting the forward body speed, body height, and ground contact duration for each foot to achieve a set of expected values according to the desired trajectory;

continually determining deviations from the expected values;

compensating for the deviations to achieve active balance of the legged vehicle.

According to a further aspect of the invention, the method of operating a legged vehicle with a predictive control system, wherein the deviations are due to at least one of mechanical losses, weather and wind, rider-operator-induced perturbations, and variable ground conditions.

According to a further aspect of the invention, the legged vehicle includes three legs attached to the frame in an in-line fashion, wherein the second or middle leg is capable of supporting the entire weight of the vehicle, rider and any cargo and the first (front) and third (rear) legs are capable of at least partially supporting the entire weight of the vehicle, rider, and cargo.

According to another aspect of the invention, the method of executing straight-line walking with an in-line legged vehicle utilizes a four-phase cycle for each leg, the four phases including:

a stance or support phase wherein foot-to-ground interaction is developed to produce reaction forces and torques that are transferred from the foot through the leg to stabilize the body in the pitch, roll, and yaw axes and to propel the body in the x, y, and z axes, the stance foot being generally stationary with respect to the ground and moving generally opposite in direction to the major direction of body motion, a stance-to-flight phase wherein the reaction forces between the foot and the ground are unloaded and the foot is lifted off the ground, a flight phase wherein the leg is moved to reposition its foot by moving the foot in the same general direction and generally at a faster (negative) rate as the major direction of body motion, and a flight-to-stance phase wherein the foot is placed on the ground and reaction forces and torques are developed between the foot and the ground.

According to a further aspect of the invention, the method of executing straight-line walking with an in-line legged vehicle is according to a wave gait.

According to another aspect of the invention, the method of executing straight-line walking with an in-line legged vehicle includes the steps of:

tracking and synchronizing each phase for each leg, according to a selected predetermined gait model, with a state machine.

According to another aspect of the in-line legged vehicle for executing straight-line walking further includes wherein the control system modifies the duration of each phase of the four phases of walking motion for a plurality of legs executing a pre-defined gait according to a preprogrammed strategy to perform useful work, such as speeding up, slowing down, or stepping on a forbidden region.

According to another aspect of the invention, the method of executing straight-line walking with an in-line legged vehicle, wherein the combined ground reaction forces between at least two feet during stance phase imparts a force which propels the body in the x, y, and z axes and a torque which rotates the body in the pitch, roll, and/or yaw axes.

According to another aspect of the invention, the method of executing straight-line walking with an in-line legged vehicle, wherein the length of each leg is varied with respect to the body height during a stance phase such that the body is stable in height and pitch over uneven ground, within the working range of the legs and their feet.

According to another aspect of the invention, the method of executing straight-line walking with an in-line legged vehicle, wherein the body/frame is inclined/reclined in the pitch axis to lower/raise the front of the body and to raise/lower the rear of the body when ascending/descending a gradient, within the working range of the legs and their feet.

According to another aspect of the invention, the method of executing straight-line walking with an in-line legged vehicle, wherein the body height normal to the ground is lowered when ascending or descending a gradient, within the working range of the legs and their feet.

According to another aspect of the invention, the method of executing straight-line walking with an in-line legged vehicle,
wherein a foot is positioned to the right or to the left of the projected center of gravity on to the ground to develop during a stance phase:
1) additional ground reaction forces that are normal to the major direction of motion and
2) ground reaction torques in the pitch, roll, and/or yaw axes.

According to another aspect of the invention, the method of executing straight-line walking with an in-line legged vehicle,
wherein the leg length during a stance phase is different between feet positioned to the right or to the left of the projected center of gravity of the body on to the ground in order to level the body attitude, within the working range of the legs and their feet.

According to another aspect of the invention, the method of executing straight-line walking with an in-line legged vehicle,
wherein the body height normal to the ground is lowered when walking along a gradient, within the working range of the legs and their feet.

According to another aspect of the invention, the method of executing straight-line walking with an in-line legged vehicle,
wherein retraction of the legs during flight phase is inwards towards the body and along the major direction of motion such that no torque is imparted to the body in the roll axis.

According to another aspect of the invention, the method of executing straight-line walking with an in-line legged vehicle,
wherein the leg is swept/swung outward during a flight phase without reducing its length to impart a torque in the pitch, roll and/or yaw axes to aid in stabilizing the body.

According to another aspect of the invention, the method of executing straight-line walking with an in-line legged vehicle, further comprising the steps:
sweeping/swinging a leg outward from the body and away from the ground;
reducing the length of the leg, such as by bending the leg at the knee;
sweeping the shortened leg back inward towards the ground during a flight phase to impart a torque in the pitch, roll and/or yaw axes to aid in stabilizing the body.

According to another aspect of the invention, the method of executing straight-line walking with an in-line legged vehicle,
wherein two legs transition from stance-to-flight and flight-to-stance phase in a make before break fashion such that both feet support the body, and the landing foot is placed spatially apart from the foot lifting off.

According to another aspect of the invention, the method of executing straight-line walking with an in-line legged vehicle, wherein a control system positions the landing foot ahead, behind, to the right of or to the left of the foot lifting off according to a pre-programmed strategy, called a dexterous periodic gait.

According to another aspect of the invention, the method of executing straight-line walking with an in-line legged vehicle, wherein two feet are positioned one to the left and one to the right of the projected center of gravity of the body onto the ground in a generally bipedal stance with respect to the length of the body and major direction of motion to provide a period of stability in the roll axis.

According to another aspect of the invention, the method of executing straight-line walking with an in-line legged vehicle, wherein the combined ground reaction forces between two feet during stance phase imparts a torque to rotate the body in the pitch, roll, and/or yaw axes.

According to another aspect of the invention, the method of executing straight-line walking with an in-line legged vehicle, wherein three feet are positioned in a tripod stance to provide a period of stability in the x, y, and z axes and pitch, roll, and yaw axes.

According to another aspect of the invention, the method of executing straight-line walking with an in-line legged vehicle, wherein the combined ground reaction forces of said three feet positioned in a tripod stance impart a torque in the pitch, roll and/or yaw axes to aid in stabilizing the body.

According to another aspect of the invention, the method of executing straight-line walking with an in-line legged vehicle, wherein two legs transition from stance to flight and flight to stance in a break before make fashion and the landing foot is placed in or near the same foothold as the foot lifting off.

According to another aspect of the invention, the method of executing straight-line walking with an in-line legged vehicle, wherein the second foot is placed in or near the same foothold as the first foot, the third foot is placed in or near the same foothold as the second foot, and so on according to a pre-programmed strategy, called a continuous follow-the-leader gait.

According to another aspect of the invention, the method of executing straight-line walking with an in-line legged vehicle, wherein a control system positions the first foot.

According to a further embodiment of the invention, a method of executing a single-track walking turn with an in-line legged vehicle, wherein a yaw torque about the center of gravity is developed by the interaction of two legs with the ground, according to control system control of leg actuators.

According to a further embodiment of the invention, a method of executing a single-track walking turn with an in-line legged vehicle, wherein a yaw torque about the center of gravity is developed by the interaction of one foot with the ground.

According to a further embodiment of the invention, a method of running with an in-line legged vehicle, wherein during foot touchdown, the foot accelerates backward with respect to the hip until there is no speed differential between the foot and the ground before contact with the ground, called ground speed matching.

According to a further embodiment of the invention, a method of running with an in-line legged vehicle, wherein during foot lift-off, the foot continues moving backward until it is fully unloaded.

According to another embodiment of the invention, a method of executing a single-track running turn of an in-line legged vehicle, wherein a foot torque develops a yaw torque about the center of gravity.

According to another embodiment of the invention, a method of executing a single-track running turn of an in-line legged vehicle, wherein an off-axis force impulse develops a yaw torque about the center of gravity.

According to a further embodiment of the invention, a method of hopping of an in-line legged vehicle, wherein a state machine uses sensory data to track the hopping motion to switching leg states on the occurrence of key events stored in memory.

According to a further aspect of the invention, the method of hopping of an inline legged vehicle, wherein the hopping states include compression, thrust, unloading, flight, and landing.

According to a further aspect of the invention, the method of hopping of an inline legged vehicle, wherein hopping involves alternating foot-patterns of the bipedal and tripedal stance to achieve stability of balance.

According to a further embodiment of the invention, a method of pacing/bounding of an in-line legged vehicle, wherein two legs form a pair of legs that work in unison as though they were one leg, striking the ground in unison and leaving the ground in unison.

According to a further aspect of the invention, the method of pacing/bounding of an in-line legged vehicle, wherein diagonal legs form pairs in the trot in a simulated bipedal-like stance.

According to a further aspect of the invention, the method of pacing/bounding of an in-line legged vehicle, wherein lateral legs form pairs in the pace for a simulated bipedal-like stance.

According to a further aspect of the invention, the method of pacing/bounding of an in-line legged vehicle, wherein front and rear legs form a pair in the bound—the middle alternating between front and rear, as required.

According to a further embodiment of the invention, a method of leaping of an in-line legged vehicle, wherein the legs leap from a tripedal stance.

According to a further aspect of the invention, the method of leaping of an in-line legged vehicle, wherein the legs land in a tripedal stance.

According to a further aspect of the invention, the method of leaping of an in-line legged vehicle, wherein the legs leap with two legs in bipedal-like stance for balance stability and control.

According to a further aspect of the invention, the method of leaping of an in-line legged vehicle, wherein the legs land with two legs in bipedal-like stance for balance stability and control.

According to a further embodiment of the invention, a method of jumping of an in-line legged vehicle, wherein take-off uses two legs in bipedal-like stance for balance stability and control.

According to a further embodiment of the invention, a method of jumping of an in-line legged vehicle, wherein landing uses two legs in bipedal-like stance for balance stability and control.

According to a further embodiment of the invention, a method of passive rider-based control of an in-line legged vehicle, wherein the legs follow an in-line path.

According to a further aspect of the invention, the method of passive rider-based control of an in-line legged vehicle, wherein elastic deformation of the legs aids in compliance with irregular ground height.

According to a further aspect of the invention, the method of passive rider-based control of an in-line legged vehicle, wherein the actuation force applied by the middle leg is greater than the outer legs.

According to a further aspect of the invention, the method of passive rider-based control of an in-line legged vehicle, wherein handle bars provide steering angle input.

According to a further aspect of the invention, the method of passive rider-based control of an in-line legged vehicle, wherein the forward leg initiates the turn with the last leg following.

According to a further aspect of the invention, the method of passive rider-based control of an in-line legged vehicle, wherein the legs follow a turn based on the commanded steering angle.

According to a further embodiment of the invention, a method of semi-autonomous and rider-based control of an in-line legged vehicle,
wherein the sensors sense an approximately narrow, in-line area.

According to a further aspect of the invention, the method of semi-autonomous and rider-based control of an in-line legged vehicle, wherein the control system executes temporal prediction of N steps ahead.

According to a further embodiment of the invention, a method of autonomously controlling an in-line legged vehicle, wherein the sensors sense an approximately narrow, in-line area.

According to a further aspect of the invention, the method of autonomously controlling an in-line legged vehicle, wherein the control system executes temporal prediction of N steps ahead.

According to a further embodiment of the invention, a method of responding to a de-stabilizing external force of an in-line legged vehicle,
wherein transition out of a current gait to new gait is selected based on minimizing the least mean square error cost to pre-defined gait patterns stored in memory.

According to a further aspect of the invention, the method of responding to a de-stabilizing external force of an in-line legged vehicle,
wherein transition out of a current gait to new gait is selected based on minimizing the least mean square error cost to pre-defined gait patterns stored in memory simulated by temporal prediction of N steps ahead.

According to a further embodiment of the invention, a method of recovery from an out of control situations of an in-line legged vehicle, wherein a foot is retracted and thrust in the direction of the roll to catch the body.

OBJECTS, FEATURES AND ADVANTAGES

It has long been known that it would be advantageous to develop a vehicle that uses legs rather than one with wheels because a vehicle with legs can go where wheeled or treaded vehicles cannot go. Legged vehicles have improved mobility over rugged terrain with unstable footholds, such as mountain slopes and piles of rubble, because the legged vehicles may choose optimal foot placement and vary the length of the leg with respect to the body. Additionally, legged vehicles can bound, leap, or jump over areas of ground that do not have a continuous path of support or closely spaced footholds. Moreover, legged vehicles are able to move in man-made or cultural environments, traversing obstacles such as curbs, stairs, and narrow passageways. With respect to wheeled vehicles, legged vehicles reduce body motion. This characteristic is especially well suited to the comfort of a rider or passenger.

It is therefore an object of the present invention to solve the problems associated with providing a single track or in-line multi-legged mobile robot similar in form or function to the motorcycle or bicycle but with the added benefit of legs and full or partial robotic control. For example, unlike the wheeled motorcycle or bicycle, a feature and advantage of the single track or in-line multi-legged mobile robot is that it can move sideways. It is a feature of this invention to solve these problems by providing a walking machine in which the legs are in-line or co-linear with respect to the body and primary direction of motion. Unlike the wheeled motorcycle or bicycle, the single track or in-line multi-legged mobile robot uses discrete footholds over the duration of the stance period, which is an advantage or feature in rugged, natural terrain where footholds are unevenly spaced. Another object of this invention is to provide a robotic control system, e.g., autonomous attitude stabilization control, for the single track or in-line multi-legged system. For example in the case where all three legs are in contact with the ground, as in the stance phase of a wave gait, the ability to shift one of the legs laterally to affect balance is an advantage or feature. Further, unlike the outrigger wheels of the prior art, the feet of the single track or in-line multi-legged mobile robot are stationary with respect to footholds during the support period, thus eliminating the drawback of the prior art when used in rugged terrain.

Still other objects, features and attendant advantages of the present invention will become apparent to those skilled in the art from reading of the following detailed description of the preferred embodiment constructed in accordance therewith and taken in conjunction with the accompanying drawings.

BRIEF DESCRIPTION OF THE DRAWING

FIG. 33A illustrates the robot with rider, and FIG. 33B illustrates the resulting free body diagram;

DETAILED DESCRIPTION OF THE INVENTION

Figure 1:
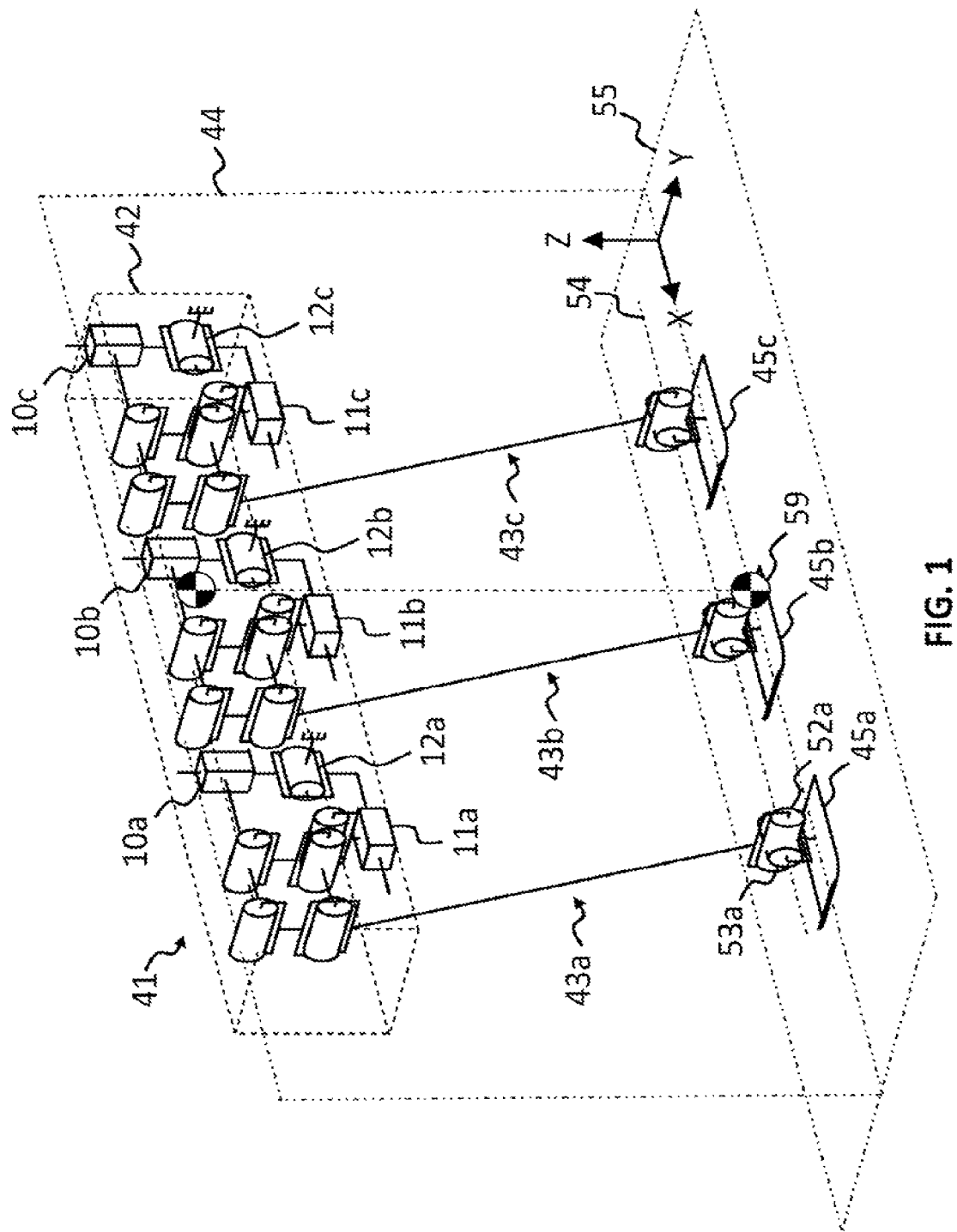
FIG. 1 illustrates a perspective skeletal view of a single track, in-line three legged mobile robot having pantograph legs.

The invention will now be explained with reference to a single track or in-line three legged mobile robot as a specific embodiment of the single track multi-legged mobile robot. Referring now to the drawings and, more particularly, to FIGS. 1-3 thereof, there is shown a single track or in-line legged mobile robot, generally designated 41, including a body or frame, generally designated 42, and three identical leg mechanisms, generally designated 43, attached one behind the other, substantially parallel to the major axis of the frame 42, defining a forward/backward direction of travel along planes 44 and 55. By convention, the left side of the page is the front side and forward direction, the right side of the page is the rear side, into the page is the right side, and out of the page is the left side of the robot 41. The construction of each leg mechanism 43 is not directly relevant to the present invention, the present invention being directed to the method and manner in which the leg mechanisms 43 may be combined and attached to the body 42 for forming a complete legged mobile robot and control thereof. However, leg mechanisms 43 will be described briefly, because the teachings of which are necessary for an understanding of the present invention. Since each leg mechanism 43*a*, 43*b*, and 43*c* is identical, a description of one will suffice to describe all.

It will be readily apparent by those skilled in the art, from an inspection of the drawings that a pantograph leg, as illustrated in FIG. 1, is a preferred embodiment. A pantograph leg mechanism would include a plurality of elongated links arranged in a parallelogram to form a pantograph mechanism whereby forces applied at selected points on individual parts of the links can be transmitted to another link which forms the movable foot 45*a*-45*c* of the mechanism, or a movable distal end of a leg 43*a*-43*c*. Vertical movement of foot 45*a*-45*c* is controlled by a sliding or prismatic actuators 10*a*-10*c* oriented vertically, horizontal movement of the foot 45*a*-45*c* is controlled by a sliding or prismatic horizontal actuator 11*a*-11*c*, lateral or outward movement of the foot 45*a*-45*c* is controlled by the rotational actuator 12*a*-12*c*, wherein the horizontal and vertical mechanism is mounted for rotation with respect to the body 42. Actuators 10-12 may be electric motors, electro-hydraulic servos or other known technologies suitable for accurately effecting the movement of the legs 43 and other jointed members. Pantograph legs, as illustrated in FIG. 1, reduce the complexity of actuation, increasing reliability, and decreasing computational requirements. However, the popularity of biologically inspired jointed legs, found in prior art and in commercial off-the-shelf robotic kits is believed to improve the clarity of understanding the teachings.

Figure 2:
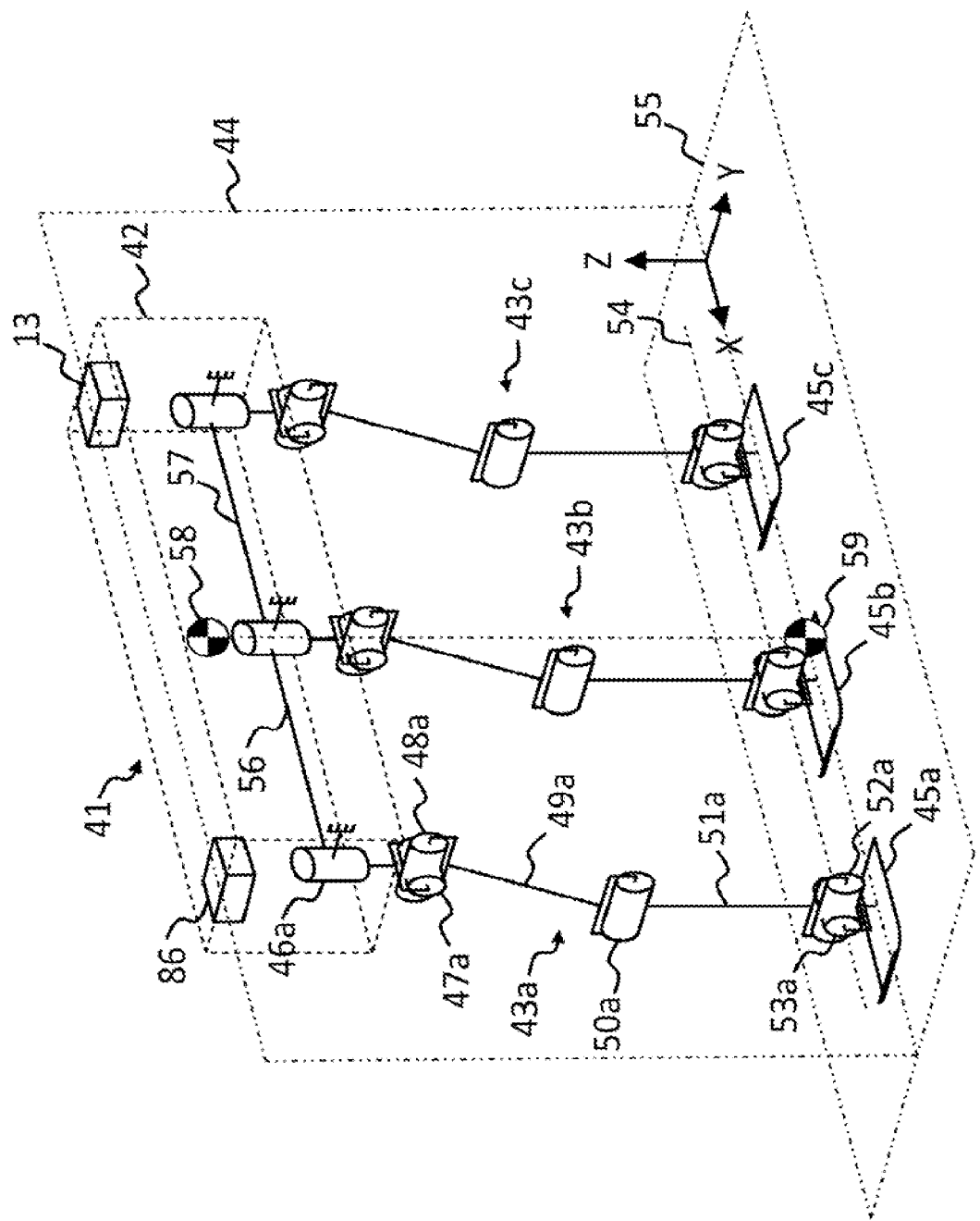
FIG. 2 illustrates a perspective skeletal view of a single track or in-line three legged mobile robot.
Figure 3:
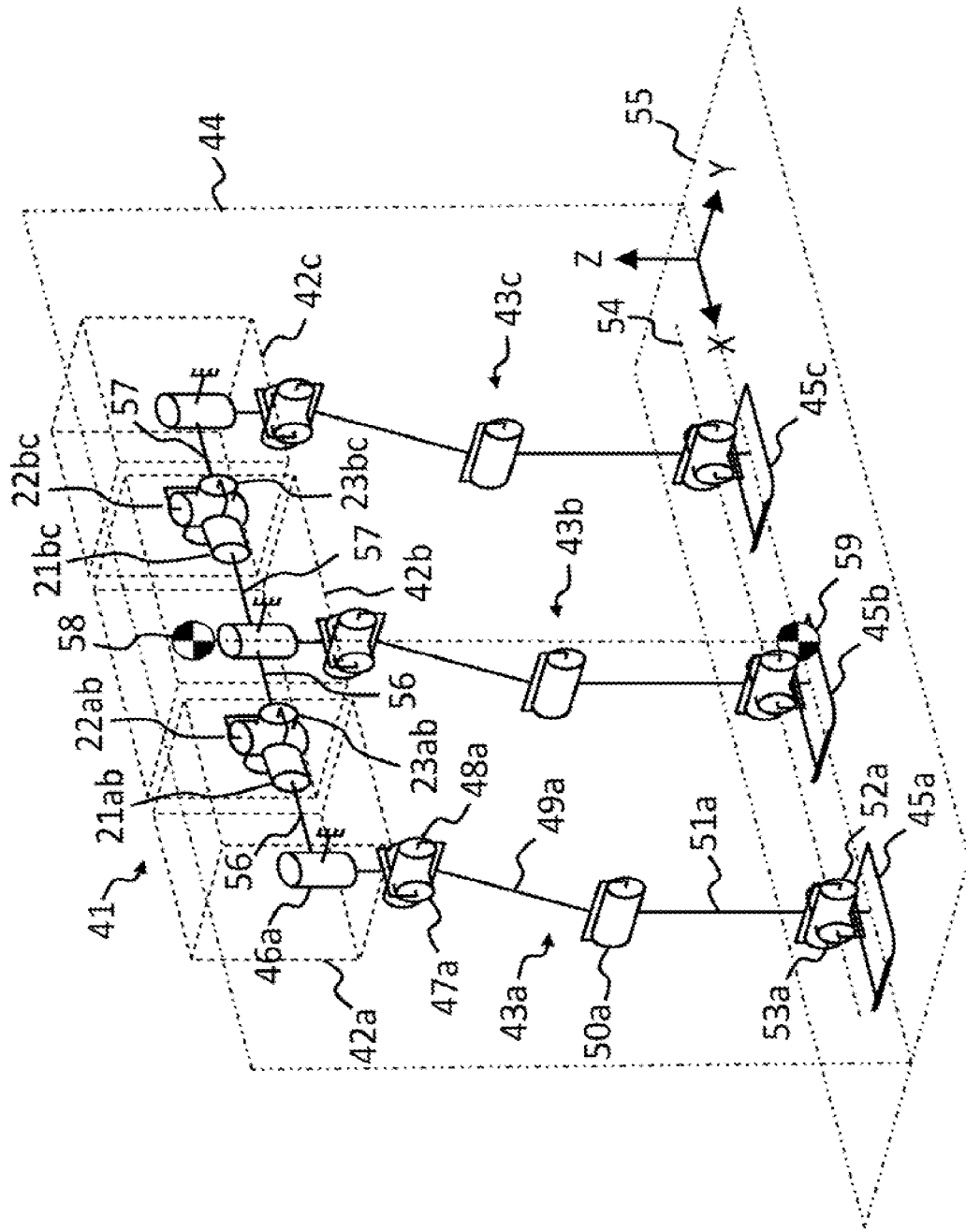
FIG. 3 illustrates a perspective skeletal view of a single track, in-line three-legged mobile robot/vehicle having a jointed, articulated body/frame.

An overall skeletal view of the tri-legged walking machine is shown in FIGS. 2-3. The articulated structure of the legged walking machine 41 includes three jointed legs mounted in-line, one behind the other, along the length of the body 42 such that the three legs establish a plane 44 (X-Z axis). Each leg mechanism is associated with six articulations or joints (axes) to enable each foot 45*a*, 45*b*, and 45*c* to be positioned in six dimensions (X-Y-Z and roll-pitch-yaw axis, respectively) with respect to the body 42. Since each leg mechanism 43a, 43b, and 43c is identical, a description of the first leg 43a will suffice to describe all and the other legs are unlabeled for clarity. The joints (axes) of the leg include a yaw rotational joint (yaw axis) 46a for turning the leg and foot 45a with respect to the body 42, a roll rotational joint (roll axis) 47a for moving the foot to the side (Y axis) of the body 42, a pitch rotational joint (pitch axis) 48a on a thigh link 49a for moving the foot forward and backward (X axis), a rotational joint (axis) 50a in the knee and at the distal end of the thigh link 49a and on a shank link 51a for moving the foot forward and backward (X axis), a rotational joint (axis) 52a at the distal end of the shank link 51a for moving the foot in the pitch direction, and a rotational joint (axis) 53a for moving the foot in the roll direction. Axes 52 and 53 are parallel to the pitch and roll axes, respectively. The foot 45a is mounted to a small shank (not labeled for clarity) connected to rotational joint 53a on the lower end of the leg 43a. The joints (axes) 46, 47, and 48 jointly constitute a hip joint assembly, joint 50 constitute a knee assembly, and the joints 52 and 53 jointly constitute a foot joint assembly. The foot 45 is moved forward or backward with respect to the length of the body 42 or parallel to the plane 44 by rotating joints 48, 50, and 52 and/or rotating joints 23. The foot 45 is moved to the right or left side with respect to the length of the body 42 or perpendicular to the plane 44 by rotating joints 47 and 53 and/or rotating joints 21. The foot 45 is rotated clockwise or counterclockwise with respect to the length of the body 42 by rotating joints 46 and/or rotating joints 22. The roll axis 54 of the walking machine 41 is about ankle joints 53. Note that for legs with a point-contact foot, that is without ankle joints 53, the roll axis 54 is at the point of contact of the at least two single track feet 45 and the ground 55 for the condition where there is negligible foot slip. It may be desirable for legs 43, connecting joints 21-23 and/or feet 45 to be mechanically compliant to comprise a spring-mass-damper system to afford a gentler ride of body 42.

Still referring to FIGS. 2-3, body 42 includes three main support plates to mount the legs 43 to frames 56 and 57 on body 42 to afford roll, pitch, and yaw hip rotations along the axis of motion such that the foot may be positioned laterally or radially outward with respect to the body 42 and measured thusly. On each of the thigh and the ankle of each leg, the pitch joints 48 and roll joints 47 are disposed perpendicularly to each other, and have respective axes intersecting with each other at one point. The joints 48, 50, and 52 in the hip joint assembly, the knee joint, and the foot joint assemblies, respectively, extend parallel to each other in plane 44. Irrespective of movements caused by other degrees of freedom, particularly, movements of the joints 46 to change the direction of the legs, the joints 48, 50, and 52 remain parallel to each other, with respect to a single leg. In the hip joint assemblies, the joints 46 and the pitch and roll joints 47, and 52 extend perpendicularly to each other, so that the three axes of rotation, representing three degrees of freedom, extend perpendicularly to each other. More specifically, the axis 46 may be considered to define a first axis of the hip joint assembly, the axis 47 to define a second axis of the hip joint assembly, and the axis 48 to define a third axis of the hip joint assembly. The axes 46, 47 and 48 each provide respective degrees of freedom about which the leg of the robot may be moved, for example, the axis 48 provides a first degree of freedom for angularly moving the leg forwardly in the pitch direction, the axis 47 provides a second degree of freedom for moving the leg laterally in the roll direction, and the axis 46 provides a third degree of freedom in the yaw direction for rotating the leg with respect to the body 42. It should be understood, however, that the designations "first," "second" and "third" are arbitrary, and are used merely to facilitate a description of the invention. The legs 43 thus have six degrees of freedom each, so that during locomotion the legs as a whole can be caused to execute the desired motion by driving the 6×3=18 joints (axes) to appropriate angle. Irrespective of the position or posture of the body 42, the feet 45 can be placed in any position, at any angle, and in any direction. The robot is thus capable of walking freely within three dimensional space. The joint actuations may be provided by any means such as electric motors and reduction gear mechanism for increasing motor torque or high pressure servo hydraulics. A power supply 13 and a control unit 86 are mounted on the legged vehicle. The power supply is in communication with each component of the legged vehicle which requires power, including the control unit 86 and all its distributed components, and the numerous actuators. The control unit 86, also called a control system in a larger sense, includes numerous parts, as described above, including numerous sensors which may be distributed throughout the vehicle.

Still referring to FIG. 1-3, body 42 has physical mass and thus a center of gravity 58 and its projection to the ground 55, called the center of pressure 59. The center of gravity 58 and center of pressure 59 are well known physical properties, especially with respect to single track vehicles, such as motorcycles and bicycles, legged mobile robots and the like, described in the prior art.

Figure 4:
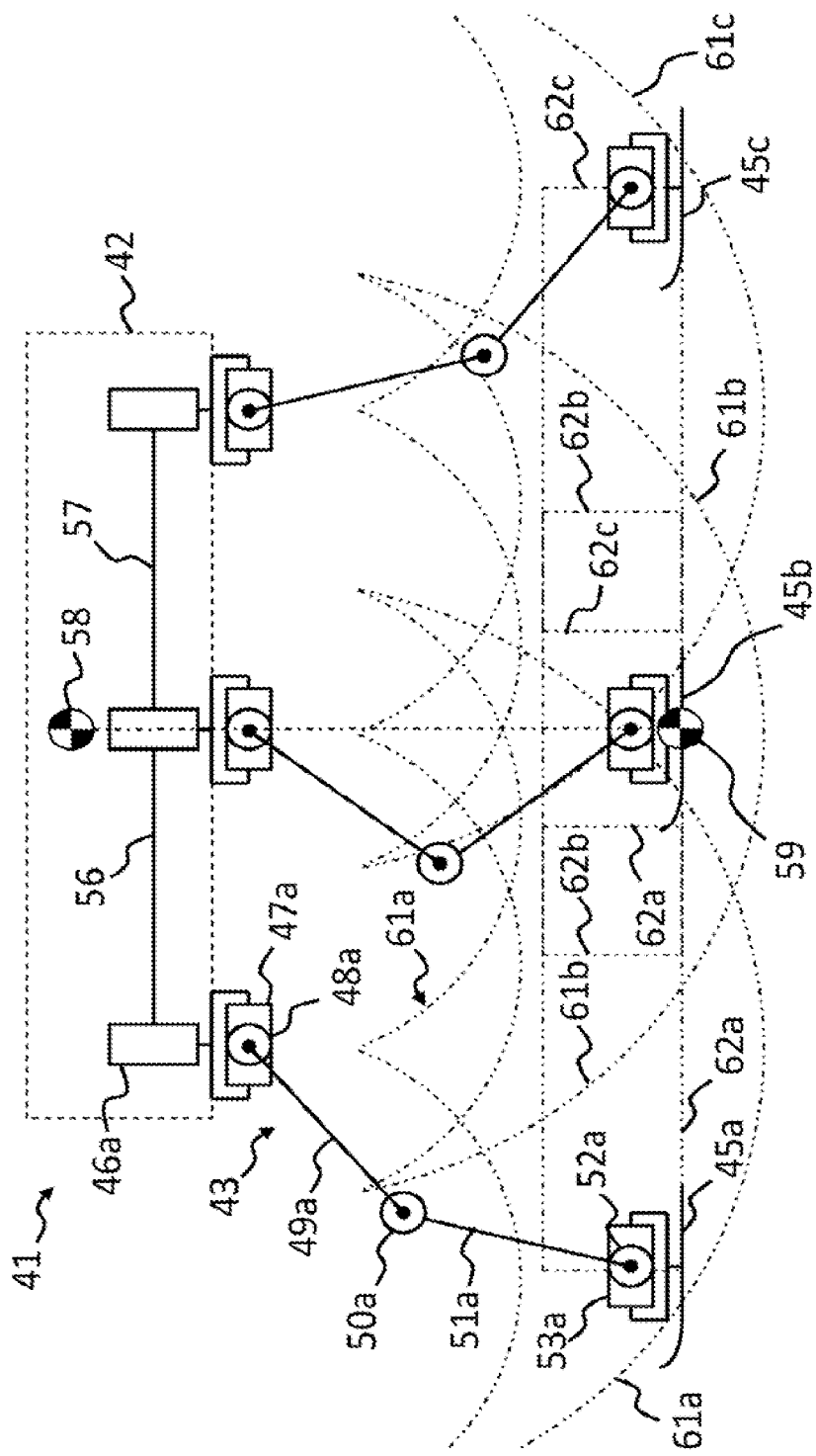
FIG. 4 illustrates a side skeletal view of a single track or in-line three legged mobile robot illustrating the range of motion of the legs along the major direction of travel.

Referring now to FIGS. 4-8, several views of possible configurations of the legs and the method in which operation of the individual legs move are illustrated, whereby foot placement along the length of the body 42 and in the major direction of motion shall now be discussed. According to the preferred embodiment of the present invention, each leg 43 can be rotated about hip, knee, and ankle joints in three dimensions. FIG. 4 illustrates the side skeletal view of one possible configuration of the legs, wherein the x and z axes with the side or y axis into and out of the page. By convention, the left side is the forward direction. The first leg 43a is shown with its foot 45a extended forward with respect to its hip joints 46a, 47a, and 48a. Hereinafter, the terms forward or rearward shall be with respect to the hip joints 46, 47, and 48 along the length of the body 42. The second or middle foot 45b is shown in a middle or neutral position, and the third foot 45c is shown in a rearward extended position. From left to right, the first dashed cardioid 61a envelops and illustrates the total range of motion for the center bottom of foot 45a (hereinafter the center bottom of each foot is referred to as the foot), and a second rectangular dashed box 62a inscribed inside the first dashed cardioid 61a and illustrates the working range of motion for foot 45a. Two more dashed cardioids 61b and 62c and two more dashed boxes 62b and 62c illustrate the total range of motion and working range of motion for feet 45b and 45c, respectively. In operation, FIG. 4 shows the range of motion for each foot 45 of each leg 43 wherein there is a maximum working envelope 61 and a typical working range 62 for legged locomotion. Both the maximum working envelope 61 and typical working range 62 are three-dimensional volumes, but are shown as two-dimensional areas for clarity. Because the leg system shown uses hip, knee, and ankle joints, as previously described, the maximum working envelopes 61 is unique for that leg geometry. It would be different for pantograph legs of FIG. 1, for example.

Figure 5:
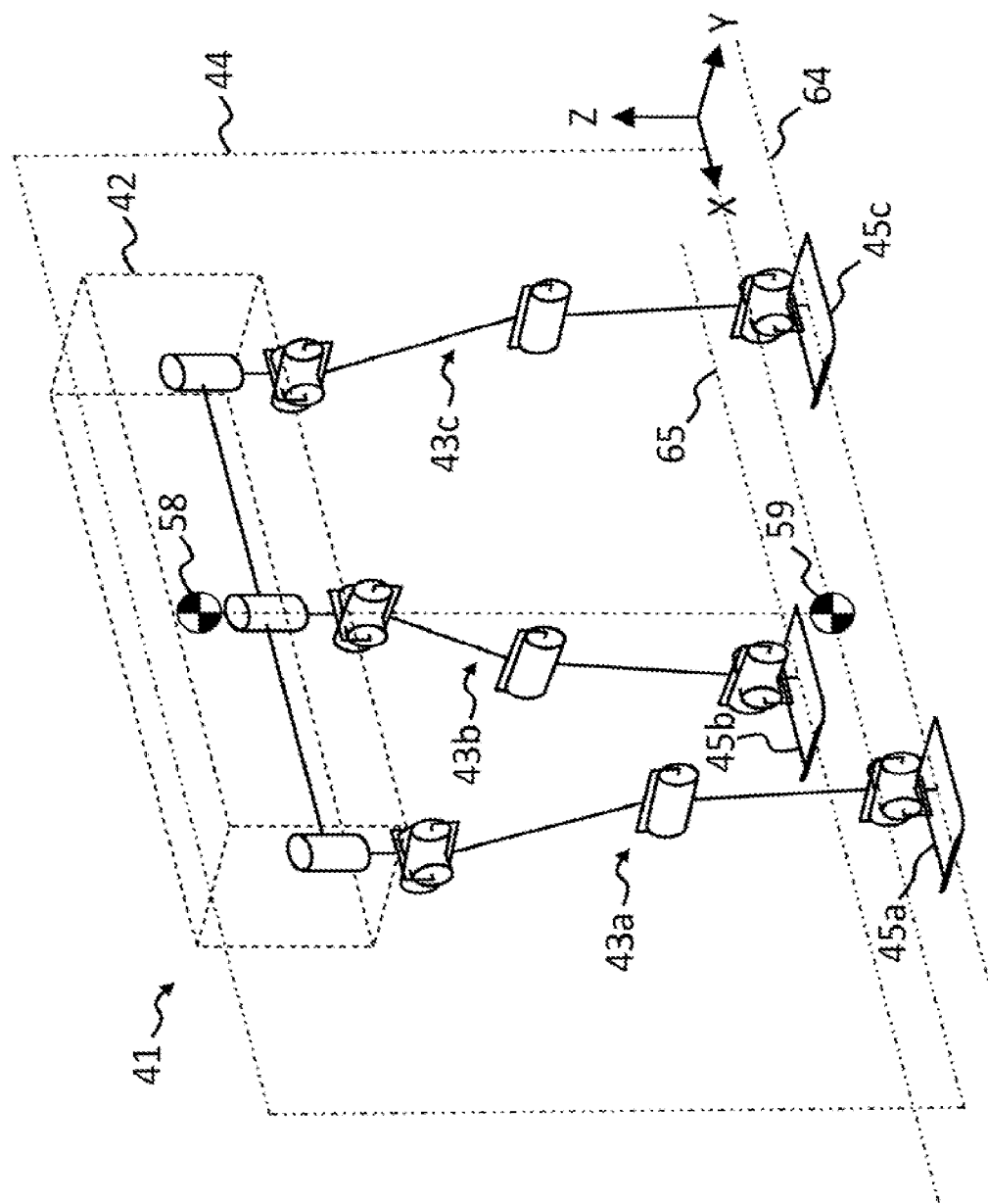
FIG. 5 illustrates a perspective skeletal view of a single track or in-line three legged mobile robot illustrating one possible configuration of the legs, typically used in a stationary stance.
Figure 6:
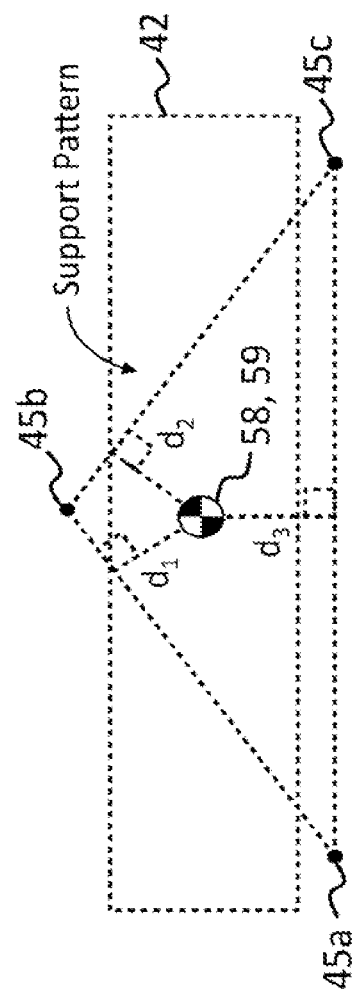
FIG. 6 illustrates a top schematic view illustrating center of gravity, placement of the feet, and resulting area of support for the single track or in-line three legged mobile robot illustrated in FIG. 5.

Specific to this invention is the overlap of the typical working range 62a, 62b, and 62c, shown as a dashed rectangular boxes within the maximum working envelope 61a, 61b, and 61c, shown as dashed cardioids, because it is highly desirable to have a legged mobile robot which can operate on uneven surfaces, such as along narrow trails and paths, for example those found in parks and wilderness areas. That is, at a minimum the maximum working envelope 61a overlaps with 61b, and 61b overlaps with 61c, and at a minimum the typical working range 62a overlaps with 62b, and 62b overlaps with 62c. In other words, the typical working range of the front leg overlaps with the middle leg and the middle leg overlaps with the rear leg to enable in three dimensions the front foot 45a to be positioned alongside the middle foot 45b and the middle foot 45b to be positioned alongside the rear foot 45c without mechanical interference. FIG. 5 schematically shows a three-dimensional perspective view of a leg configuration wherein each foot is displaced to left or right side of the projected center of gravity such that feet 45a and 45c traverse a centerline 64 that is spatially displaced but parallel to the centerline 65 of foot 45b. FIG. 6 schematically shows the top view of FIG. 5 wherein the centers of feet 45 are shown as dots, displaced about the center of gravity 58 and its ground projection center of pressure 59 (not shown for clarity) of body 42. FIG. 5 schematically shows one possible configuration of the legs 43 of the legged mobile robot 41 in a resting stance configuration, such as when the robot is turned off, of the foot 45 placement and leg 43 geometry such that the legs are in a tripod configuration and the legged mobile robot does not fall over.

Figure 7:
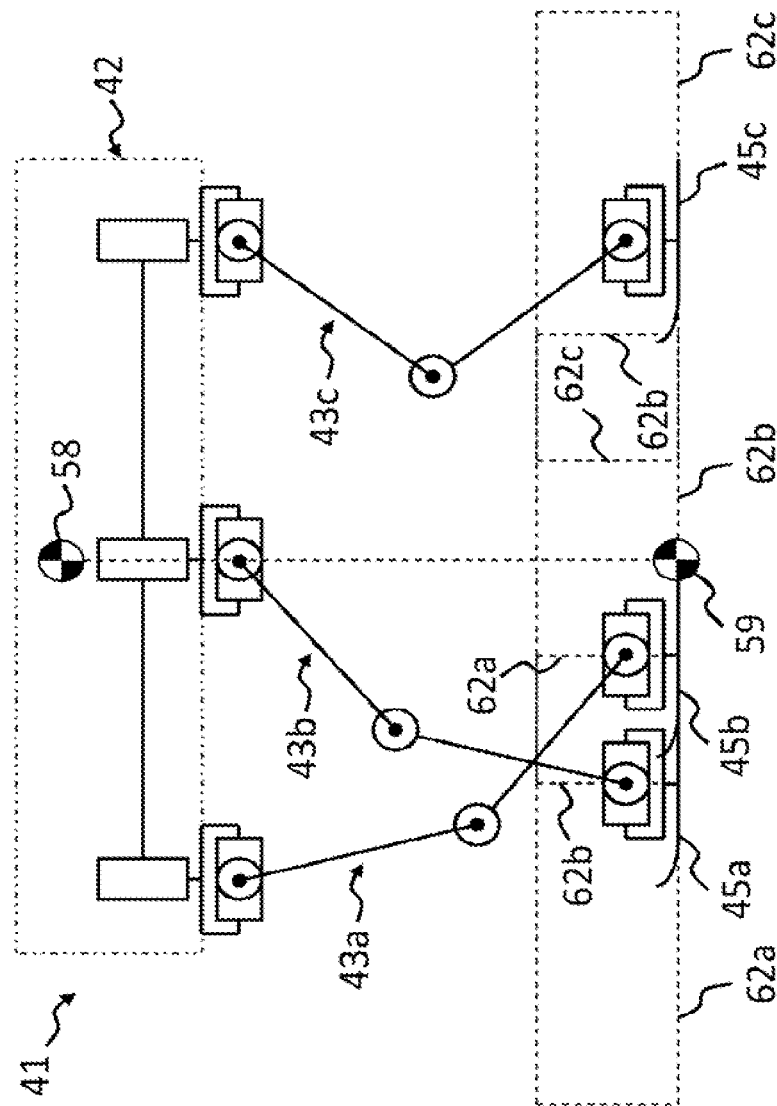
FIG. 7 illustrates a side skeletal view of a single track or in-line three legged mobile robot illustrating overlap and crossover of the first and second legs, typically used while moving.
Figure 8:
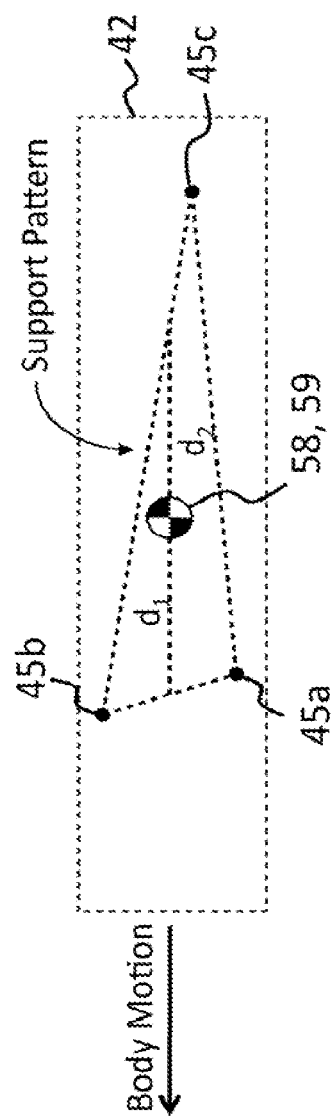
FIG. 8 illustrates a top schematic view illustrating center of gravity, placement of the feet, and resulting area of support for the single track or in-line three legged mobile robot illustrated in FIG. 7.

FIG. 7 schematically shows a side view where the front leg 43a is fully extended rearward and the middle leg 43b is fully extended forward. FIG. 8 schematically shows the top view of FIG. 7 wherein the centers of feet 45 are shown as dots, displaced about the center of gravity 58 and its ground projection center of pressure 59 (not shown for clarity) of body 42. The legs 43 and feet 45 may be configured in infinite variety such that the projected center of gravity 58, the center of pressure 59, is contained within the foot extent. In terms of the zero moment point (ZMP), the feet 45 are positioned such that the net moment or torque about the projected center of gravity 58, the center of pressure 59, is zero and the robot does not fall down. The advantage of such a range of motion can be seen in FIG. 8, wherein the extreme rearward position of the front leg 43a and the extreme forward position of middle leg 43b overlap such that the feet 45a and 45b are positioned similar to that of a biped. This design and method is highly important so that a legged machine can achieve the desired stability of balance, leap and jump, land, and so on, and in addition to the legs 43 being capable of operation in such a manner that it has a very narrow profile so that it can maneuver in a space where walking machines previously could not go, such as along a narrow path or trail or through a door.

Figure 9:
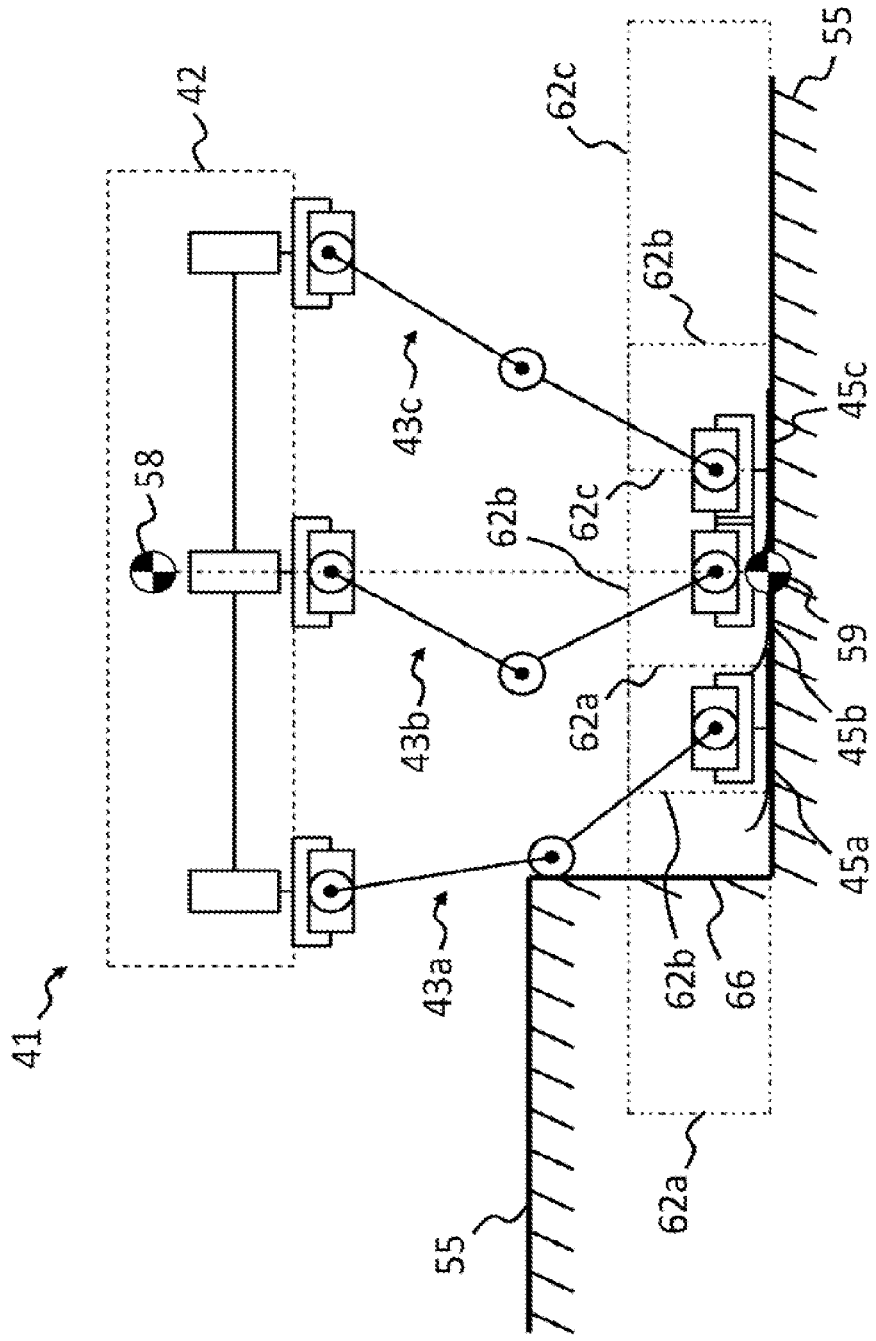
FIG. 9 illustrates one possible configuration of leg and foot placement before traversing a vertical or step gradient for a single track or in-line three legged mobile robot.
Figure 10:
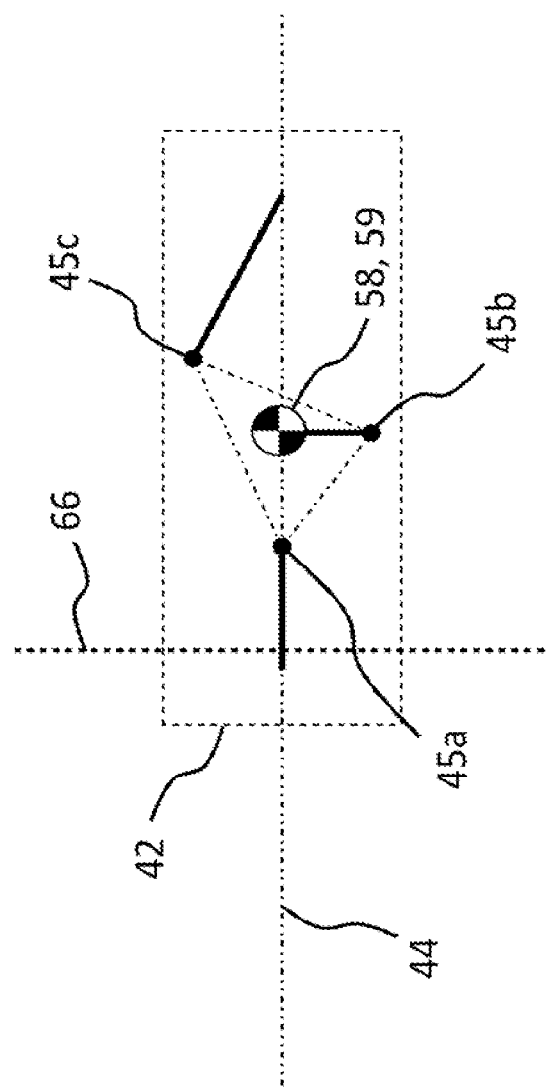
FIG. 10 illustrates a top schematic view illustrating center of gravity, placement of the feet, and resulting area of support for the single track or in-line three legged mobile robot illustrated in FIG. 9.

Referring now to FIGS. 9-28, the single track or in-line legged mobile robot 41 is shown in side views and top views traversing a vertical or step gradient 66 to illustrate certain properties of the invention, such as for example adjusting the walking height and/or body attitude on a gradient, the horizontal range, the vertical range, maintaining balance on three legs, maintaining balance on three legs, and a lateral side-step or shuffle maneuver. Such properties of the invention are fundamental to traversing uneven or rugged terrain, ditch crossing, wall crossing, climbing, and so on. Starting with FIG. 9, the legged mobile robot 41 illustrates one possible configuration of legs 43 and foot 45 placement before traversing the vertical or step gradient 66. FIG. 10 shows a top view schematic of the ground 55 illustrating placement of the feet 45 with respect to the body 42, x-z reference plane 44, and projected center of pressure 59. By convention, the left side is the forward direction.

Figure 11:
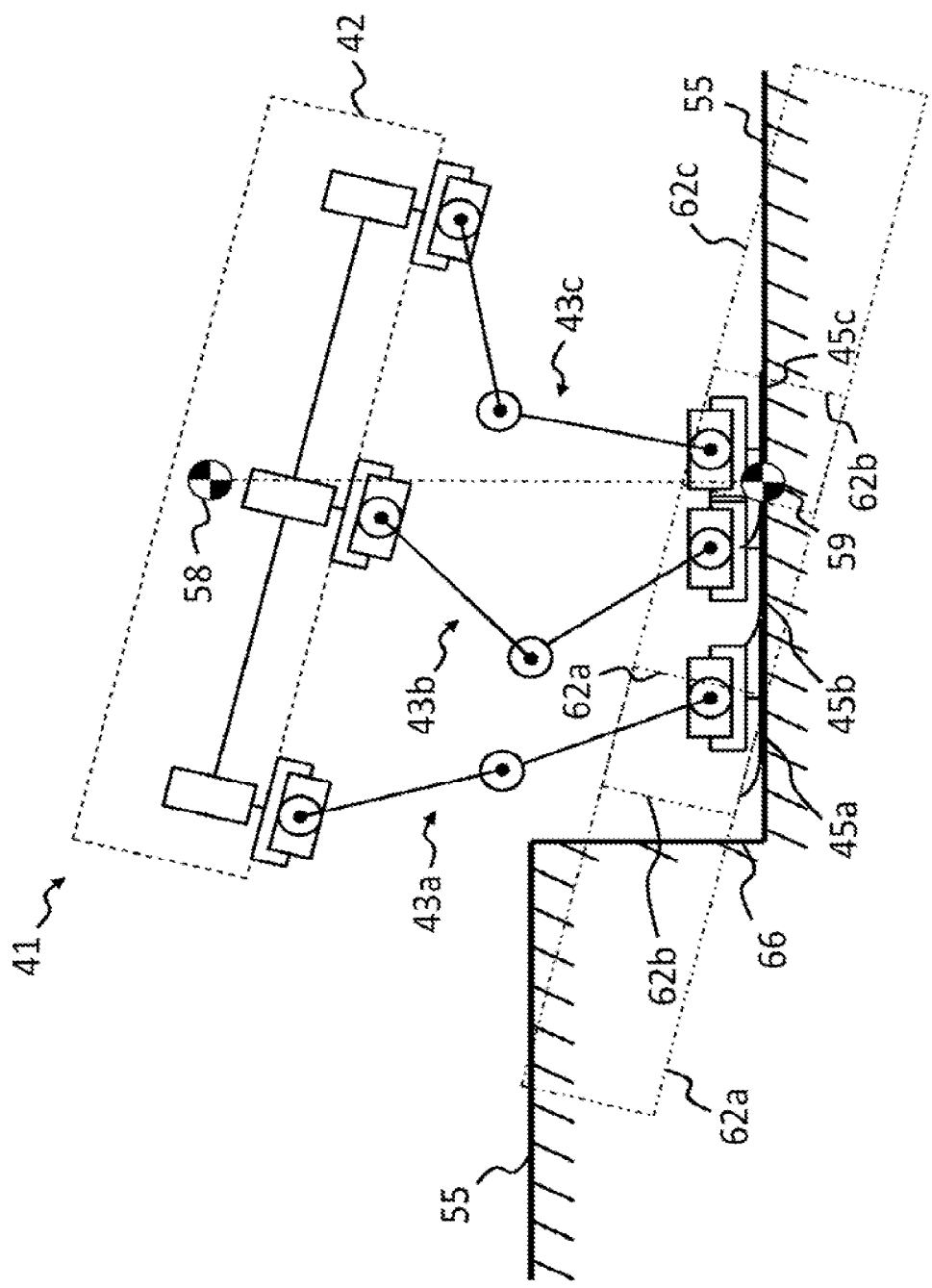
FIG. 11 illustrates a single track or in-line legged mobile robot adjusting the walking height and/or body attitude in preparation to traverse a vertical or step gradient.
Figure 12:
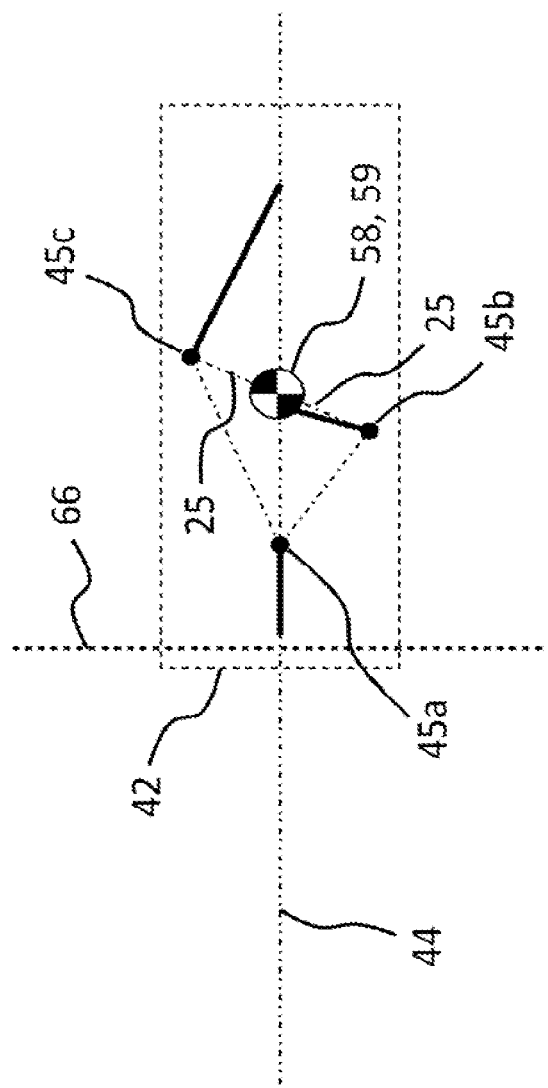
FIG. 12 illustrates a top schematic view illustrating center of gravity, placement of the feet, and resulting area of support for the single track or in-line three legged mobile robot illustrated in FIG. 11.

Next, FIGS. 11-12 show the single track or in-line legged mobile robot 41 adjusting the walking height and/or body attitude in preparation to traverse the vertical or step gradient, by dropping the rear portion of body 42. This maneuver has the effect of shifting the projected center of pressure 59 rearward such that it intersects with a zero moment line 25 bisecting the centers of the middle foot 45b and rear foot 45c. At this time, the legged mobile robot 41 is effectively in a biped stance. Also the working range of motion for each foot 45 has shifted. The front foot 45a is now positioned at the lowest and most rearward position of the working range 62a, the front portion of the working range 62a has risen off the virtual ground plane of the lower ground 55, the middle foot 45b and rear foot 45c are within their working ranges 62b and 62c, respectively, and the rear portion of the working ranges 62b and 62c have sunk below the virtual ground plane of the lower ground 55. Note that there is still some margin between the working range 62a and the maximum working envelope 61a (not shown for clarity) to provide a safety margin for external dynamic events, such as a force imparted by a rider or the wind.

Figure 13:
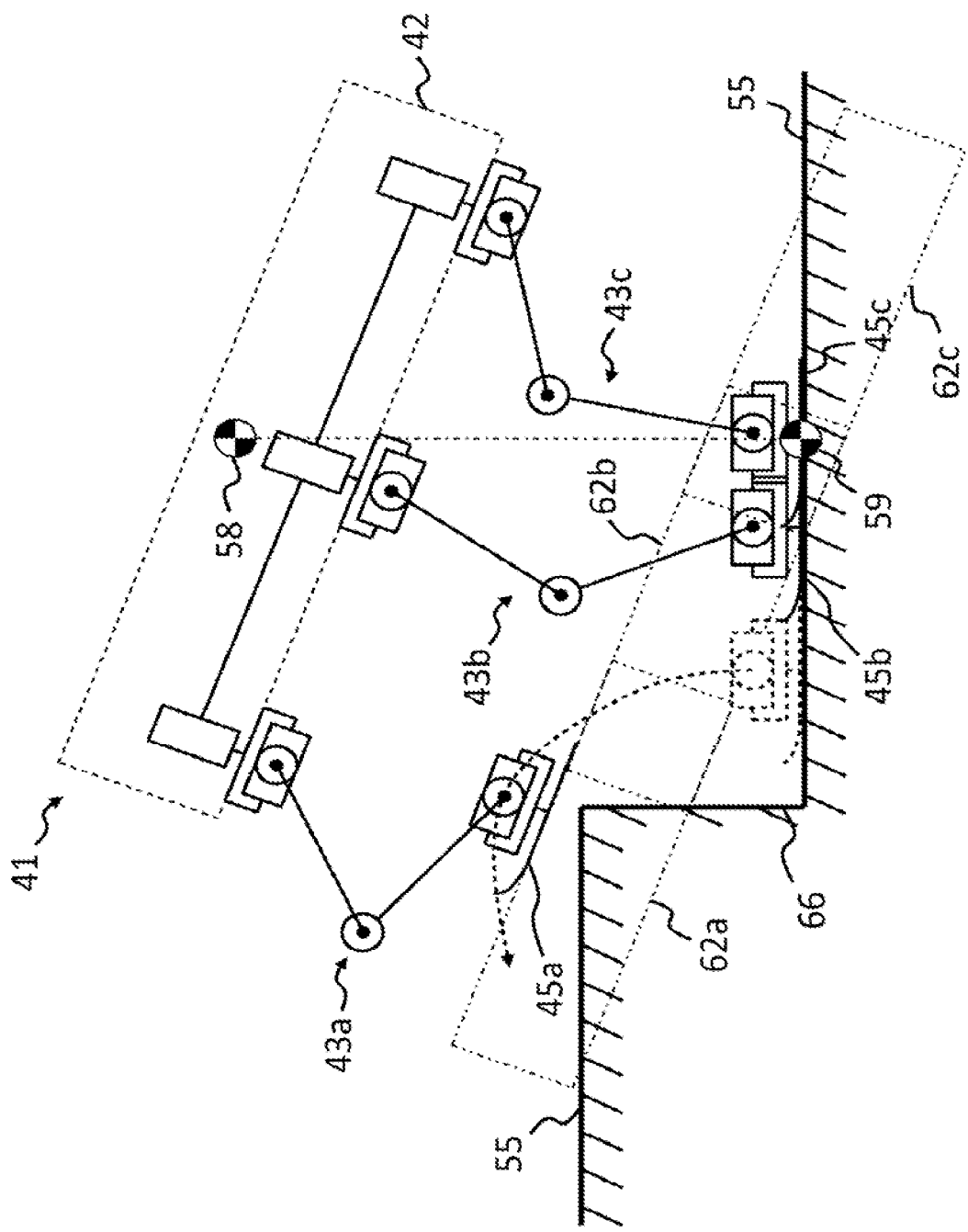
FIG. 13 illustrates a single track or in-line legged mobile robot lifting itself on the middle and rear legs while simultaneously lifting the front foot off the ground and repositioning it beyond a vertical or step gradient.
Figure 14:
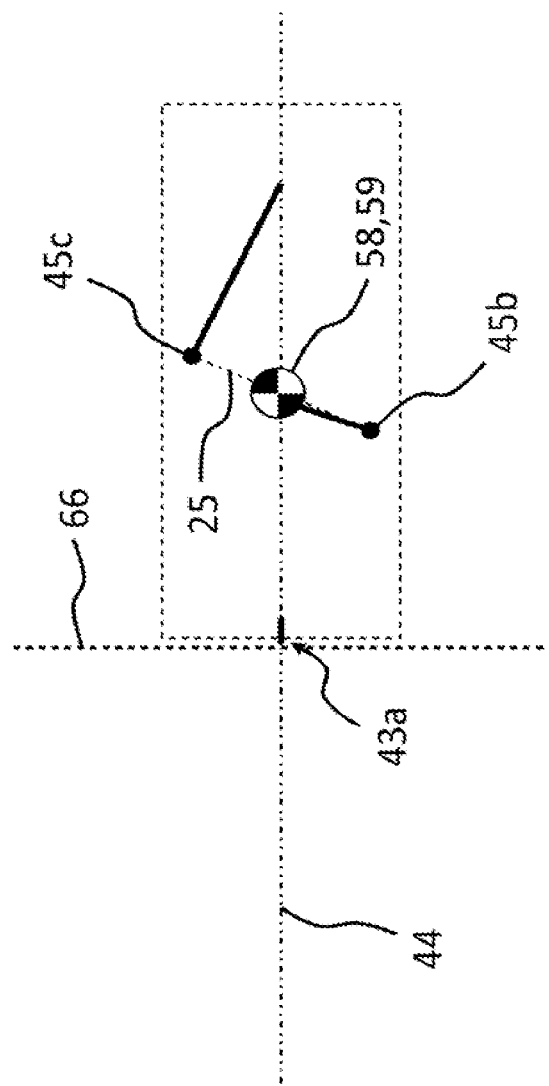
FIG. 14 illustrates a top schematic view illustrating center of gravity, placement of the feet, and resulting area of support for the single track or in-line three legged mobile robot illustrated in FIG. 13.
Figure 15:
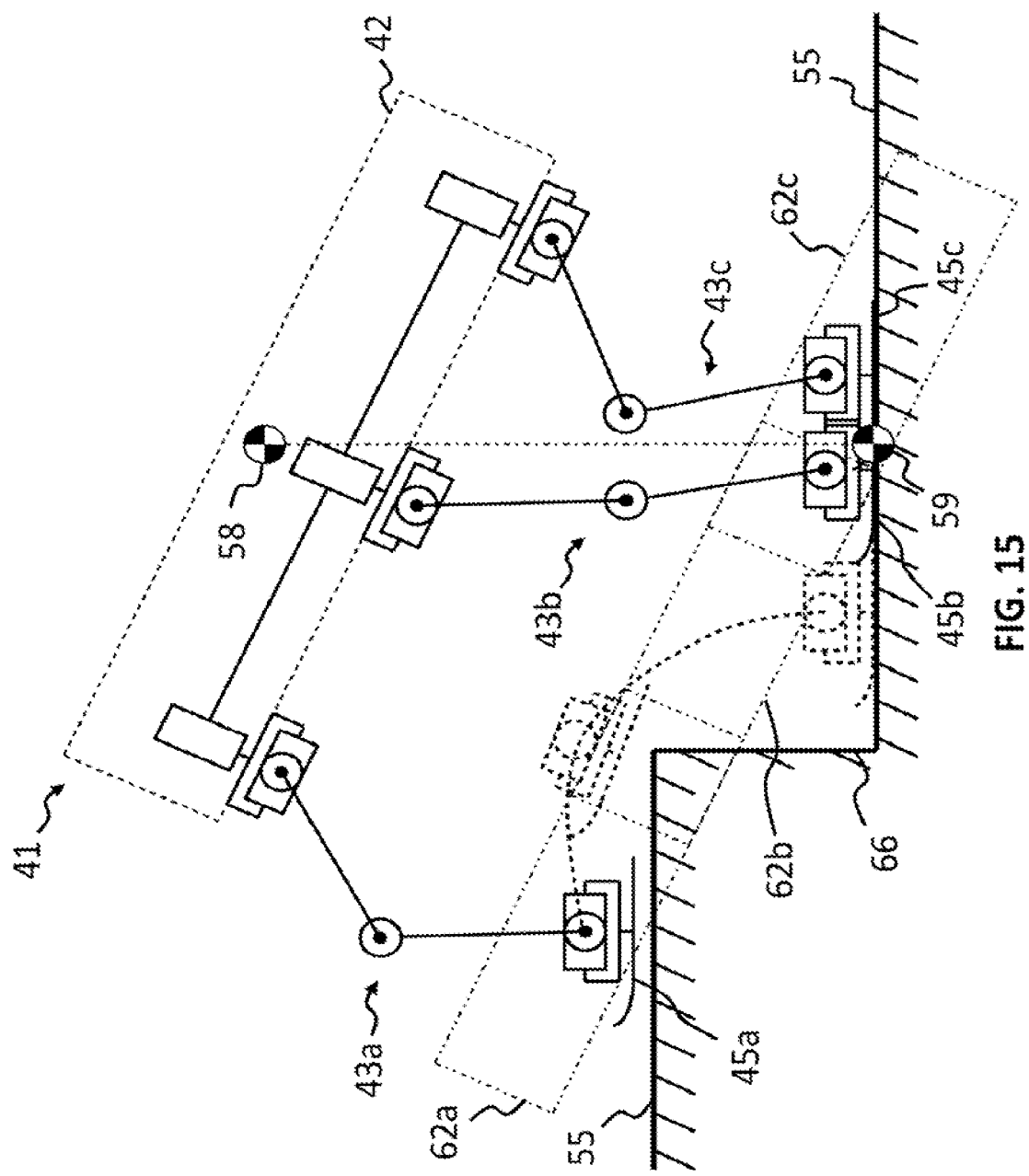
FIG. 15 illustrates a single track or in-line legged mobile robot shifting its body and thus its projected center of pressure on the middle and rear legs to move the body and thus the front foot forward, while maintaining balance in a biped stance.
Figure 16:
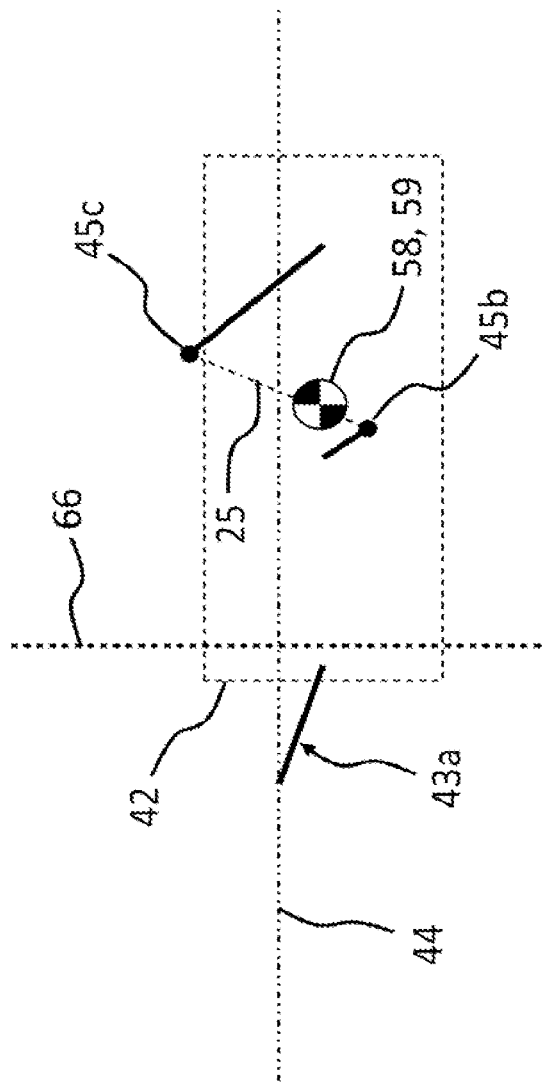
FIG. 16 illustrates a top schematic view illustrating center of gravity, placement of the feet, and resulting area of support for the single track or in-line three legged mobile robot illustrated in FIG. 15.
Figure 17:
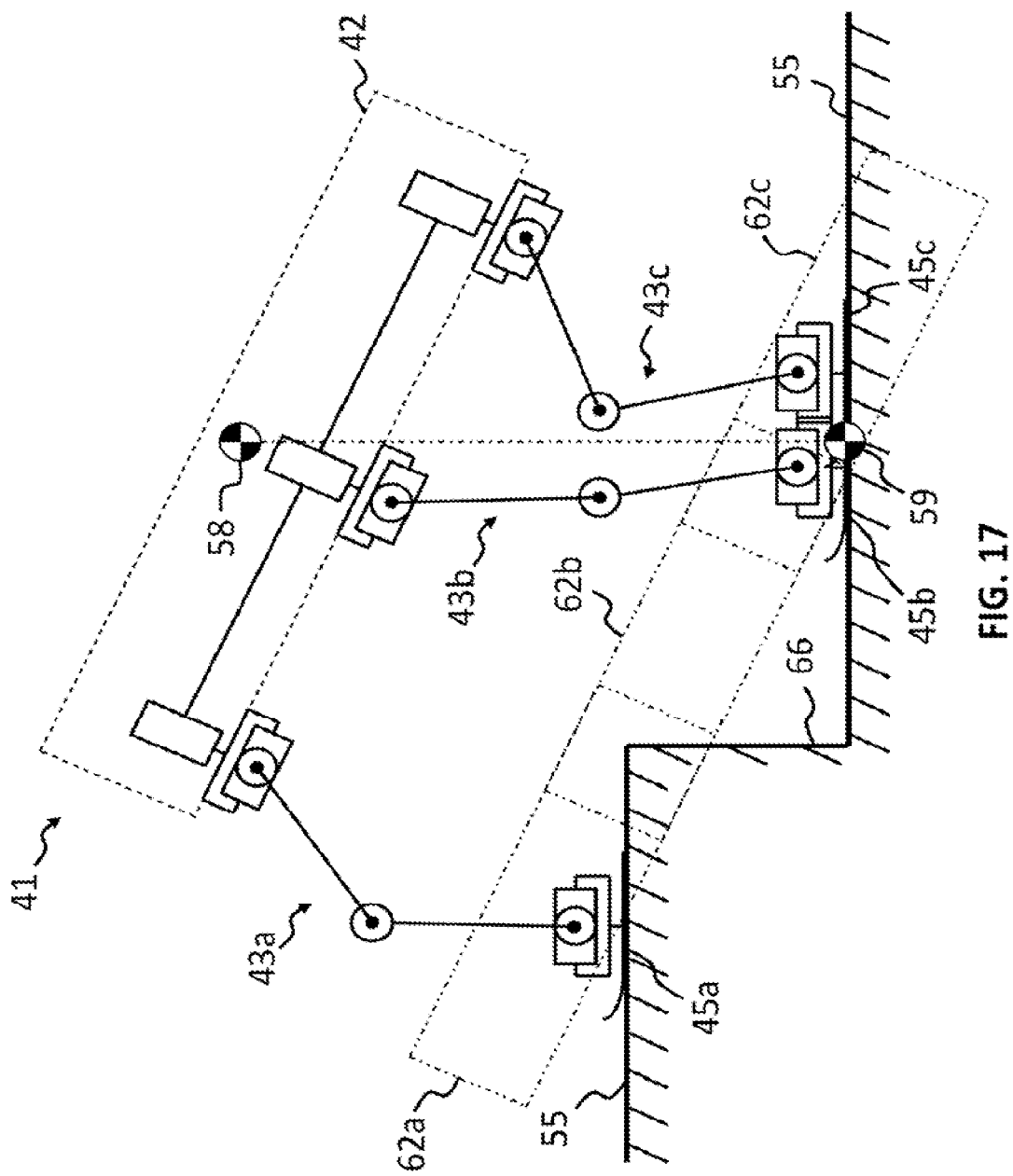
FIG. 17 illustrates, and in particular the upper right insert, shows a single track or in-line legged mobile robot placing the front foot on the upper ground and reestablishing the triangular three-point contact support pattern.
Figure 18:
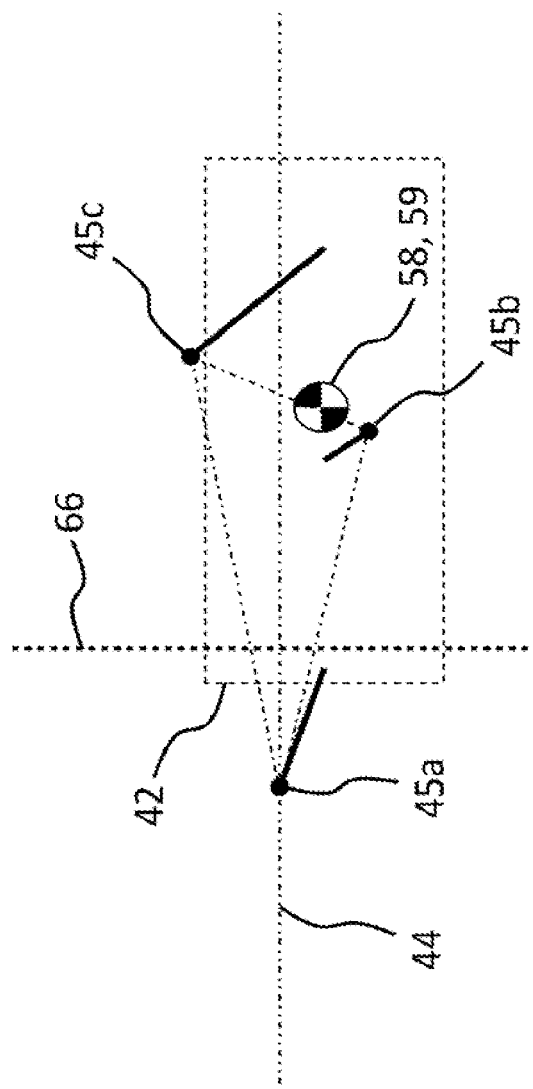
FIG. 18 illustrates a top schematic view illustrating center of gravity, placement of the feet, and resulting area of support for the single track or in-line three legged mobile robot illustrated in FIG. 17.

Next, FIGS. 13-14 show the single track or in-line legged mobile robot 41 lifting itself on the middle and rear legs 43 while simultaneously lifting the front foot 45a off the lower ground 55 and repositioning it beyond the vertical or step gradient 66 to be above the upper ground 55. Feet 45b and 45c are in a bipedal-like stance along the zero moment line 25 intersecting the center of pressure 59. Lifting the body 42 is necessary to raise the working range 62a to above the level of the upper ground 55. The body 42 is lifted vertically until the middle foot 45b reaches the bottom of the working envelope 61b. Note again that there is still some margin between the working range 62b and the maximum working envelope 61b (not shown for clarity) to provide a safety margin for external dynamic events, such as a force imparted by a rider or the wind. This note is typical for further maneuvers and will not be re-noted for readability. FIGS. 15-16 shows the single track or in-line legged mobile robot 41 shifting its body 42 and thus its projected center of pressure 59 on the middle and rear legs 43 to move the body 42 and thus the front foot 45a forward, while maintaining balance by keeping the center of pressure 59 along the zero moment line 25 that bisecting the centers of the middle foot 45b and rear foot 45c. Note that in the case where all three legs are in contact with the ground, as in the stance phase of a wave gait, a similar shift of the body 42 is used to maintain balance, and the legs 43 may be successively repositioned in a similar manner such that the body 42 moves sideways. This method of shifting the body 42 and legs 43 allows the legged mobile robot 41 to move omnidirectionally. FIGS. 17-18, and in particular FIG. 18, show the single track or in-line legged mobile robot 41 placing the front foot 45a on the upper ground 55 and reestablishing the triangular three-point contact support pattern. At this time, any dynamic instability arising from, for example, measurement errors or external dynamic forces, acting on the bipedal stance are counteracted or reset by the more supportive tripod stance.

Figure 19:
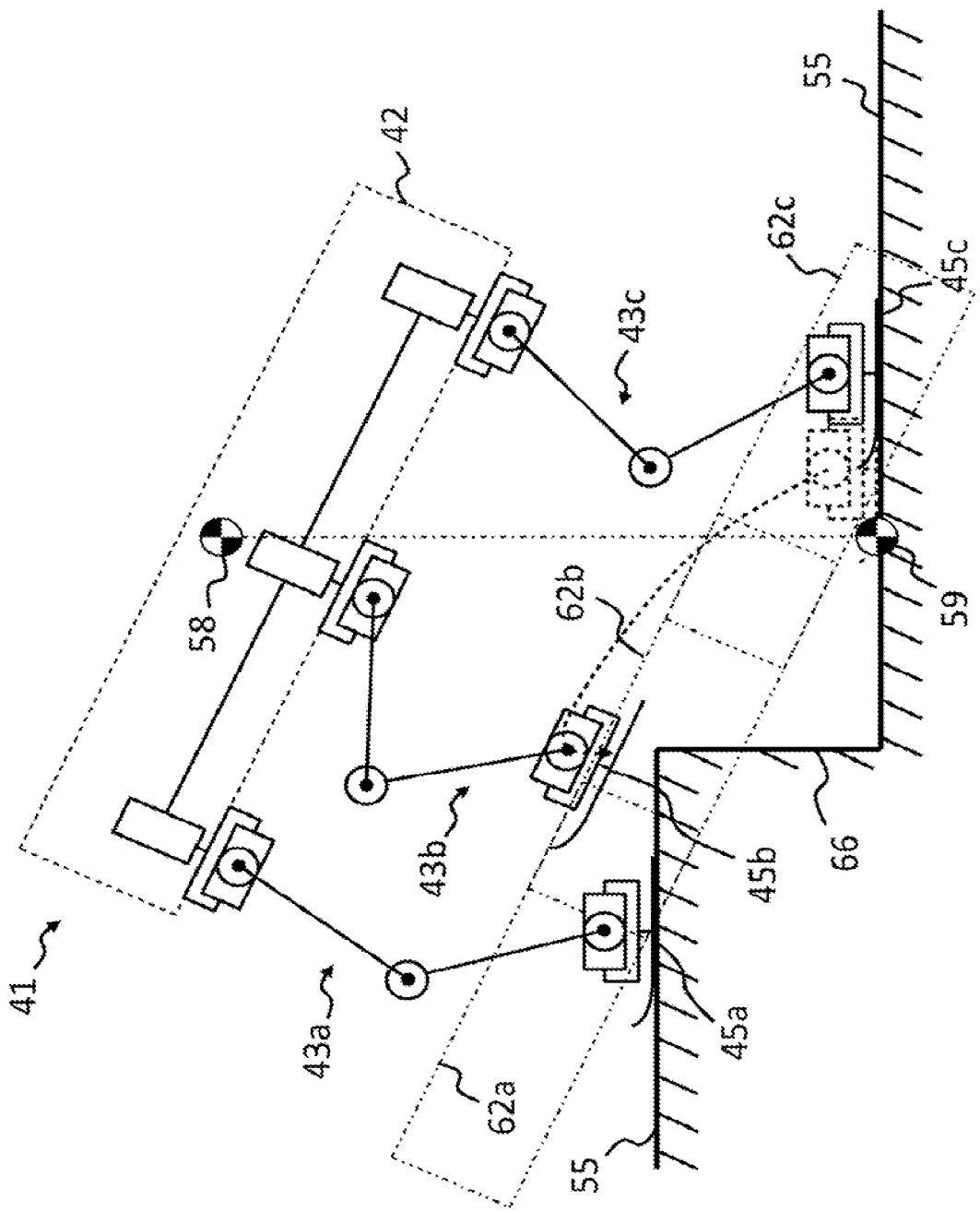
FIG. 19 illustrates a single track or in-line legged mobile robot moving forward and shifting the center of pressure to along the zero moment line that bisects the centers of the front foot and rear foot to afford the legged mobile robot to lift the middle foot while maintaining stability of balance in a biped stance.
Figure 20:
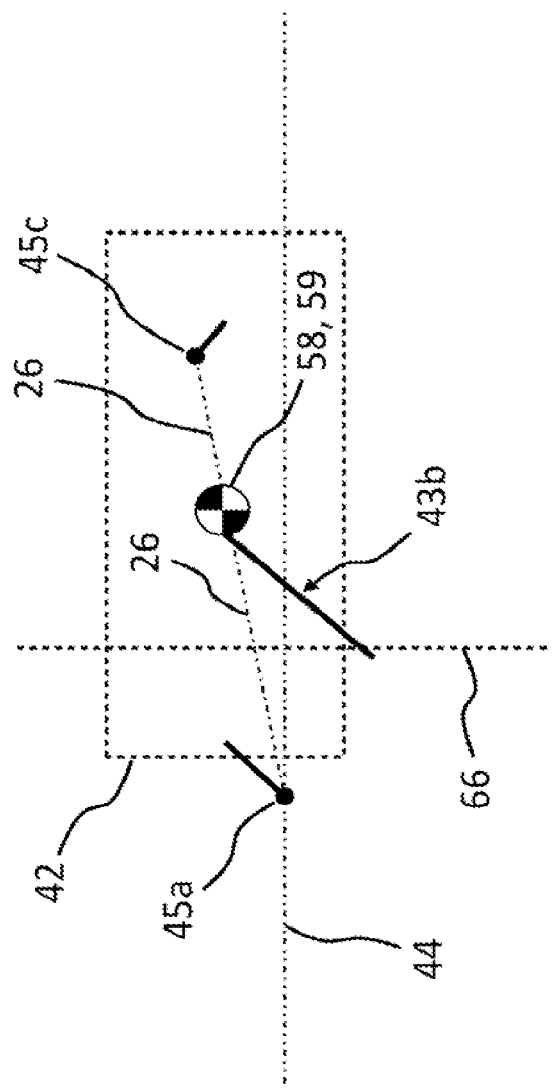
FIG. 20 illustrates a top schematic view illustrating center of gravity, placement of the feet, and resulting area of support for the single track or in-line three legged mobile robot illustrated in FIG. 19.
Figure 21:
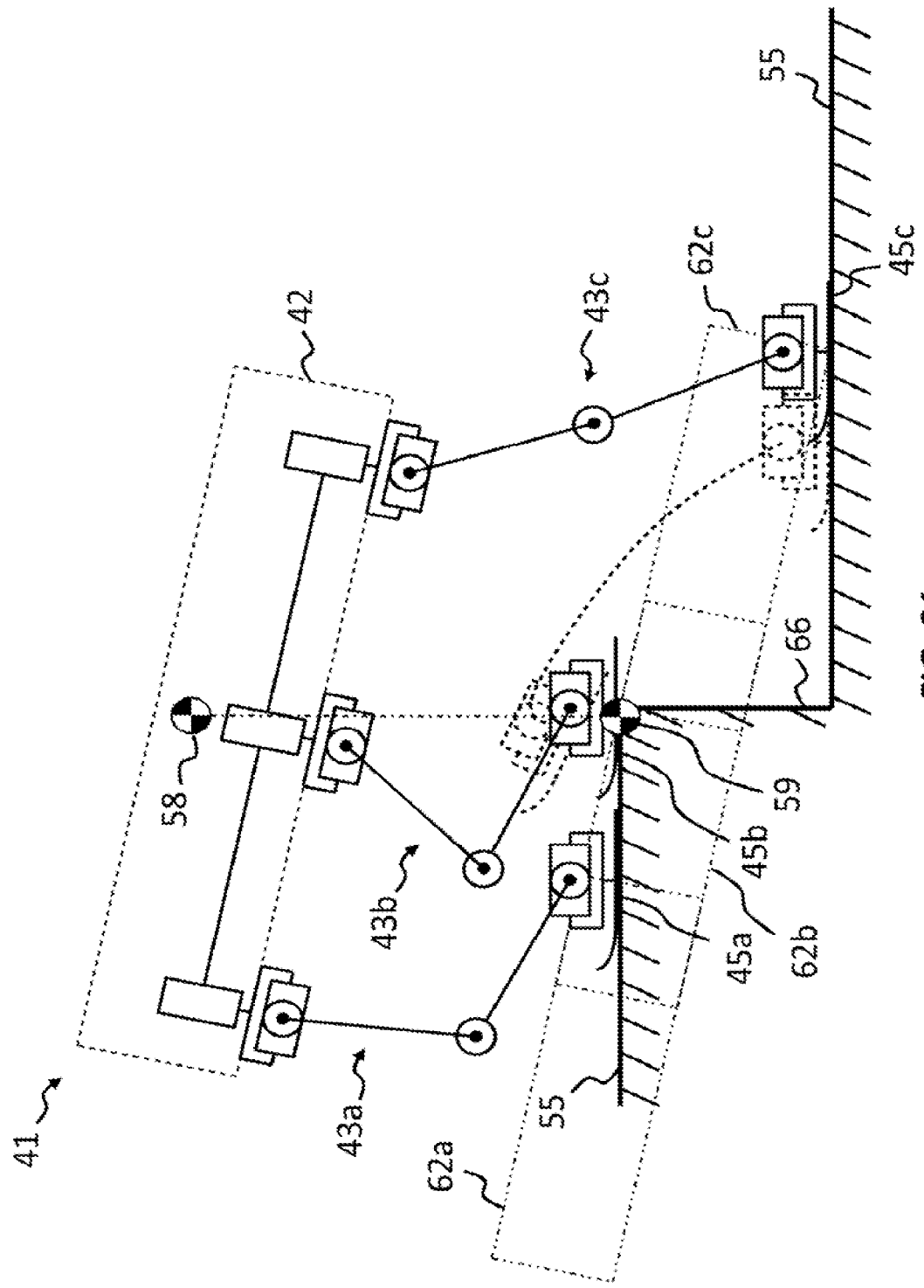
FIG. 21 illustrates the middle foot contacting the ground, and a single track or inline legged mobile robot reestablishing the triangular three-point contact support pattern.
Figure 22:
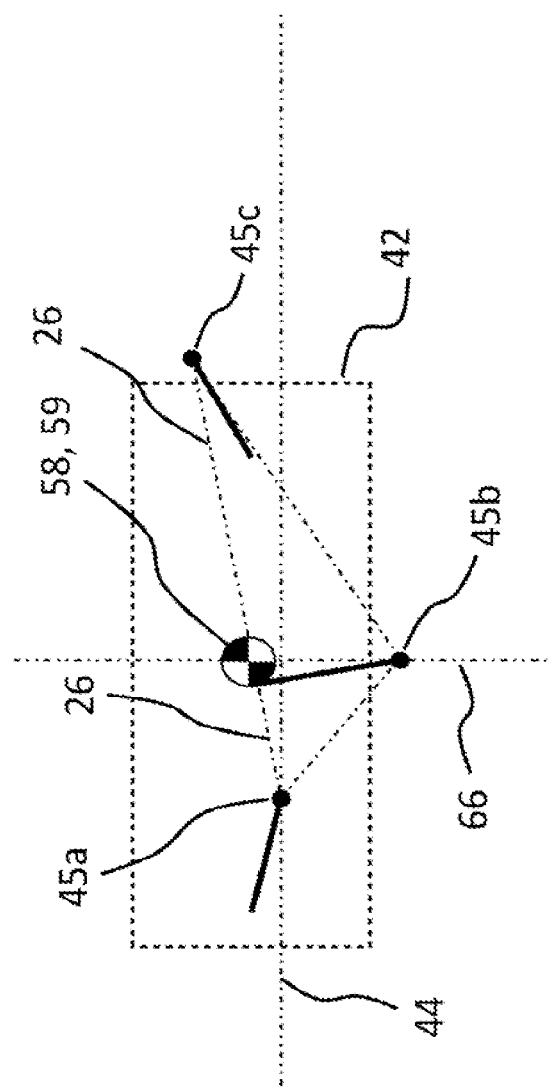
FIG. 22 illustrates a top schematic view illustrating center of gravity, placement of the feet, and resulting area of support for the single track or in-line three legged mobile robot illustrated in FIG. 21.

Next, FIGS. 19-20 show the single track or in-line legged mobile robot 41 moving forward and shifting the center of pressure 59 to along the zero moment line 26 that bisects the centers of the front foot 45a and rear foot 45c to afford the legged mobile robot 41 to lift the middle foot 45b while maintaining stability of balance by the front leg 43a and rear leg 43c in a biped stance. Note that in any dynamic system, the momentum imparted by moving the body 42 forward and shifting is taken into account by the control unit 86 such that the middle leg may be lifted off the ground sooner than the static case of when the center of pressure 59 must reach the zero moment line 26 that bisects the centers of the front foot 45a and rear foot 45c to maintain static stability of balance. As such, the center of pressure may only approach the zero moment lines 25, 26, 29 but may not reach it before subsequent foot steps are made. The middle foot 45b is positioned above the upper ground 55 and forward of the vertical or step gradient. FIGS. 21-22 then show the middle foot 45b contacting the ground, and the single track or in-line legged mobile robot 41 reestablishing the triangular three-point contact support pattern. At this time, any dynamic instability arising from, for example, measurement errors or external dynamic forces, acting on the two-leg, bipedal stance are counteracted or reset by the more supportive tripod stance.

Figure 23:
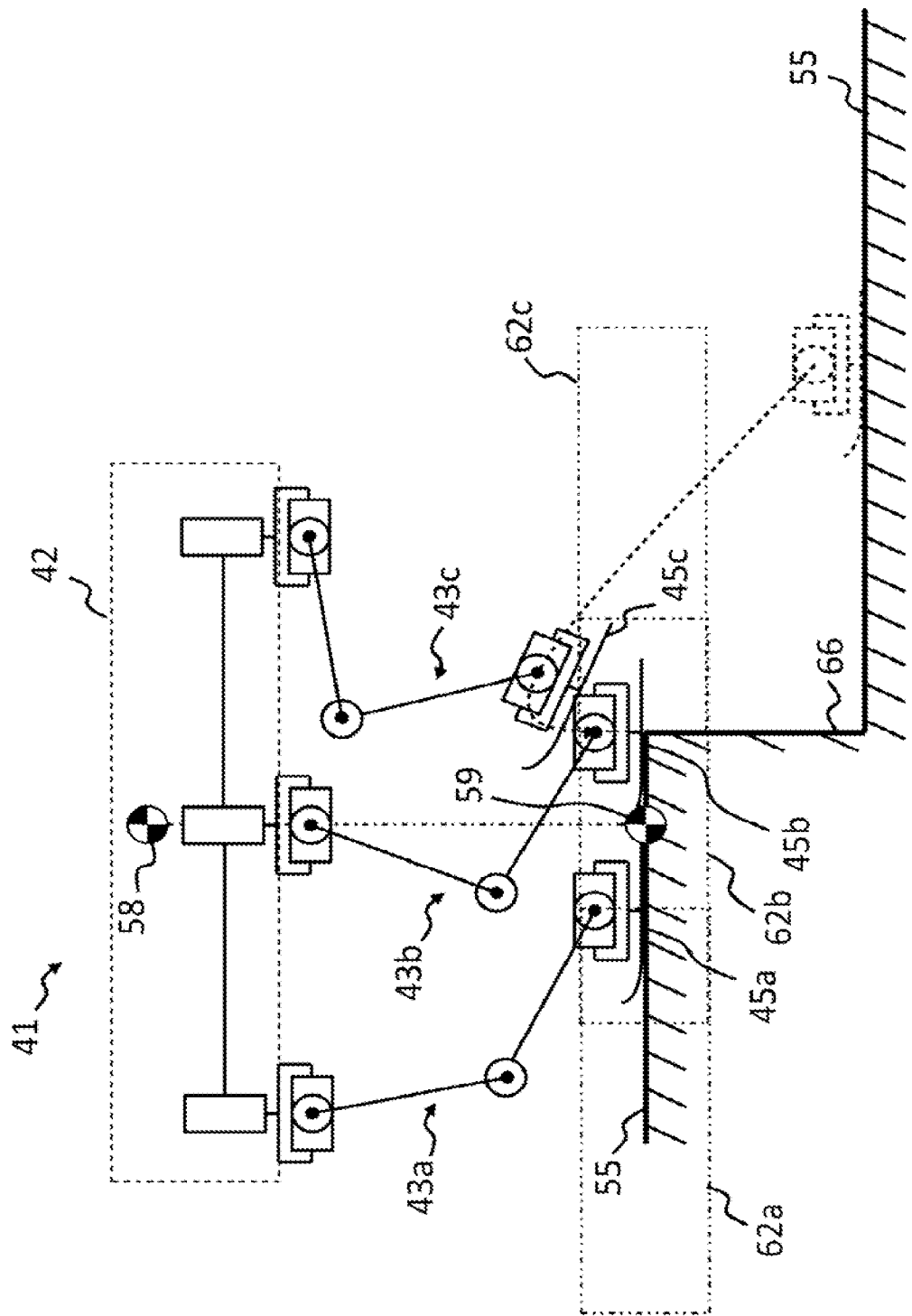
FIG. 23 illustrates a single track or in-line legged mobile robot moving forward and shifting the center of pressure to along the zero moment line that bisects the centers of the front foot and middle foot to afford the legged mobile robot to lift the rear foot, while maintaining stability of balance in a biped stance.
Figure 24:
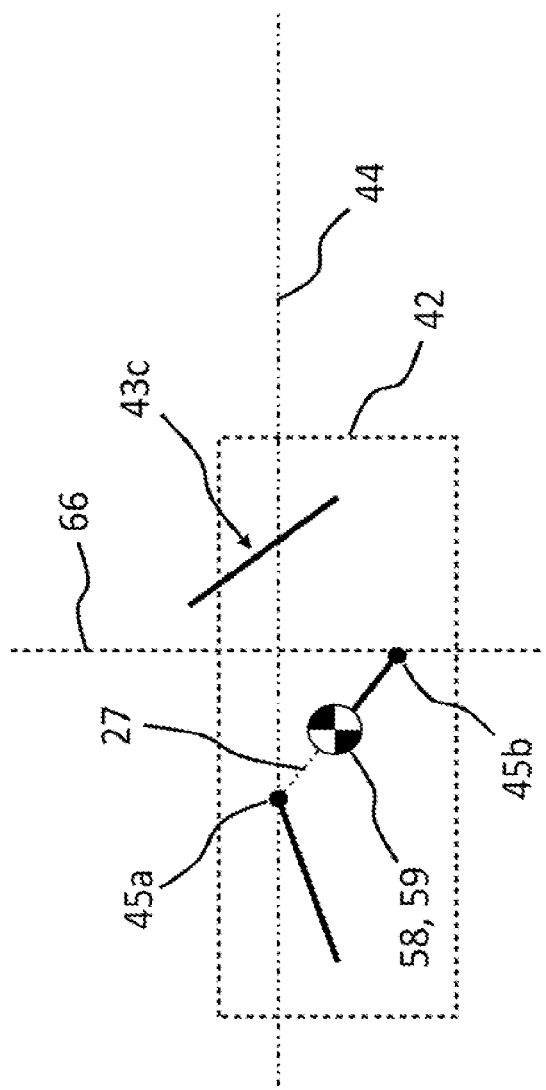
FIG. 24 illustrates a top schematic view illustrating center of gravity, placement of the feet, and resulting area of support for the single track or in-line three legged mobile robot illustrated in FIG. 23.
Figure 25:
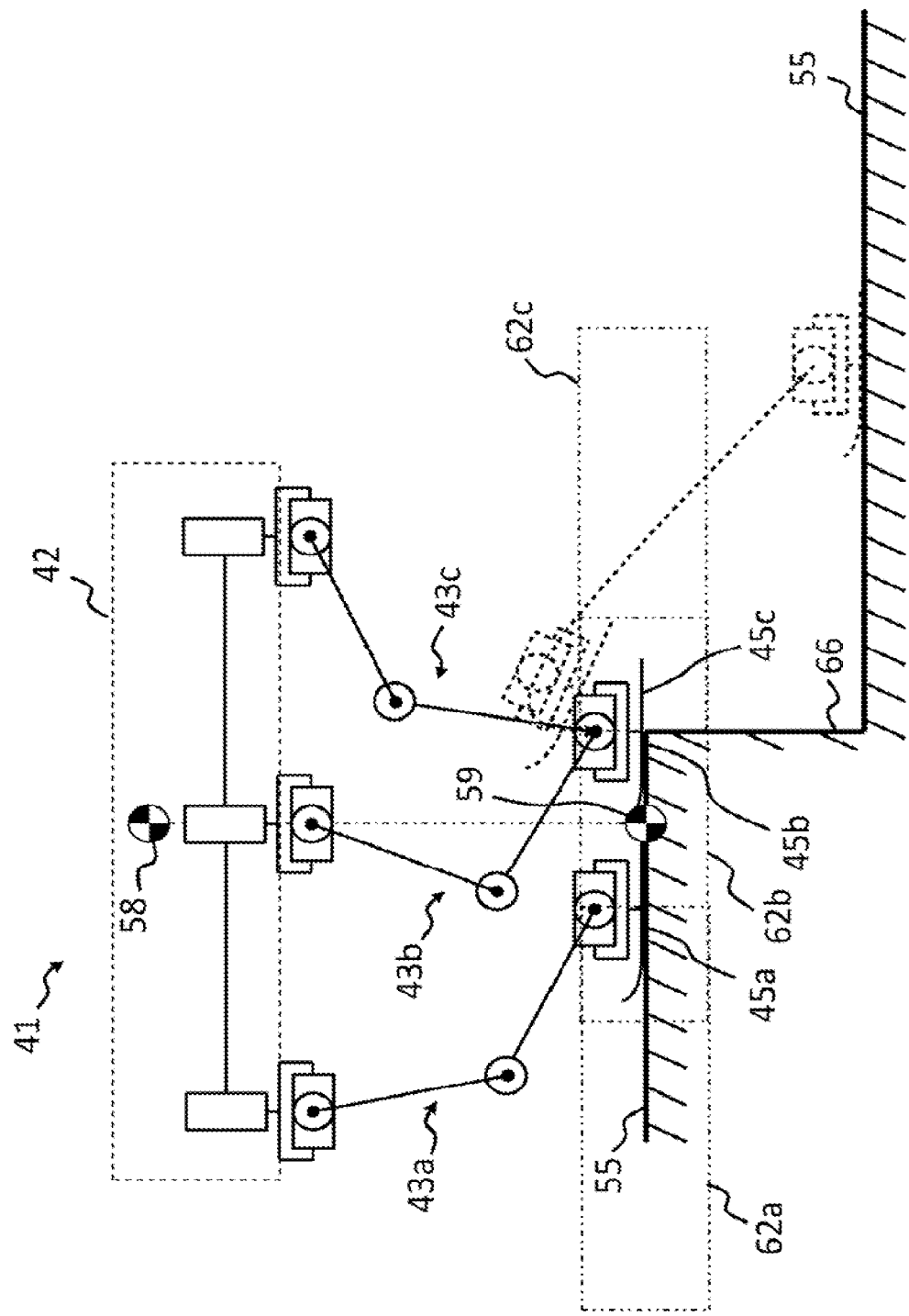
FIG. 25 illustrates the rear foot contacting the ground, and a single track or inline legged mobile robot reestablishing the triangular three-point contact support pattern.
Figure 26:
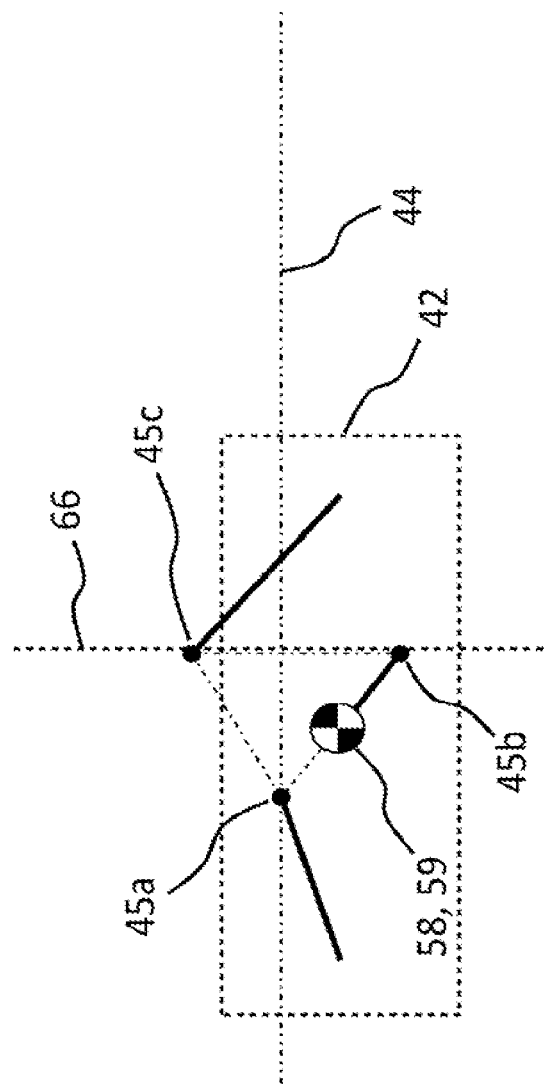
FIG. 26 illustrates a top schematic view illustrating center of gravity, placement of the feet, and resulting area of support for the single track or in-line three legged mobile robot illustrated in FIG. 25.

Next, FIGS. 23-24 show the single track or in-line legged mobile robot 41 moving forward and shifting the center of pressure 59 to along the zero moment line 27 that bisects the centers of the front foot 45a and middle foot 45b to afford the legged mobile robot 41 to lift the rear foot 45c while maintaining stability of balance by the front leg 43a and middle leg 43b in a biped stance. The body 42 is rotated to a level posture while rear foot 45c is simultaneously positioned above the upper ground 55 and forward of the vertical or step gradient. FIGS. 25-26 then show the rear foot 45c contacting the ground, and the single track or in-line legged mobile robot 41 reestablishing the triangular three-point contact support pattern. At this time, any dynamic instability arising from, for example, measurement errors or external dynamic forces, acting on the two-leg, bipedal stance are counteracted or reset by the more supportive tripod stance.

Figure 27:
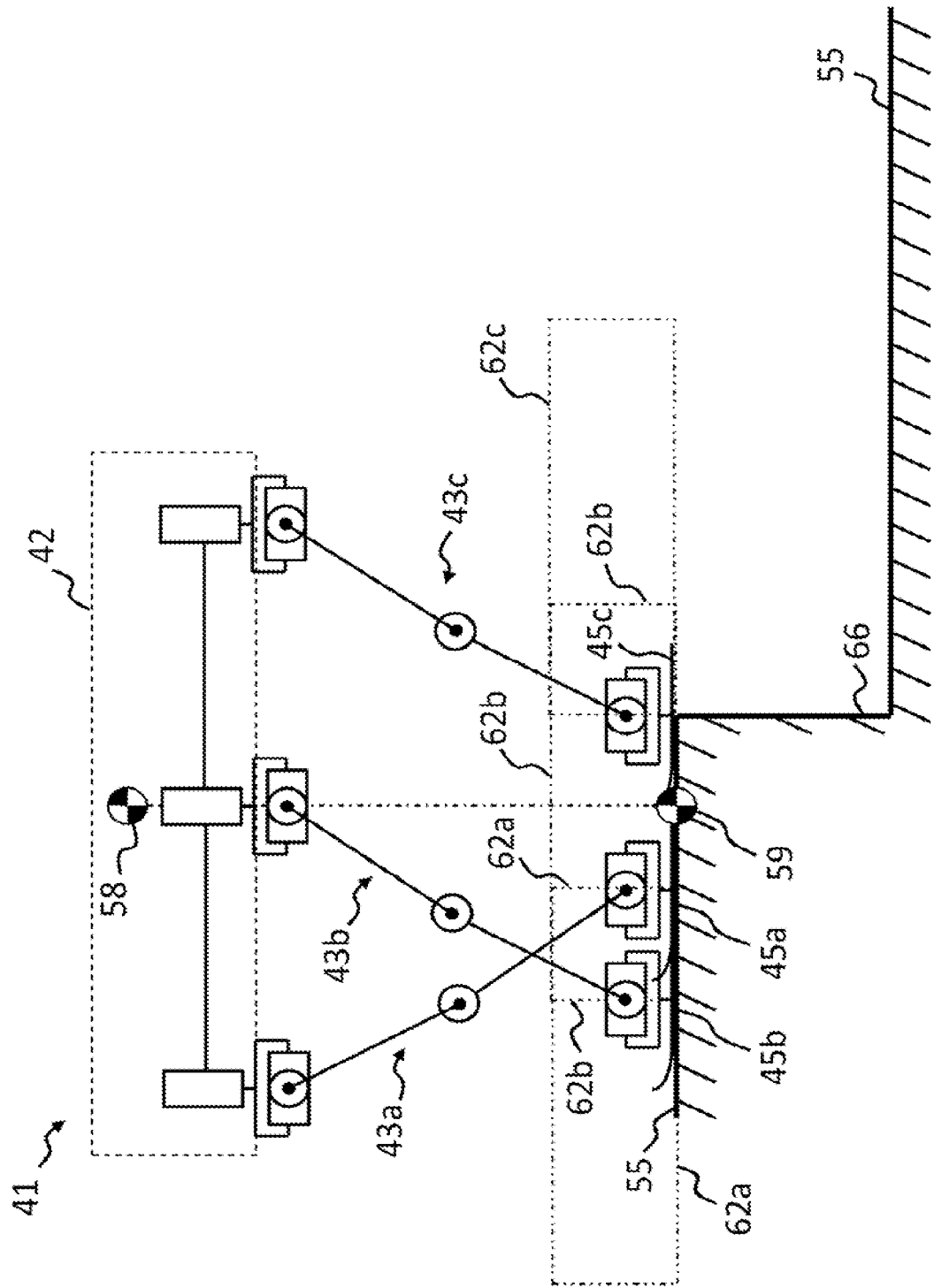
FIG. 27 illustrates the lifting of the body and repositioning of the middle leg in preparation to begin a walking cycle.
Figure 28:
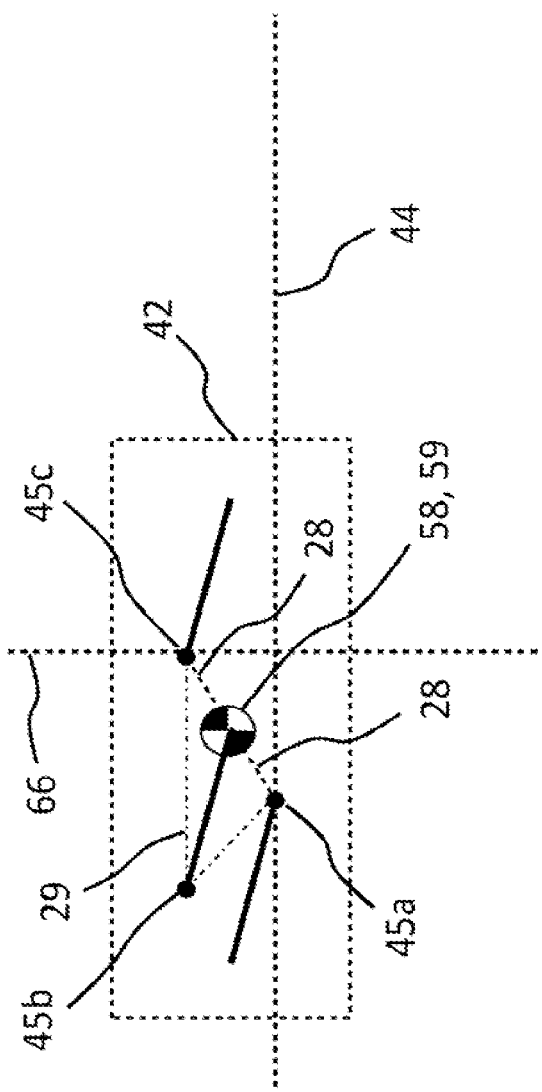
FIG. 28 illustrates a top schematic view illustrating center of gravity, placement of the feet, and resulting area of support for the single track or in-line three legged mobile robot illustrated in FIG. 27.

Next, FIGS. 27-28 show the lifting of the body 42 and repositioning of the middle leg 43b in preparation to begin a walking cycle on the upper ground 55. The body 42 is shifted such that the center of pressure 59 is repositioned to along the zero moment line 28 that bisects the centers of the front foot 45a and rear foot 45c to afford the legged mobile robot 41 to lift the middle foot 45b while maintaining stability of balance by the front leg 43a and rear leg 43c in a biped stance. The legged mobile robot would then shift the center of pressure 59 over to along or near the zero moment line 29 that bisects the centers of the middle foot 45b and rear foot 45c and reposition the front foot 45a to the forward most position while simultaneously moving the body 42 forward. Forward motion is then maintained by any number of gaits, such as for example a backward wave gait, discussed later.

Figure 29:
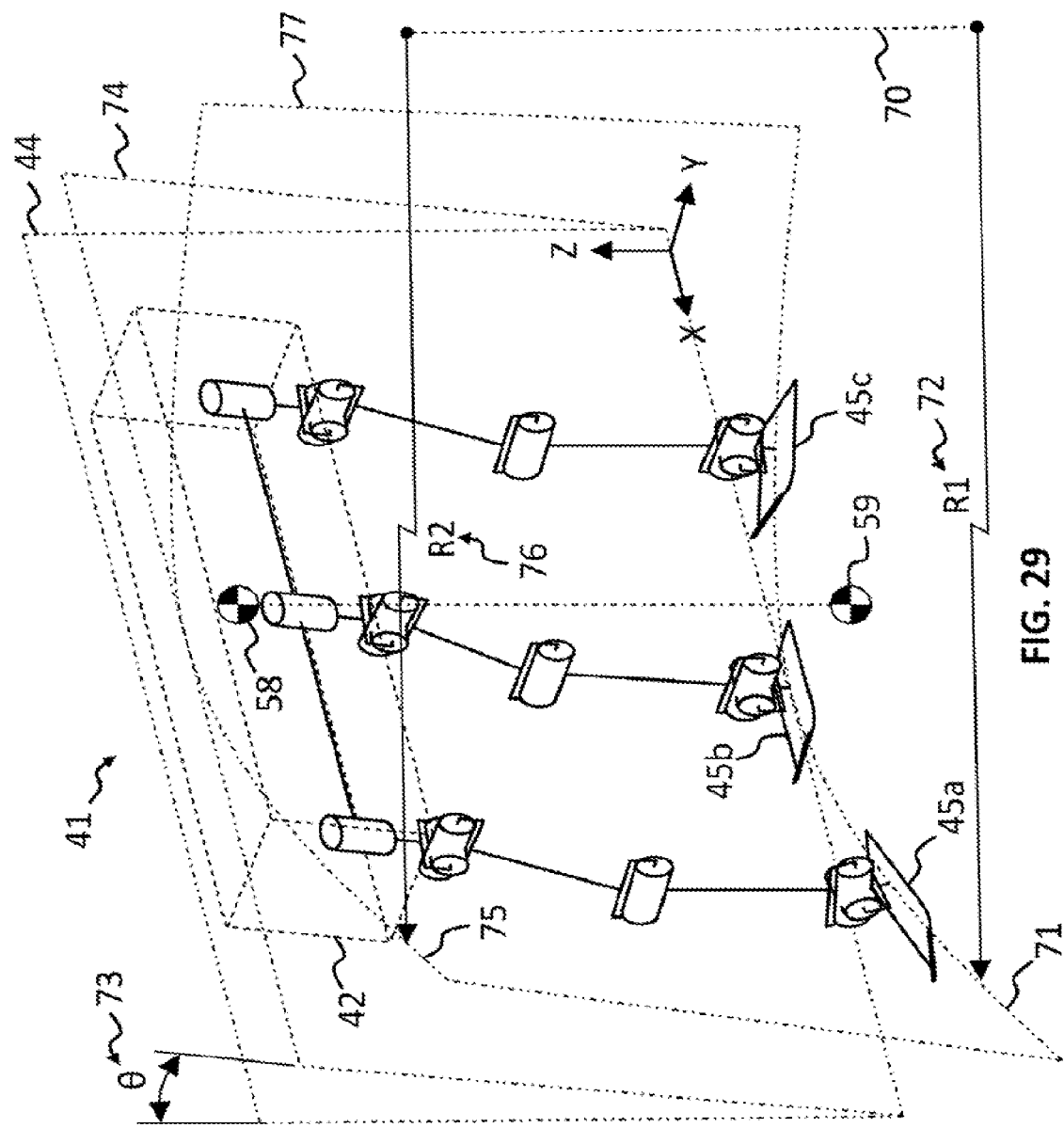
FIG. 29 illustrates a perspective skeletal view of a single track or in-line three legged mobile robot executing a single-track leaning turn.
Figure 30:
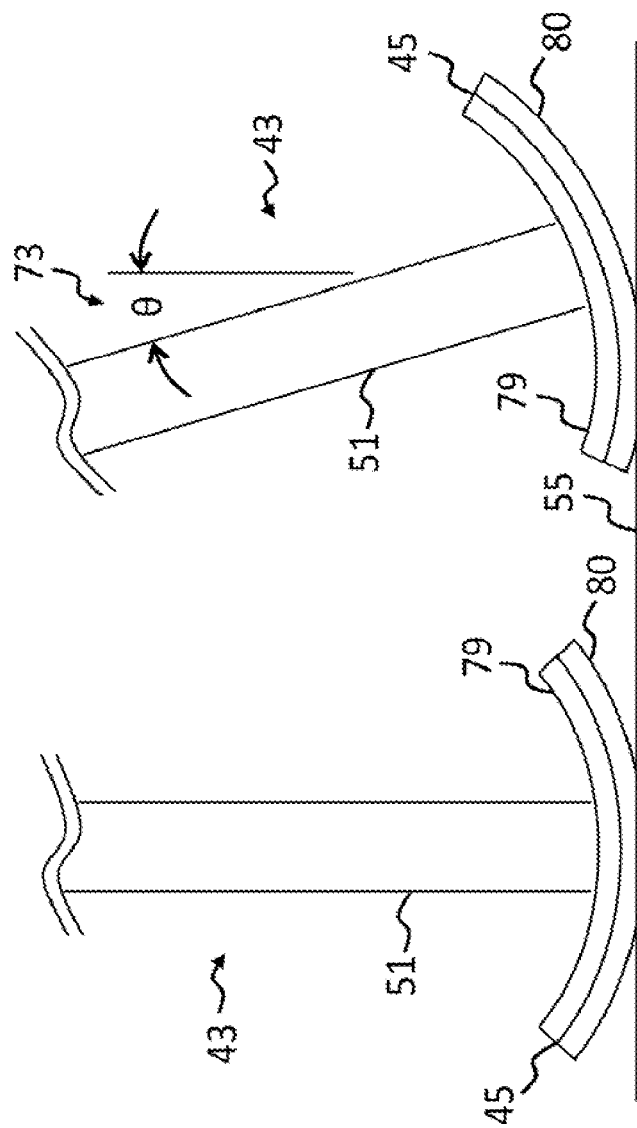
FIG. 30 illustrates a parabolic shaped foot to maintain constant surface area contact with the ground during a single-track leaning turn.

Referring now to FIGS. 29-30 and as was previously mentioned, dynamic momentum plays an important role in maintaining the stability of balance of dynamic or moving systems. Like wheeled motorcycles and bicycles, FIG. 29 shows the legged mobile robot 41 executing a single-track turn whereby the body 42 is spatially and angularly displaced from the normal plane of operation 44, called "leaning into the turn", such that the center of gravity 58 and projected center of pressure 59 is moved towards the center of curvature 70 thus developing a torque about the roll axis 54 (not shown for clarity but refer to the feet 45) that counteracts the outward centripetal inertial force acting on the center of gravity 58 of the body 42. In leaning into a turn, the feet 45 are following a single track or in-line curve 71 of radius 72 about the center point 70 normal to the ground 55, and the body 42 is leaning with angle theta 73 between the normal reference plane 44 and the projected plane 74 tangent to the single track or in-line curve 71 on the ground 55 and through the center of gravity 58 and parallel to the body 42 length. The top of the body thus follows a second curve 75 of smaller radius 76 about the projected center point 70 normal to the ground such that the resulting plane of motion 77 is a truncated cone. The legged mobile robot 41 is able to lean into a turn like wheeled motorcycles and bicycles but with the advantage of a narrow profile along the direction of motion and the ability to choose discrete foot holds for the feet 45. This design and method is highly important so that a legged machine can achieve a high-speed turn and dynamic turns over rugged terrain not heretofore accomplished by legged mobile robots.

Referring again to FIG. 29, forward motion is achieved by any number of gaits, such as for example a wave gait, discussed later, whereby each foot 45 is repositioned along the desired single track or in-line curve 71 with minor variation in radius 72 to achieve stability of balance. A more aggressive gait, such as for example the leg crossover motion used by ice skaters where curve 71 is a piece-wise combination of curves of different radius and center point to achieve the overall desired motion of body 42. Such aggressive gaits would find use on lose ground or slippery surfaces, because for each piece-wise curve each leg 43 would not only develop an outward torque in the direction of slip that would further counteract the outward centripetal inertial force acting on the center of gravity 58 of the body 42 but would incrementally push the body 42 in the desired direction of motion. Furthermore, if bottoms of each of the feet 45 were ice skating blades, a piece-wise curve would develop force in the forward direction to propel the legged mobile robot 41 in the forward direction.

Referring now to FIG. 30, it will be readily apparent by those skilled in the art, from an inspection of the drawings, that the feet 45 need not be positioned co-planar with the ground using an ankle mechanism 52 and 53. Rather, FIG. 30 illustrates the front view, in both the left and right sides, a preferred embodiment of the foot 78 wherein the shape of the lateral (the axis perpendicular to the major direction of travel) cross section of the foot is parabolic 79 to maintain constant surface area contact with the ground as the single track or in-line legged mobile robot 41 is leaned into the turn (illustrated right). Further, a semi-rigid but elastically compliant material, such as rubber, may be used for the foot surface 80 to further improve contact surface area between the robot foot and ground, especially given any naturally occurring minor surface irregularities.

Referring now to FIGS. 31, 32, 33A and 33B, the individual ankles 52 and 53 of the leg 43 of the legged mobile robot 41 are shown with a six dimensional force and torque sensor 81 of conventional design. By measuring the x, y and z force components Fx, Fy and Fz transmitted to the legged mobile robot 41 through the feet 45 and also measuring the moment components Mx, My and Mz around the three axes, the six-dimensional force and torque sensor 81 detects whether or not the associated foot 45 has landed and the magnitude and direction of the forces acting on the supporting leg 43. The body 42 may be provided with a three-dimensional inclination sensor 82, called an inertial measurement unit or IMU, rigidly connected by mount 83 that is ultimately connected to leg mounts 56 and 57, not shown for clarity. The IMU is sometimes also referred to as an inertial navigation system or INS. An INS combines the IMU with complementary filters and kinematic proprioceptive information (body height, center of pressure, zero moment point, etc.) to provide more accurate dynamic information. The IMU 82 measures the robot's three-dimensional (roll, pitch, and yaw) angle, angular velocity, and angular acceleration relative to z axis in the x-z reference plane 44, y-z plane, and ground (x-y) plane 55, not shown for clarity.

Accurate sensing of roll angles and angle rates is required to balance the present invention. Most known methods to balance legged or inverted pendulum type mobile robots uses gyroscopes, accelerometers, tilt sensors, and potentiometer or encoder-based leg joint angle measurement. A sensor fusion approach may be used for computing absolute orientation and rotation in real-time by combining angle rate data from a micro-electro-mechanical systems vibrating structure gyroscope, or MEMS gyro for short, with absolute angle data from statistical image processing of a visual scene. A Kalman filter is used to fuse and smooth multiple sensor input. The accuracy of the combined system exceeds that of either sensor used alone. MEMS Gyro drift error may be compensated while preserving a high response rate.

Figure 31:
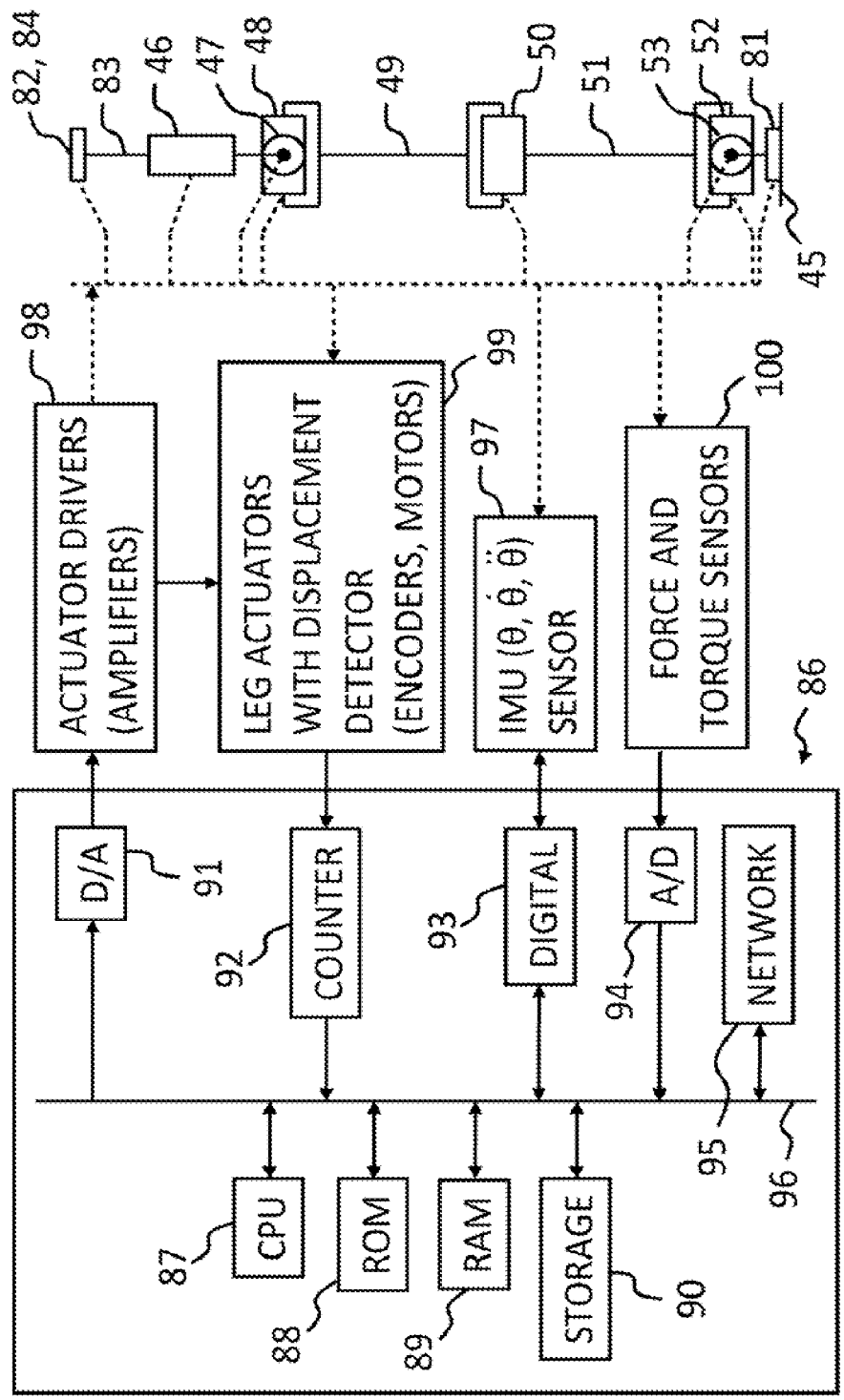
FIG. 31 illustrates a schematic skeletal view of a single leg of illustrating the fundamental feedback and control system of a single track or in-line multi legged mobile robot.
Figure 32:
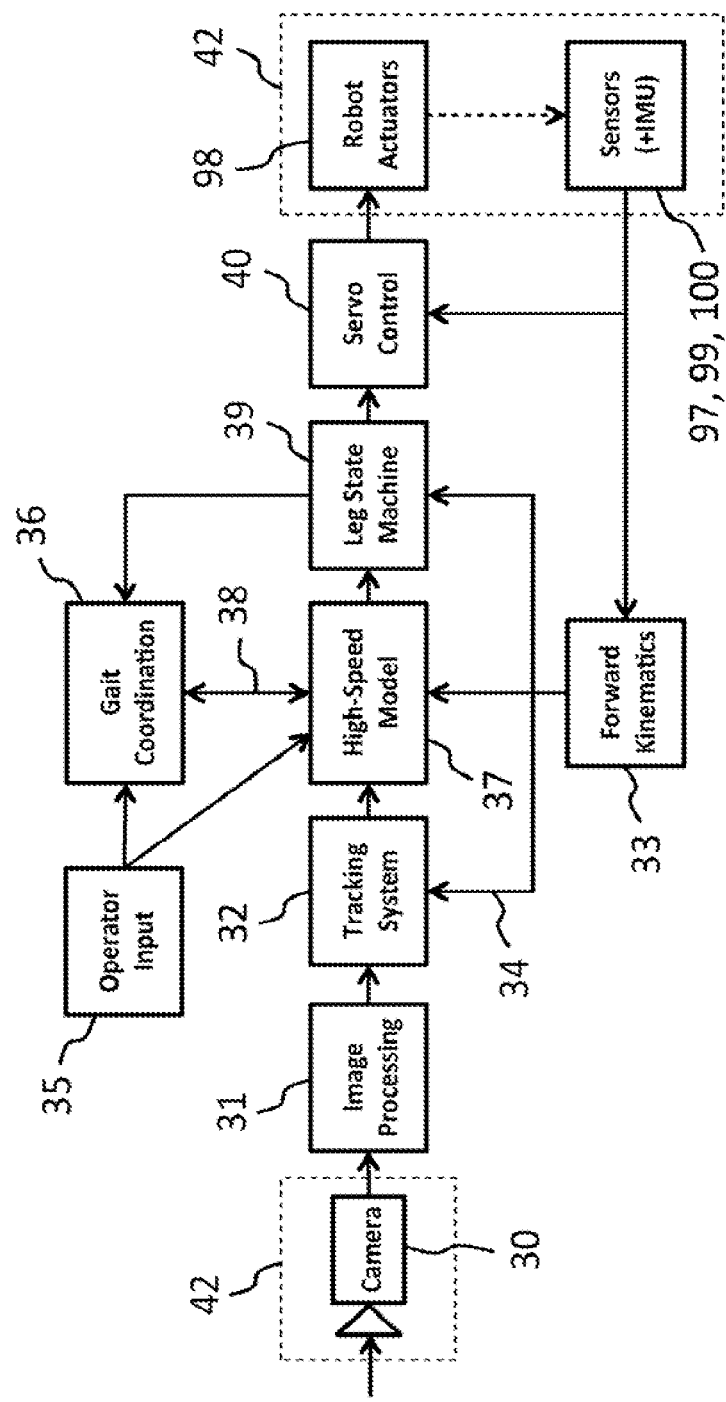
FIG. 32 illustrates a data flow model of an example control system for the in-line multi legged mobile robot.

In one embodiment and referring to FIGS. 31 and 32, the present invention uses a model-based predictive control system for mobile robot balance and path planning The system includes a camera module 30 mounted to the frame 42 for sensing distant objects and image processor module 31 for analyzing road preview data corresponding to the spatial locations of foothold areas located ahead of the robot. The foothold areas are tracked using a temporal tracking module 32 that uses joint and body angles and rates from sensor 97, 99, and 100, mounted to frame 42, processed by a forward kinematics module 33 to determine the six-axis body position, velocity, and acceleration 34. A control signal comprising steering angle, forward velocity, and vehicle height is input via a operator input module 35 to a gait coordination module 36 and high-speed model 37. The gait coordination module 36 coordinates the legs/feet motion based on predicted future locations of foothold areas, predicted future robot balance or stability state, and the desired or control command from the high-speed model 37. The high-speed model module 37 is operatively coupled 38 to the gait coordination module 36, the forward kinematic module 33, and the leg state machine module 39 to facilitate real-time control. The leg state machine 39 also receives data from the forward kinematics module 33 and reports real-time leg states to the gait coordination module 36. The tracking system module 32 is configured to predict estimated future locations of the at least one foothold area to simulate multiple robot motion hypothesis for leg/foot placement and trajectory planning in the high-speed model module 37. The high-speed model module 37 operates faster than real-time to enable robot state preview, with respect to all measurable movement and positioning parameters of the robot, given the initial conditions (real-time) of the six-axis body position, velocity, and acceleration 34. The control algorithm may use probabilistic modeling and simulation to produce temporal-based foot trajectory planning action commands to control and coordinate the legs, all in the presence of missing data, latency, translational bias, and/or sensing error.

The high-speed model module 37 predicts a future position or state rather than only using the current-time measurements of the robot. For example, while reactively adjusting step length for the available footholds, forward speed, body height, and duration of ground contact may also be controlled to actively balance legged mobile robot. The legged mobile robot control system may also account for rider-induced perturbations (especially in the roll axis) and mechanical losses in the system.

To implement real-time motion, the future leg state commands from the high-speed model module 37 are verified and validated by the leg state machine module 39 using a fundamental leg four-state cycle model comprising: 1) developing reaction forces, torques, and thrusts in a stance phase wherein leg/foot-to-ground interaction is transferred through the leg to stabilize the frame in the pitch, roll, and yaw axes and to propel the frame in the x, y, and z axes, respectively, the foot/distal end of the leg being generally stationary with respect to the ground during the stance phase and moving generally opposite to the major direction of frame motion, of a monopedal stance, a bipedal stance and a tripedal stance, according to the control system; 2) unloading reaction forces through the leg/foot in a stance-to-flight phase wherein the foot is lifted off the ground, controlling leg velocities, according to the control system; 3) repositioning the leg/foot in a flight phase wherein the distal end of the leg/foot is moved generally in the same direction as the frame and generally at a faster rate, relative to the ground, as the major direction of frame motion, controlling foot placement and leg movement to maintain an upright posture and meet foot placement constraints and desired trajectory requirements for the frame and legged vehicle, according to the control system; and 4) placing the leg/foot to the ground and developing reaction forces, torques, and thrusts in a flight-to-stance phase. A servo control module 40 implements real-time leg position, velocity, and acceleration commands to the actuator system 98, mounted to frame 42 to produce useful work.

It is an object of the present invention to solve the problems associated with performing a lean-into-a-turn maneuver (with respect to the body and primary direction of motion) using the single track or in-line multi-legged mobile robot design. In solving this problem, a model-based predictive control system robotic control system may be used to provide autonomous attitude stabilization control. In the case where all three legs are in contact with the ground, as in the stance phase of a wave gate, the ability to shift one of the legs laterally to affect balance is an advantage or result.

Still referring to FIG. 31, each actuator at the individual joints 46, 47, 48, 50, 52, and 53 is provided with an encoder disposed adjacent to the respective motors for generating sensed kinematic data for actuation control, proposition and posture. As illustrated in FIG. 31, the legged mobile robot 41 is provided with a zero reference switch 84, such as an oil-damped pendulum, for calibrating the output of the IMU 83 and a limit switch 85 for a failsafe to stop motion in the case of overturn. The outputs of the sensors 81, 82, 83, and 85 are sent to the control system 86. The control system 86, which may be synonymous with the control system, is a computer comprising the at least one central processing unit or CPU 87, read only memory or ROM 88, random access memory or RAM 89, data storage 90, such as for example a solid state drive, and input output devices including but not limited to digital to analog converter or D/A 91, digital counter 92, digital interface 93, such as for example a universal serial bus or USB port, analog to digital converter or A/D 94, and network interface 95, such as for example an Ethernet port. All aforementioned devices are connected together by the at least one bus 96. The angle, angle rate or velocity, and angle acceleration 97, from the inclination sensor 83 is communicated to the control unit 87 via the digital interface 93. The D/A output 91 is amplified 98 to control joint actuators 46, 47, 48, 50, 52, and 53 with resulting encoders provide joint angle feedback 99 converted into digital signals by counter 92. Feedback 100 from six dimensional force and torque sensor 81 is input to the A/D 94. The resulting digital values are sent via a bus 96 to RAM 89 for storage.

In a preferred embodiment, the control unit 86 is a low-level or real-time processor primarily responsible for dynamic actions with respect to the ground reaction force, the reaction force produced from gravitational forces and inertial forces. The term "ground reaction force" is used here to mean the resultant force and moment at a point of action obtained as the vector sum of all ground reaction forces acting on the individual legs 43. Specifically, the control unit 86 is responsible for planning and reacting to mechanical feedback, called preflex-dominated control. A preflex is defined as the zero-delay, intrinsic response of a neuromusculoskeletal system to a perturbation and is programmable via pre-selection of muscle activation. Leg preflex, for example, pulls the foot back and lifts it if the force and torque sensor 81 of foot 45 indicates it encounters an unexpected obstacle during a flight phase. Leg pre flex, also for example, causes the leg to push downward if the force and torque sensor 81 of foot 45 indicates that it is not bearing adequate vertical load during touchdown (flight to support transition) or during stance (as in loose ground). Leg pre flex, also for example, causes the relative leg length to be adjusted so the body remains level. These are feed-forward control process, and the robot is stable when the forces acting on it are in dynamic equilibrium.

For realizing preflex-dominated control, the invention provides an improved model-based control system for a legged mobile robot having the at least one model which the control follows. A target gait defines the expected ground reaction force so as to ensure a state of dynamic equilibrium based on the robot's dynamic model, wherein the improvement comprises that manipulated variables are a function of state errors, such as for example where the inclination of the model and the actual legged mobile robot is fed back to the at least one model for modifying its behavior. In this technique, the CPU 87 fetches the at least one model stored in ROM 88 as the basis for coordinating the movement of the various legs 43 and computing target joint angles (joint drive patterns) for legged gaits and behaviors, and various leg stances and trajectories, described later. The actuation signals 98 are then computed using the roll, pitch, and yaw torque sensors 81 and three-dimensional angle, angle rate, and angle acceleration feedback from the IMU sensor 82 stored in RAM 89. The CPU 87 calculates the desired actuator positions based on a dynamic model and the feedback to converge to zero the error, and to account for sensor and measurement error and the dynamic nature of the environment, such as for example, unexpected forces imparted to the body 42 by the at least one rider or passenger 101 over rugged and loose terrain. For example, the CPU 87 thus calculates the shift of ground reaction force of the model in the direction to which the attitude is restored, and the control unit 86 thus drives the actuators to eliminate differences between the present angular positions and the control values. This model-to-actuation-to-feedback is called closed loop control.

In cases where the ground configuration is known and little disturbance arises owing to ground irregularities (bumps and recesses) or in cases where compliance is achieved mechanically, there is no particular need to conduct the ground reaction force feedback control. Even if it is not conducted, there is no loss of the advantage of the invention. For example, the spring loaded inverted pendulum (SLIP) model for legged locomotion is known. SLIP applies to an elastic leg serving to store and return energy during the course of the stance phase. While locomotion over uneven terrain would seem to require significant feedback control, actuation is prescribed in a feed-forward manner. Traditionally, many employ variations of Raibert's original idea of energy addition through thrust timed with the point of maximal leg compression. However like a motorcycle, simple forward foot placement strategy is all that is needed. That is, a leg that misses the ground would continue to react, exhibiting actuation similar to those employed by legs in contact with the ground. For example, running guinea fowl recover form an unexpected drop by posture-dependent leg actuation where both changes in leg length and leg angle at touchdown, with relative stretch and leg angle at touch-down governing the sign and magnitude of energy addition/removal during the stance phase. For example, cockroaches running over rough terrain are shown to appropriately reorient the system momentum in response to external perturbations, thereby improving stability of the velocity heading angle.

For effective dynamical legged locomotion, the actuation protocol is feed-forward with limited sensing (rather than high-bandwidth feedback control), similar to the consistent muscle activation patterns observed in cockroaches running over rough terrain, with variations of leg touch-down angle incorporated based on posture-dependent leg actuation for improving stability of the velocity heading angle. Leg touch-down angle is prescribed using the SLIP model based on leg angles used in the previous stance phase. Swing-leg retraction actuates the leg at a constant angular velocity from the apex of the flight phase. Perturbations from a periodic body orbit cause variation in leg touch-down angle.

When a large disturbance is applied, one or more legs 43 may be repositioned to counteract the force. The pitch angle and angular velocity of the body 42 is measured using the IMU 83 combined with complementary filters and kinematic proprioceptive information (body height, center of pressure, zero moment point, etc.). The angular sideways velocity and angular sideways displacement of the leg 43 may be measured with rotary encoder 99. Using said feedback, the control input, u, may be modeled.

Furthermore, the LRQ method is known and may be used to balance system errors with control. For example, if the weighting factors for the hip sideways velocity and displacement are increased, the system becomes very sensitive to disturbance, but more accurate path tracking is obtained. If the weighting factors for the hip sideways velocity and displacement are increased, the system becomes less sensitive to disturbance and less accurate path tracking is obtained, requiring more leg/foot repositioning.

The body 42 leans in the direction from which the external force is applied. Full-state feedback may be used to control the stabilization of the upright equilibrium or balance, and a reduced-order disturbance observer estimates the external force. Through the use of estimated external forces, the hip torque and/or leg/foot repositioning occurs. Further refinement of control considers the steering angle and the driving torque. Insofar as a model which faithfully simulates the dynamics of the actual robot is created and the difference between the ground reaction force of the actual robot and that of the robot model is controlled, the same principle can be applied with the same effect irrespective of the number of single track or in-line legs.

Road Preview through Rider Cues

Controlling a robot while riding the robot necessitates methods for commanding the robot, such as through body language (e.g., shifting weight), verbal commands, and via a control interface (e.g., handle bars and hand-grip controls). Body language or behavioral cues or any action or signal that a rider's current actions (e.g., body language, verbal command, look direction, etc.) may provide clues or cues for the control system as to the actions the operator desires the platform to do in the future.

To complement the basic predictive control system, a robot mounted camera may be used to observe the rider, a vision system may be used to measure the behavioral cues, and a Kalman filter may be used to fuse and predict such cues. The controller continuously estimates the future predicted state of the robot, a dynamic model of the robot, and a behavioral cue model of the rider. The behavioral cue model serves to either tune the dynamic model and/or create pseudo-measurements for road preview. The Kalman filter estimates the robot future state, e.g., dynamic roll state. Once the future state is estimated, the robot path and trajectory is planned according to the control system.

A brief overall description of the trajectory generation according to the invention and will be given taking a leg 43 (foot 45) trajectory of the legged mobile robot 41 as an example. First, the aforesaid basic leg 43 trajectory is generated in advance using the at least one model. More specifically, the trajectory is determined such that the kicking action of the foot 45 is conducted with a robot centric coordinate system referenced to the body 42. The end point of a leg trajectory at the time of foot rise from a modeled virtual ground surface (ground 55) and referenced to the x-y-z coordinate system is computed. Then the next or successive stance trajectory for that leg is planned from the model, given any high-level foot placement data (i.e., areas or regions of ground 55 that are derived from sensed or a priori data and deemed, graded, and ranked safe to support the legged mobile robot 41), and the starting point at the time of foot fall is calculated. Based on the end and starting points, a flight leg trajectory which connects the foot rise to foot fall is calculated, which provides a smooth trajectory over the virtual ground surface and obstacles. In addition, any obstacle present is avoided by adding an additional clearance to the flight trajectory as prescribed by the at least one model. As the body moves, the aforesaid coordinate system is displaced (translated and/or rotated).

In the preferred embodiment, a high-level control system is responsible for identifying the aforementioned footfall areas on ground 55. Sensing the environment so each foot lands properly, path and trajectory planning and mission planning is performed in parallel. High-level control is input via external commands through the network interface 95, through body language of the at least one rider or passenger 101 as measured by the force and torque sensors 81 and IMU 82, an external control device, such as for example a radio control unit, voice commands, or visual commands or gestures, or any combination of such devices and sensing. The at least one rider or passenger 101 may, for example, pull on one side of a steering bar and shift his center of gravity in advance or anticipation of a turn maneuver, thus cuing the legged mobile robot 41 to begin the method of leaning into the turn and modifying the single track path or trajectory from a straight line to a curve.

When a person rides a motorcycle, the rider looks ahead for changes in the road, such as for example a curve or turn in the road, the rider plans the appropriate control strategy before the motorcycle reaches the turn, and the rider leans the motorcycle into the turn before the road begins to curve. It is this type of anticipative control strategy that a legged robot should perform if the legged robot is to operate and be ridden like a motorcycle.

Because the at least one rider or passenger 101 is an important aspect of legged mobile robot 41, stabilization of the upright equilibrium or balance in the presence of interaction between a human rider and the legged mobile robot must be considered. The at least one rider or passenger 101, as a control system, contributes to the stability of balance of the system, and to some extent the at least one rider or passenger 101 can be used to provide cues regarding balance or full or partial balance of legged mobile robot 41. Nevertheless, stability of ride must be maintained after an external force is applied. For the legged mobile robot 41, this involves counteracting a pulling or pushing force acting on the body 42. If this type of force is a severe disturbance, the legged machine can fall over due to these disturbances. Further, the legged machine cannot maintain its initial leg positions or state and maintain stability of the upright equilibrium. A human can be hurt by the robot changing leg positions or even falling over. A human-friendly motion control is required, which allows the body to move naturally coordinated with the external force and maintains a safe environment for the at least one rider or passenger 101. Various control methods exist, such as for example the LQR method for self-balancing and tracking desired position, and the reduced-order disturbance observer control method to estimate disturbances by external forces to generate position references. The following discusses the decoupling and simplification of the control paradigm to accomplish the aforementioned requirements.

An inherent invention of the single track or in-line legged mobile robot 41 is decoupling of the leg positioning along the length of the body 42 or major axis of motion and the leg positioning along the width of the body 42 or normal to major axis of motion. That is, legged vehicles heretofore must simultaneously maintain stability of balance in the pitch and roll direction. In the preferred embodiment, the single track or in-line legged mobile robot 41 has a defined front, rear, and sides. Thus, the single track or in-line legged mobile robot has different operating characteristics depending on its orientation and a preferred or major direction of motion. Whereas omnidirectional legged locomotion, and in particular sideways movement, is described thoroughly in the prior art (achieved by combined hip and knee joint movement, bringing the body over the center of pressure of one foot, sliding the other foot away from the body, then bringing this body over the center of pressure of the other foot, and so on). Whereas it is known that the stability of legged mobile robots, in particular legged mobile robots using biped locomotion, is intrinsically low. Whereas when such a bipedal robot is acted on by external forces (disturbance), its attitude easily becomes unstable. The single track or inline legged mobile robot, on the other hand, like the motorcycle or bicycle, is inherently stable along the length of the body 42 or major axis of motion. The single track or inline legged mobile robot maintains stability of balance in the roll direction and (for the most part) not in the pitch direction. This device and method is highly important because it drastically simplifies control for many single track or in-line legged gaits and modes of operation.

From the aforementioned discussion, it is necessary for the legged mobile robot 41 to have lateral dynamic balancing, controlling attitude on the basis of the detected inclinatory or roll angle, angular velocity, and angular acceleration of the body 42. The walking machine must balance so it does not roll over. Second, the walking machine must follow a desired trajectory. The trajectory may come from the at least one rider or passenger 101 or path planning system. One aspect of the invention is therefore to provide an attitude stabilization control system for a legged mobile robot which enables the robot to maintain a stable attitude during legged locomotion more effectively. Furthermore, once attitude destabilization causes the zero moment point to shift to near the limit of the range within which it can exist, the attitude is restored by correcting the walking pattern in the next step. This device and method is highly important because the plurality of legs along the single track or in-line roll axis affords a higher probability of achieving dynamic balance in the next step, over traditional legged locomotion.

It is known that mathematical models have been developed for motorcycle dynamics. It is known that control systems have been designed for trajectory following and balance stabilization control. It is known that motion planning for the single-track system has been developed. However, none of these models were developed for walking machines, none model the ability of the walking machine to take discrete footsteps, and none model the different walking gaits.

Figure 33A:
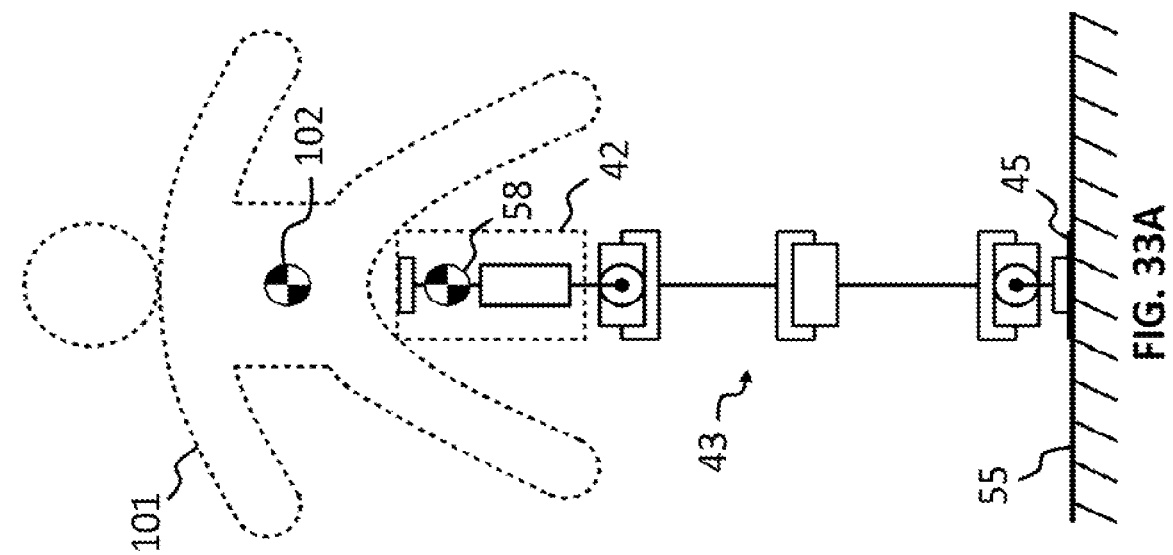
FIGS. 33A-33B illustrates lateral sectional views of a single track or in-line three legged mobile robot, where
Figure 33B:
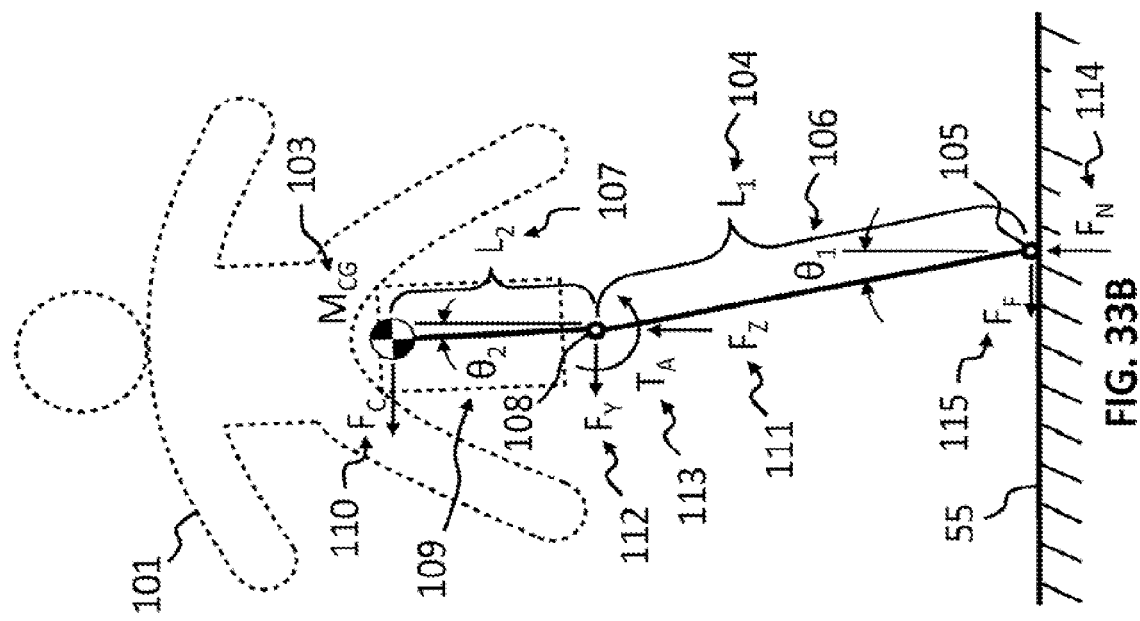

Referring to FIGS. 33A-33B, the legged mobile robot 41 with the at least one rider or passenger 101 and their center of gravity 102 is decoupled in two different subsystems. The first of these systems is an inverted pendulum system and the second is a legged system. The inverted pendulum system is an unstable system. The legged system is neutrally stable, and it is assumed that pitch or yaw motion is controlled separately and for different control objectives than upright equilibrium or balance. It is assumed that the feet 45 are always in contact with the ground 55 and that no slip exists. Finally, only latitudinal motion along the y-axis (perpendicular to the direction of travel, x-axis) and roll is considered. The latitudinal motion of the body 42 is characterized by the projection of the center of gravity 58 to the ground 55, called the center of pressure 59, is measured both kinematic proprioceptively and by the filtered rate gyro and accelerometer system. The roll motion is characterized by the tilt angle, angle rate, and angle acceleration of the body 42 as measured both kinematic proprioceptively and by the IMU 82. A free body diagram of a simplified model is shown in FIG. 33B. A simple inverted pendulum model for single-track vehicle balancing uses a proportional derivative (PD) controller with a disturbance observer.

The fundamental SLIP model is a point of mass, m, and three mass-less legs. For clarity of presentation, FIGS. 32A-32B illustrates only one active leg 43. Each leg 43 is modeled by an axially elastic, laterally rigid linear spring with a force-free length and spring constant. The SLIP model is an equivalent rigid link and does not contain individual leg segments and joints as previously described. Locomotion dynamics occur in the sagittal plane with balance along the roll axis 54 in the y-z plane. A full stride comprises a stance phase followed by a flight phase. The stance phase for each leg begins when the leg touches down (TD) to the ground and is elastically compressed so as to carry the weight of the body and vertical momentum force. The point of foot contact is modeled as a moment-free pin joint and remains fixed for the duration of the stance phase. The body moves forward and the leg rotates under the body in a clockwise fashion. The amount of weight of the body and vertical momentum force carried by the leg is dynamic and determined by interaction of any other supporting legs and perturbations from the at least one rider or passenger 101 and ground. The stance phase ends when the leg is lifted off (LO) the ground, and this begins the flight phase. During the flight phase, the leg is rotated in a counter-clockwise sense to reposition the foot ahead of the body for the next stance phase. The flight phase ends when the leg touches down.

As will be discussed later, a leg may be momentarily lifted during stance phase and re-positioned laterally (not sagittal) whereby the motion of the leg during flight is not counter-clockwise but clockwise. Several important properties and control laws are known from prior art. Step length is the distance traveled by the foot during the stance phase plus the distance traveled by the foot during the flight phase. The distance traveled by the body is the product of the product of the duration of the period and the forward speed. A forward speed method determines step length. A flight duration method whereby the flight phase determines the distance traveled given constant forward speed. A stance duration method is the product of the average forward velocity and the duration of the stance phase. The above can be compared in terms of accuracy and range. Accuracy is a measure that reflects the error between the desired and actual step length. Range is the difference between the minimum and maximum possible step length. When the walking machine is operating under normal conditions, the foot contact points are not sliding on the ground. The friction forces balance the centrifugal force. The roll angle is computed, and the lateral force modeled.

Foot placement during running can be controlled by adjusting hip torque or thrust. Using linearized step-to-step equations showed that adjusting thrust is more effective for controlling step length than adjusting hip torque. When a mild disturbance is applied, sideways hip torque may be used to stabilize the upright equilibrium or balance and to maintain a stable posture even. When a large disturbance is applied, one or more legs 43 must be repositioned to counteract the force. The pitch angle and angular velocity of the body 42 is measured using the IMU 83 combined with complementary filters and kinematic proprioceptive information (body height, center of pressure, zero moment point, etc.). The angular sideways velocity and angular sideways displacement of the leg 43 are measured with rotary encoder 99. Using said feedback, the control input, u, may be modeled. Furthermore, the LRQ method is known and may be used to balance system errors with control. For example, if the weighting factors for the hip sideways velocity and displacement are increased, the system becomes very sensitive to disturbance, but more accurate path tracking is obtained. If the weighting factors for the hip sideways velocity and displacement are increased, the system becomes less sensitive to disturbance and less accurate path tracking is obtained, requiring more leg/foot re-positioning. High weighting factors are the preferred embodiment.

A reduced-order disturbance observer estimates the external force. However in practice, sensor noise and model mismatch prevent an exact estimate of the external force, and a thresholding control loop is used to ignore small external forces. In other words, a thresholding control loop is used to break the normal controllable range if a severe disturbance is applied to body 42. Such equations, from the law of conservation of mechanical energy, are known from prior art. The body 42 leans in the direction from which the external force is applied. Full-state feedback controls the stabilization of the upright equilibrium or balance, and a reduced-order disturbance observer estimates the external force. Through the use of estimated external forces, the hip torque and/or leg/foot repositioning occurs. Further refinement of control, from the prior art, consider the steering angle and the driving torque. Insofar as a model which faithfully simulates the dynamics of the actual robot is created and the difference between the ground reaction force of the actual robot and that of the robot model is controlled, the same principle can be applied with the same effect irrespective of the number of single track or in-line legs.

Figure 34:
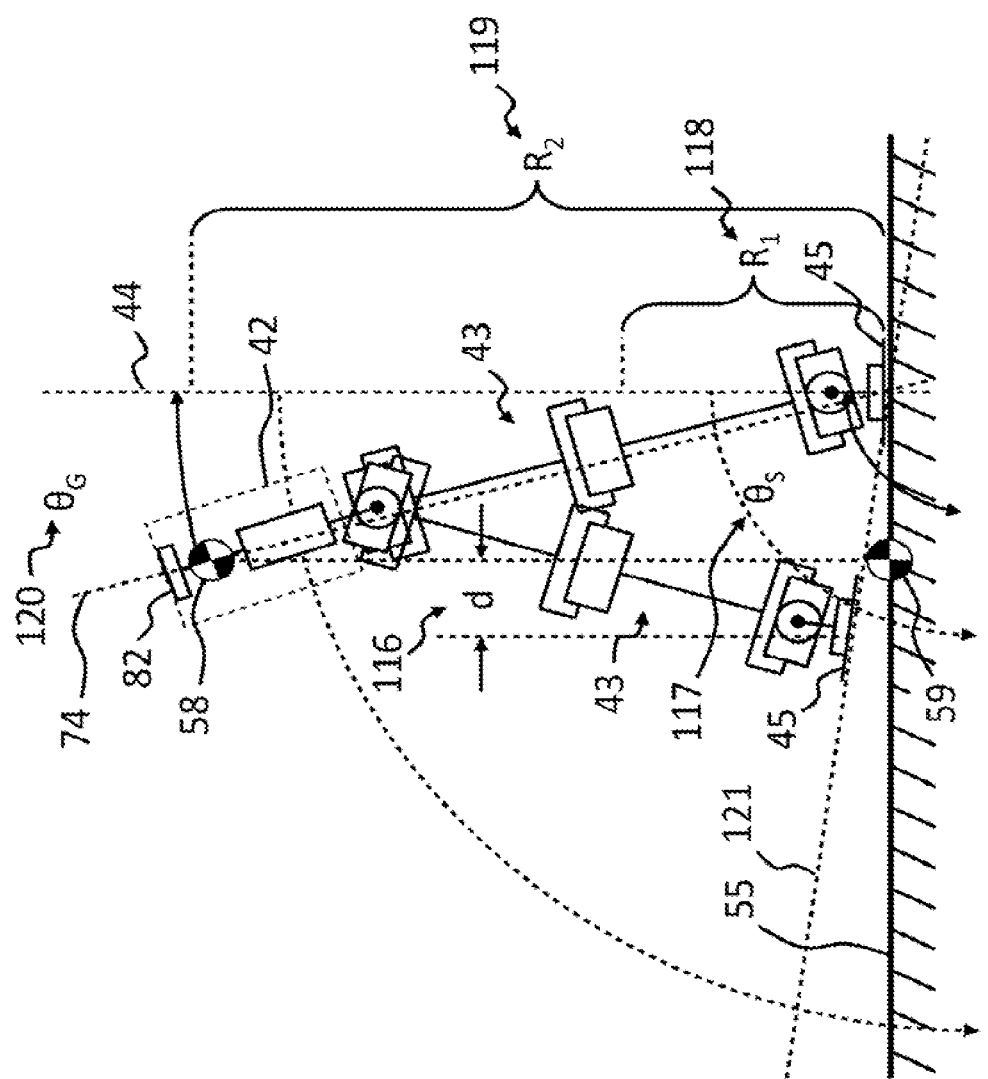
FIG. 34 illustrates a front view of a single track or in-line three legged mobile robot extending a leg in the direction of roll to catch its fall.
Figure 35:
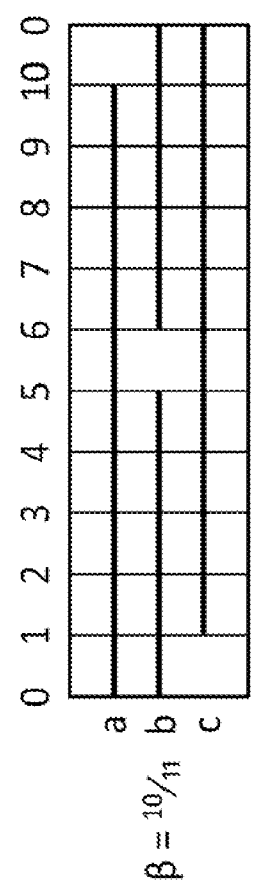
FIG. 35 illustrates an example of a wave gait diagram for a single track or in-line three legged mobile robot with a 10111 support phase and 1111 swing phase.

Referring to FIG. 34, research in legged locomotion has focused on the case in which the legged system always maintains contact with the ground. In the case where all three legs are in contact with the ground, as in the stance phase of a wave gait, there is an opportunity to shift one of the legs laterally to affect balance. However, turnover of a legged vehicle can take place when the feet 45 slide or slip sideways or laterally to a point that a normal target walking pattern cannot reestablish traction. For eliminating the drawback of the prior art, for example, that outrigger wheels do not work over rugged and uneven terrain, the present invention provides a system for automatically sensing and preventing turnover of single tracked or in-line legged mobile robot by extending the at least one leg in the direction of roll to catch the fall, advancing the leg in the expected direction of motion (solving the foothold problem), and correcting the walking pattern in mid-step or in the next step. Such a device and method is highly important for situations when the legged mobile robot 41 cannot be stabilized (or cued into stability of balance) by the at least one rider or passenger 101. Such a device and method is also adaptable to rider experience, e.g., uncontrollable situations for a novice rider or passenger may be controllable by an expert rider.

FIG. 34 is a front skeletal view illustrating the principles of the present invention. The legged mobile robot 41 is shown with at least one leg 43 and foot 45 in contact with ground 55 after the feet 45 have started to lose traction. Uncontrolled foot slip is measured by the IMU 82 and foot force and torque sensor 81. The IMU 82 senses changes in the rate of body 42 roll and the foot force and torque sensor 81 senses changes in the foot traction. As foot slip continues to increase, fraction will approach zero and rate of roll will increase measurably. The control unit 86 receives continuous measurement data from the sensors and determines via an algorithm if data inputs of slip and rate of roll are higher than achievable when feet have lateral traction with the ground. A desired counteracting moment can be produced by controlling the joint actuations so as to produce a moment in the direction of attitude restoration. In other words, a restoring force acts to bring the inclination of the legged mobile robot closer to that of the model. The restoring force is produced by deliberately shifting a foot away from that of the target walking pattern to shift the ground reaction forces to regain stability of balance.

It is known that as the traction of the feet 45 approaches zero (due to a slippery roadway or loose road surface, for example) the roll axis 54 moves to the center of mass 58 of the body 42 as shown in FIG. 34. The reasons that traction approaches zero (rate of roll increases) are: 1) as the feet lose traction, the leg frictional force 115 with the ground 55 is now based on the coefficient of kinetic friction instead of the coefficient of static friction; 2) friction is reduced as feet lose lateral traction uncontrollably because some of the vehicle weight is in a free state; and 3) the polar moment of inertia moves to the center of mass 103. As the legged mobile robot is rolling from an upright position to an attitude deviating from the vertical, the normal force 114 on the feet decreases to zero. In other words, traction approaches zero as the load transfers from the feet 45 to the free-falling center of mass 103 (roll axes). It is also known that the polar moment of inertia is simultaneously reduced as the roll axis moves towards the center of mass 58, allowing the legged mobile robot 41 to roll at an increased rate.

The initial condition is when the center of gravity 58 is above the supporting point of the foot. The actuator encoders 99 measure kinematic proprioception and the IMU 82 measures body 42 displacements from the vertical reference plane 44, are compared by the control unit to make a more precise determination as to criticality of rate of roll. FIG. 21 is a simplified front view skeletal diagram illustrating the movement of body roll axis as foot traction approaches zero. In particular, the legged mobile robot 41 is shown in a tilted position. When uncontrolled slip is detected, a leg in flight or near flight phase or the leg contributing least to the expected stability of the body is repositioned to catch the fall. That is in order to stabilize the legged vehicle and prevent turnover, the trajectory of the body 42 as an inverted pendulum is computed and the at least one leg, called the swing leg, is extended in the direction of the fall. Planning of this swing leg involves controlling two parameters. First, FIG. 34 shows that the center of gravity 58 trajectory is expressed as an inverted pendulum whose leg length is constant and thus defines an arc of radius R2. The center of gravity 58 moves in a circular orbit about the supporting foot 45, and the projected center of pressure 59 and zero moment point shifts in the direction of the fall.

Second, the expected moment of inertia of the body 42 is calculated for the future time of when the fall would be caught, and a torque is computed to counteract the fall, which then computes the distance, d, required from the projected center of pressure and the swing leg arc of radius R1. The control unit 86 adjusts the placement of the at least one foot so as to position the foot beyond the projected center of gravity and in the direction of the roll. As a result, a counteracting moment can be induced to obtain a large attitude restoring force, to catch the fall and prevent vehicle overturn. Simultaneously, the control unit 86 re-adjusts the gait pattern of the other legs such that in mid-step or in following footstep, the walking gait is restored. It should be noted that the system of the present invention can operate on the basis of the IMU data 97 alone or the kinematic proprioception data 99 and 100 alone.

As the outstretched foot touches ground 55 and body roll is stopped, the IMU data 97 and kinematic proprioception data 99 and 100 is feed back to the control unit 86. While the outstretched leg and foot keeps the legged mobile robot 41 from overturning or lying down on its side, it does not immediately force the body 42 into an upright position. Rather, the at least one rider or passenger 101 may regain control of the vehicle while it is held at an attitude very close to that at which control was originally lost. After a predetermined pause to allow the at least one rider or passenger 101 to regain control, the legs 43 and feet 45 are repositioned through the recovery gait to raise the legged mobile robot 41 to the fully upright position. Depending on the circumstances (e.g., based on input from kinematic proprioception and high-level commands), the control unit 86 is additionally programmed to slow or stop all motion and transition the legs 43 to a stable tripod stance, such that all three feet 45 are in contact with ground 55, but not necessarily with equal force.

If the legged mobile robot 41 has come to incline greatly with respect to the maximum leg reach given the actuation time and time of fall, it is not possible to obtain a righting force to restore balance. The robot therefore falls over. In this case, the legs 43 are repositioned to a safe posture to prevent damage of the legged mobile robot and/or the at least one rider or passenger 101. Other than for these conditions, the robot will only signal to reposition the leg far laterally in emergency situations. Thus a cautious rider may never lose lateral traction in which case the system of the present invention would not become operative.

Coordinated Control of Leg Trajectory Example

A brief overall description of the trajectory generation will be given taking a leg 43 and foot 45 (shown in FIGS. 4-6) trajectory of the legged mobile robot 41 as an example. First, the aforesaid basic leg 43 trajectory is generated in advance using the at least one model. More specifically, the trajectory is determined such that the kicking action of the foot 45 is conducted with a robot centric coordinate system referenced to the body 42. The end point of a leg trajectory at the time of foot rise from a modeled virtual ground surface (ground 55) and referenced to the x-y-z coordinate system is computed. Then the next or successive stance trajectory for that leg is planned from the model, given any high-level foot placement data (i.e., areas or regions of ground 55 that are derived from sensed or a priori data and deemed, graded, and ranked safe to support the legged mobile robot 41), and the starting point at the time of foot fall is calculated. Based on the end and starting points, a flight leg trajectory which connects the foot rise to foot fall is calculated, which provides a smooth trajectory over the virtual ground surface and obstacles. In addition, any obstacle present is avoided by adding an additional clearance to the flight trajectory as prescribed by the at least one model. As the body moves, the aforesaid coordinate system is displaced (translated and/or rotated).

A high-level control system is responsible for identifying the aforementioned footfall areas on ground 55. Sensing the environment so each foot lands properly, path and trajectory planning and mission planning is performed in parallel. High-level control is input via external commands through the network interface 95, through body language of the at least one rider or passenger 101 as measured by the force and torque sensors 81 and IMU 82, an external control device, such as for example a radio control unit, voice commands, or visual commands or gestures, or any combination of such devices and sensing. The at least one rider or passenger 101 may, for example, pull on one side of a steering bar and shift his center of gravity in advance or anticipation of a turn maneuver, thus cuing the legged mobile robot 41 to begin the method of leaning into the turn and modifying the single track path or trajectory from a straight line to a curve.

Because the at least one rider or passenger 101 is an important aspect of legged mobile robot 41, stabilization of the upright equilibrium or balance in the presence of interaction between a human rider and the legged mobile robot must be considered. The at least one rider or passenger 101, as a control system, contributes to the stability of balance of the system, and to some extent the at least one rider or passenger 101 can be used to provide cues regarding balance or full or partial balance of legged mobile robot 41. Nevertheless, stability of ride must be maintained after an external force is applied. For the legged mobile robot 41, this involves counteracting a pulling or pushing force acting on the body 42. If this type of force is a severe disturbance, the legged machine can fall over due to these disturbances. Further, the legged machine cannot maintain its initial leg positions or state and maintain stability of the upright equilibrium. A human can be hurt by the robot changing leg positions or even falling over. A human-friendly motion control is required, which allows the body to move naturally coordinated with the external force and maintains a safe environment for the at least one rider or passenger 101. Various control methods exist, such as for example the LQR method for self-balancing and tracking desired position, and the reduced-order disturbance observer control method to estimate disturbances by external forces to generate position references. The following discusses the decoupling and simplification of the control paradigm to accomplish the aforementioned requirements.

An inherent invention of the single track or in-line legged mobile robot 41 is decoupling of the leg positioning along the length of the body 42 or major axis of motion and the leg positioning along the width of the body 42 or normal to major axis of motion. That is, legged vehicles heretofore must simultaneously maintain stability of balance in the pitch and roll direction. In the preferred embodiment, the single track or in-line legged mobile robot 41 has a defined front, rear, and sides. Thus, the single track or inline legged mobile robot has different operating characteristics depending on its orientation and a preferred or major direction of motion. Whereas omnidirectional legged locomotion, and in particular sideways movement, is described thoroughly in the prior art (achieved by combined hip and knee joint movement, bringing the body over the center of pressure of one foot, sliding the other foot away from the body, then bringing this body over the center of pressure of the other foot, and so on). Whereas it is known that the stability of legged mobile robots, in particular legged mobile robots using biped locomotion, is intrinsically low. Whereas when such a bipedal robot is acted on by external forces (disturbance), its attitude easily becomes unstable. The single track or inline legged mobile robot, on the other hand, like the motorcycle or bicycle, is inherently stable along the length of the body 42 or major axis of motion. The single track or inline legged mobile robot maintains stability of balance in the roll direction and (for the most part) not in the pitch direction. This device and method is highly important because it drastically simplifies control for many single track or in-line legged gates and modes of operation.

From the aforementioned discussion, it is necessary for the legged mobile robot 41 to have lateral dynamic balancing, controlling attitude on the basis of the detected inclinatory or roll angle, angular velocity, and angular acceleration of the body 42. The mobile robot must balance so it does not roll over. Second, the mobile robot must follow a desired trajectory. The trajectory may come from the at least one rider or passenger 101 or path planning system. One aspect of the invention is therefore to provide an attitude stabilization control system for a legged mobile robot which enables the robot to maintain a stable attitude during legged locomotion more effectively. Furthermore, once attitude destabilization causes the zero moment point to shift to near the limit of the range within which it can exist, the attitude is restored by correcting the walking pattern in the next step. This device and method is highly important because the plurality of legs along the single track or in-line roll axis affords a higher probability of achieving dynamic balance in the next step, over traditional legged locomotion.

Referring now to FIGS. 35-50, the legged mobile robot has three general modes of operation: 1) it is a fully autonomous mobile robot (with or without a passenger), 2) it is partially autonomous and remotely controlled through an operator control unit, and 3) it is partially autonomous and ridden by a human operator that communicates with the robot via body motions, verbal commands, and an interface (e.g., handle bars and handgrip controls). The operator (remote or rider) uses the operator control unit to provide high-level steering and speed input to guide the walking machine along its path and to control the speed of travel. The operator can also command the walking machine to turn on or off, stand up, squat down, walk, trot, or jog. A visual display provides the operator operational and engineering data. The operator only provides high-level control input, leaving the legged mobile robot on-board control system to operate the legs, provide stability on rough terrain, and reflex responses to external disturbances. In addition, a rider or passenger may partially or fully provide stability of balance. The control system responds to the at least one rider or passenger 101 control: pulling and twisting of the handlebars, lateral changes of posture, on-axis changes in posture, and momentary impulses and changes in rider or passenger posture, such as for example, back-and-forth motion to initiate go, and backward leaning to initiate stop. When the rider leans backward/forward in preparation for (i.e., a cue) a downhill/uphill slope, it causes the legged mobile robot to lower the body height of the rear/front legs and thus optimize the projected center of pressure with respect to the downhill/uphill slope. On a slope or in advance of a slope, rider or passenger sideways leaning indicates uprightness, and the legged mobile robot responds by adjusting footfall placement to compensate for orientation of the body and virtual ground plane relative to the gravity vector. Subsequently, it would accommodate shallow to moderate inclines by making slight adjustments to body posture, while it would accommodate steep inclines by also adjusting the walking gait pattern and using smaller steps. On level ground, sideways leaning would initiate body leaning for a turn.

Controlling a legged mobile robot includes sensing terrain, path planning, selecting footholds, and adjusting step length. Changes in leg length in response to a drop-step perturbation occur during steady state locomotion. Goal-oriented constraints lead to improved stability. For example, minimizing the maximum force carried by any leg 43 while constraining the leg reaction force to be as close to the axis of the motion as possible. Gait heuristics are used to coordinate the legs. For example, legs closest to their kinematic limits in the direction of motion of the body may be lifted first, and legs with the largest kinematic range in the direction of motion may be placed first. This method increases the probability that two legs will overlap in the next support phase. Adaptability and avoidance of deadlock are emphasized over stability by maximizing the number of legs in flight phase. The rearward legs may re-use the same footholds of the forward legs, resulting in a follow-the-leader gait.

The legged mobile robot control system must safely traverse unstructured terrain. Three methods to afford balance by adjusting the step length for uneven footholds (e.g., rough terrain) are known and include 1) maintaining constant duration of the stance and flight phases and adjusting the forward speed, 2) maintaining a constant forward running speed and constant duration of the stance phase and adjusting the duration of the flight phase, and 3) maintaining constant forward running speed and duration of the flight phase and adjusting the duration of the stance phase. A variant of the second method is to use vertical impulse to control step length. Note that both horizontal and vertical impulse may be used to control step length, with adjustments made during the flight phase. The first method of adjusting the forward speed gives the widest range of foothold adjustment with good accuracy, and is biologically-inspired by studies of over ground runners. The third method yields a small range of step lengths and is unlikely to be useful for rough terrain locomotion. A fourth method is to place one or more footsteps on the available footholds at the expense of stability and recover balance over one or more subsequent footsteps. Especially in rough terrain, isolated footholds are key to locomotion. While controlled step length adjusts the length of its steps such that the feet land on the available footholds, forward speed, body height, and duration of ground contact must be controlled to actively balance the walking machine while traversing rough terrain. Being configured in the foregoing three methods, the embodiment is able to generate a gait with a high margin of stability even on uneven terrain and in other situations where ground contact is made with two or more planes simultaneously. The legged mobile robot control system must also account for mechanical losses in the system while safely traversing unstructured terrain.

The operation of the legged mobile robot 41 according to the invention will now be explained primarily with reference to gait (legged locomotion model or pattern) generation. A number of candidate footfall positions are established beforehand, one of the candidates is selected and the target walking pattern model (gait) is used during the control cycles of each walking step. Then a desired trajectory for the body 42 is computed using heuristic and simulation algorithms to select the pattern of footholds from the set of reachable footholds that best match the desired trajectory, afford balance, and minimize the dynamic momentum for lateral and roll axes. At least one gait model is stored in ROM 88 comprising a clock-driven model of the support and swing or flight phases of a gait.

Figure 36:
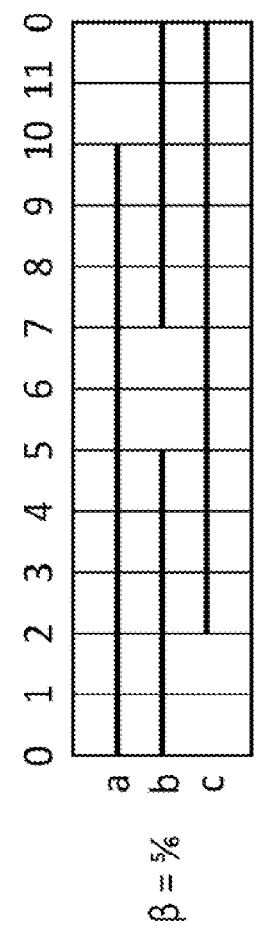
FIG. 36 illustrates an example of a backward wave gait diagram for a single track or in-line three legged mobile robot with a 5/6 stance and 1/6 flight phase.
Figure 37:
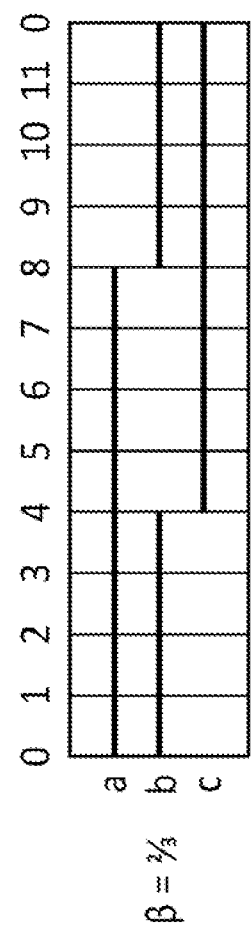
FIG. 37 illustrates an example of a backward wave gait diagram for a single track or in-line three legged mobile robot with a 2/3 stance and 1/3 flight phase.
Figure 38:
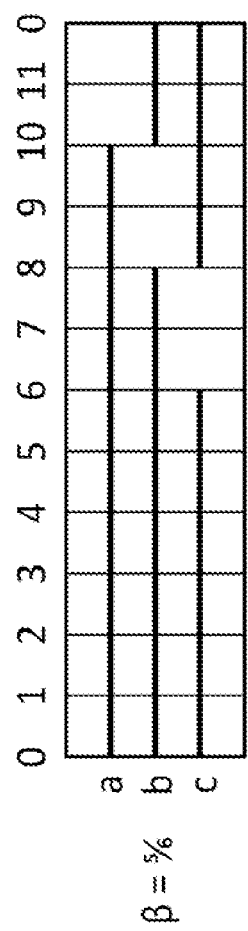
FIG. 38 illustrates an example of a backward wave gait model for a single track or in-line three legged mobile robot with a 5/6 stance and 1/6 flight phase where the swing cycles are grouped together.
Figure 39:
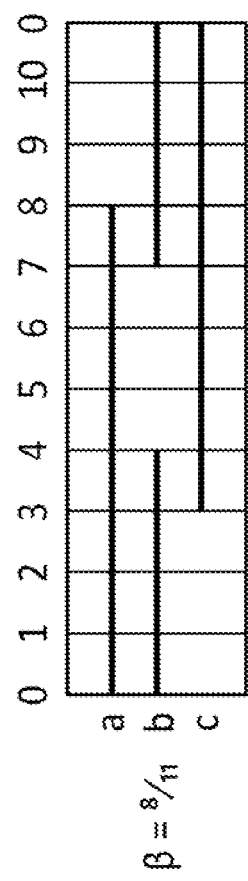
FIG. 39 illustrates an example of a backward wave gait model for a single track or in-line three legged mobile robot with a 8/11 stance and 3/11 flight phasing with two intervals where all three legs are simultaneously supporting the body.
Figure 40:
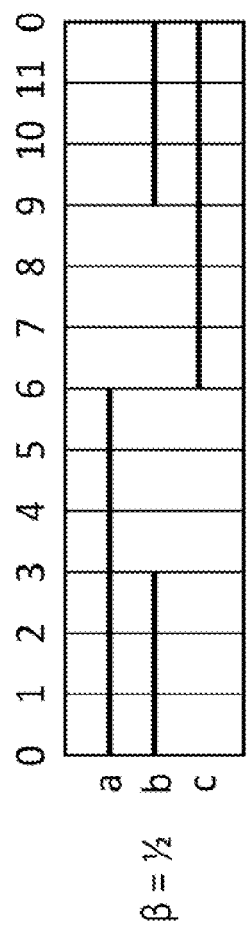
FIG. 40 illustrates an example of an equal phase backward wave gait model for a single track or in-line three legged mobile robot.
Figure 41:
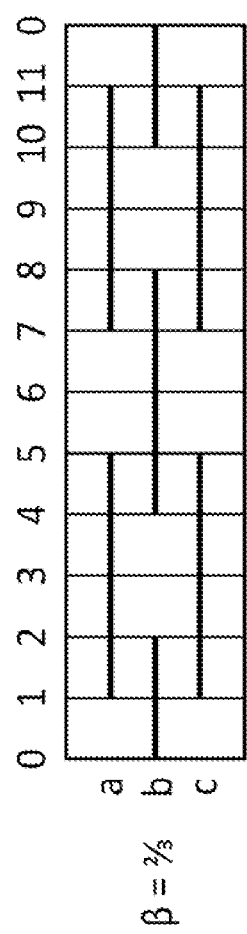
FIG. 41 illustrates an example of a variation on an equal phase backward wave gait model for a single track or in-line three legged mobile robot.
Figure 42:
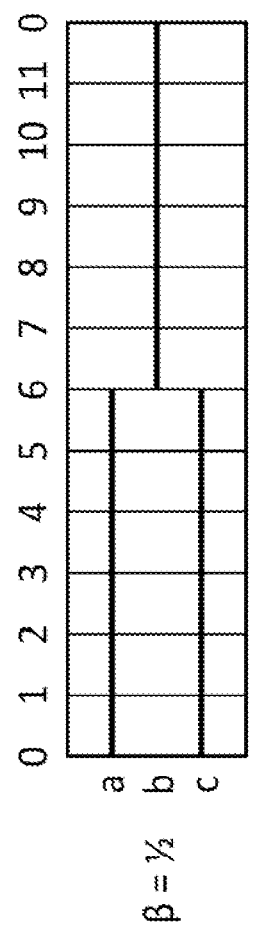
FIG. 42 illustrates an example of a variation on an equal phase backward wave gait model for a single track or in-line three legged mobile robot.
Figure 43:
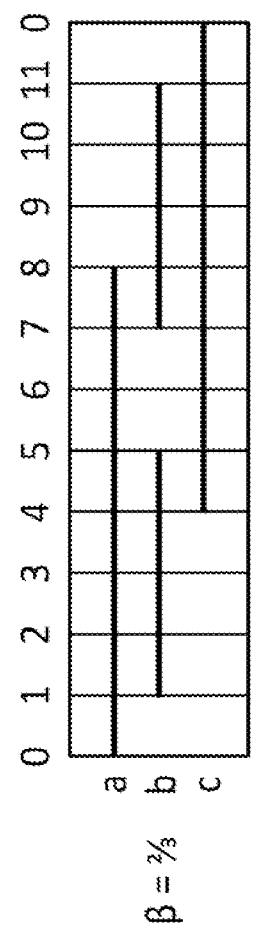
FIG. 43 illustrates an example of a variation of a 2/3 stance and 1/3 flight backward wave gait for a single track or in-line three legged mobile robot, wherein affordance is given to reposition the middle leg during the front and rear leg support.
Figure 44:
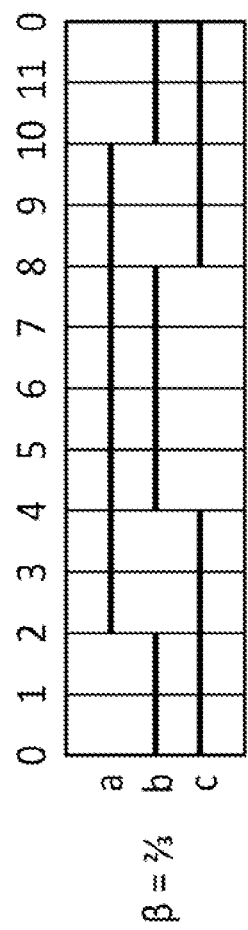
FIG. 44 illustrates an example of a variation of a 2/3 stance and 1/3 flight backward and forward wave gait for a single track or in-line three legged mobile robot, wherein affordance is given to reposition the middle leg to accommodate changes in front and rear leg stance.
Figure 45:
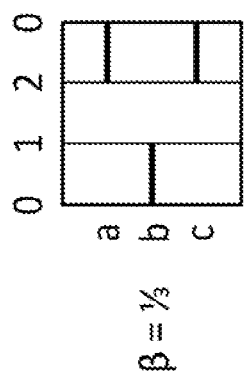
FIG. 45 illustrates an example of a fast trot gait combined with a hopping model for a single track or in-line three legged mobile robot.
Figure 46:
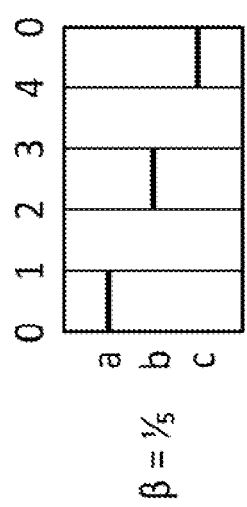
FIG. 46 illustrates an example of a running gait for a single track or in-line three legged mobile robot.
Figure 47:
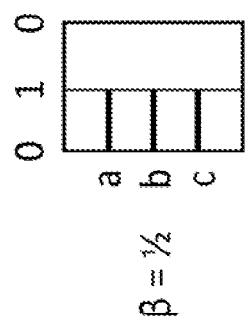
FIG. 47 illustrates an example of a pronking gait for a single track or in-line three legged mobile robot.
Figure 48:
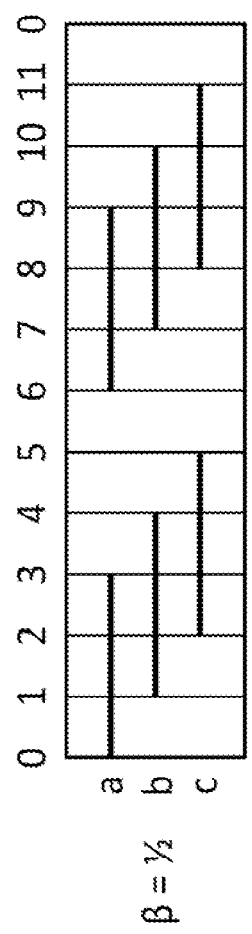
FIG. 48 illustrates an example of a bounding gait for a single track or in-line three legged mobile robot.

Referring again to FIGS. 35-50, FIG. 35 is an example of a gait model (diagram) illustrating a wave gait comprising a 10/11 support (beta) phase (black horizontal line) and 1/11 swing (no line) phases along the horizontal axis (one complete cycle or gait) for each of the three legs 43 (a, b, and c correspond to legs 43a, 43b and 43c, respectively) shown on the vertical axis, for the single track or in-line three legged mobile robot 41. The first diagram shall now be explained as an example for all of the gait model diagrams. From clock 0 to 10, the front leg 45a is on ground 55 and traveling rearward with respect to body 42. From clock 10 to 11 (the clock is reset at 11), the front leg 45a is in the air swinging or in flight forward with respect to body 42. From clock 0 to 5, the middle leg 45b is on ground 55 and traveling rearward with respect to body 42. From clock 5 to 6, the middle leg 45b is in the air swinging or in flight forward with respect to body 42. From clock 6 to 11 (the clock is reset to 0 at 11), the rear leg 45b is on ground 55 and traveling rearward with respect to body 42. From clock 0 to 1, the rear leg 45c is in the air swinging or in flight forward with respect to body 42. From clock 1 to 11 (the clock is reset to 0 at 11), the rear leg 45c is on ground 55 and traveling rearward with respect to body 42. Generally, the velocity of the leg 43 and hence foot 45 during the swing or flight phase is faster than the velocity of the body 42. Generally, a long stance with respect to swing (large beta) reflects a slow body 42 velocity, as the forward swing typically occurs at maximum leg velocity to maximize ground support and stability of balance. It is called a wave gait because the flight phase of the legs progresses from the rear to middle to front leg 43. In this example, the backward swing is evenly dispersed over the gait period. FIG. 36 is an example of a wave gait model for the single track or in-line three legged mobile robot 41 with a 5/6 stance (beta) and 1/6 flight phasing. FIG. 37 is an example of a wave gait model for the single track or in-line three legged mobile robot 41 with a 2/3 stance (beta) and 1/3 flight phasing. Note at clocks 4 and 8 there may be a make before break or break before make transition between the middle and rear leg support and first and middle leg support, respectively. FIG. 38 is an example of a wave gait model for the single track or in-line three legged mobile robot 41 with a 5/6 stance (beta) and 1/6 flight phasing where the swing cycles are grouped together. FIG. 39 is an example of a wave gait model for the single track or in-line three legged mobile robot 41 with a 8/11 stance (beta) and 3/11 flight phasing with two intervals where all three legs are simultaneously supporting the body 42. This wave gait closely resembles a trot gait. Trotting is running at a rapid speed, and pacing is running at constant speed. FIG. 40 is an example of an equal phase wave gait model for the single track or in-line three legged mobile robot 41. Note at clock 6 there may be a make before break or break before make transition between the first and rear leg support. FIG. 41 is an example of a variation on an equal phase backward wave gait model for the single track or in-line three legged mobile robot 41. This gait uses the dynamic momentum of the body 42 to afford balance. A brief (one-clock) support period allows all three legs to maintain the general stability, forward speed, and direction of travel of the body. As a model, the characteristics required (forward velocity, variation in body height, etc.) to implement the gait are also stored in ROM 88. FIG. 42 is an example of a variation on an equal phase wave gait model for the single track or in-line three legged mobile robot 41. This is an example of a trot or pace gait wherein two legs provide pitch stability during one half of the gait period and dynamic momentum of the body 42 provides the other half. FIG. 43 is an example of a variation of a 2/3 stance and 1/3 flight wave gait for the single track or in-line three legged mobile robot 41, wherein affordance is given to reposition the middle leg during the front and rear leg support. Note at clock 0 there may be a make before break or break before make transition between the first and rear leg support. FIG. 44 is an example of a variation of a 2/3 stance and 1/3 flight backward and forward wave gait for the single track or in-line three legged mobile robot 41, wherein affordance is given to reposition the middle leg to accommodate changes in front and rear leg stance. Note at clocks 2, 4, 8, and 10 there may be a make before break or break before make transition between the first and rear leg support. FIG. 45 is an example of a running/leaping gait combined with a hopping model for the single track or in-line three legged mobile robot 41. The middle leg provides the vertical hopping force and front and rear legs provide both vertical hopping force and pitch stability during landing of the body 42. Hopping, bounding, leaping, running, and jumping are characterized by periods wherein all feet leave the ground and the body 42 is in ballistic flight. Legged robots that use a ballistic flight phase, called dynamic legged robots, because leg extension directly affects forward momentum. Such a gait may be used in rugged terrain where only one foothold exists to support the body 42. Hopping, bounding, leaping, running, and jumping gaits may be interleaved with the aforementioned walking, trotting, and pacing gaits. Such ability of motion affords the legged machine to traverse terrain that is too difficult for comparable wheeled and tracked machines. FIG. 46 is an example of a running gait for the single track or in-line three legged mobile robot 41. FIG. 47 is an example of a pronking gait for the single track or in-line three legged mobile robot 41. Pronking is jumping with all three legs simultaneously followed by a period where the body 42 is in ballistic flight.

Figure 49:
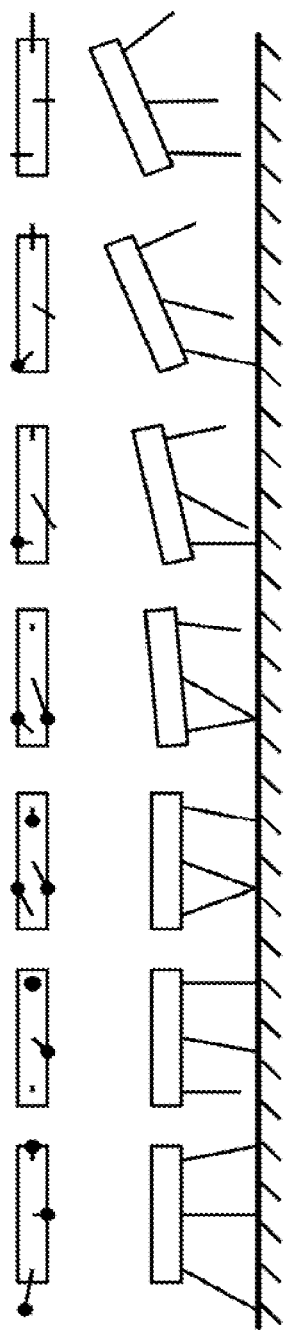
FIG. 49 illustrates a side skeletal view of a single track or in-line three legged mobile robot illustrating a bounding take-off.
Figure 50:
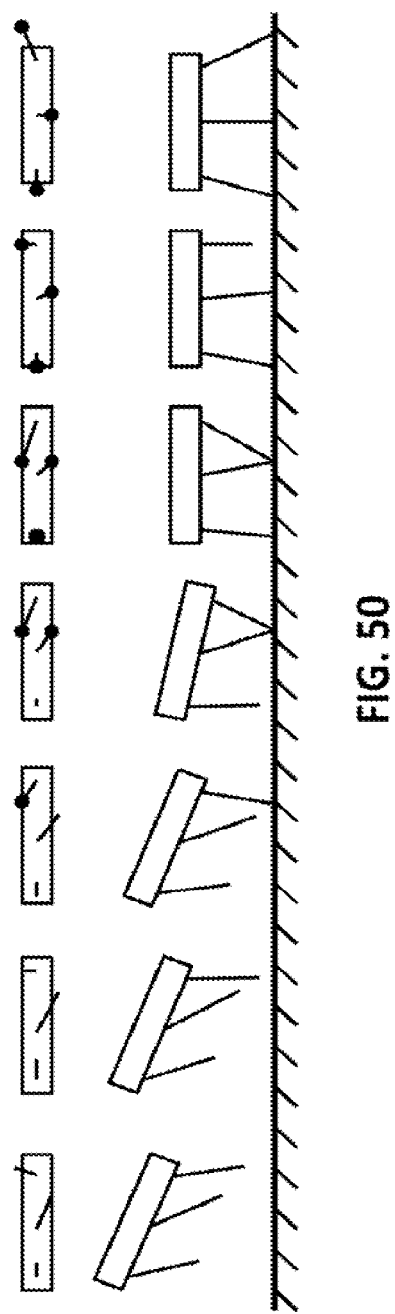
FIG. 50 illustrates a side skeletal view of a single track or in-line three legged mobile robot illustrating a bounding landing.

Referring again to FIGS. 48-50, FIG. 48 is an example of a bounding gait for the single track or in-line three legged mobile robot 41. The gait is repeated twice for clarity. Bounding is jumping wherein the front, middle, and back legs alternately touch the ground. For bounding, the middle leg extends to the point of first overlap and the rear leg to the maximum forward extent for jumping. By positioning the feet in a wide stance, as opposed to an in-line or single-track stance, both legs contribute to the jumping force and stability is afforded in the roll and yaw axis with the first leg responsible for the pitch and yaw control. A series of adjustments in step length are required to arrive at a suitable takeoff point and correct leg states for leaping and jumping. The legs must be in a state to impart a vertical impulse to the ground such that the dynamic momentum of the body affords balance at landing. A vertical impulse is the integral of the vertical force exerted on the ground during the stance phase, determines the duration of the flight phase, and determines the length of each step (given constant forward velocity). As such, the legs must not be at maximum extension. FIG. 49 is a top and side skeletal view of the single track or in-line three legged mobile robot illustrating an example of a bounding takeoff (left to right). While airborne, the front leg extends to anticipate the first point of overlap and the middle leg becomes fully extended forward for landing. FIG. 50 is a top and side skeletal view of the single track or in-line three legged mobile robot illustrating a bounding landing (left to right). Note how in both takeoff and landing a bipedal-like stance may be used to maintain stability of balance in the roll axis.

While the invention has thus been shown and described with reference to the specific embodiments, it will be apparent to those skilled in the art that various changes, modifications, and improvements may be made without departing from the scope and spirit of the invention. Accordingly it is to be understood that the invention is not limited by the scope of the illustrative embodiment or to the details of the described arrangements. For example, the present invention has been shown and described as being a three legged robot. However, the design and method of the present invention is also applicable to an articulated body structure for a multi-legged walking robot having two, three, four or more in-line legs. In another example, the single track or in-line legs may be adapted for movement on the surface of or through water. In another example, while many of the embodiments were shown and described with reference to straight line motion, the invention also enables trajectories for various curved motion and situations, including curved trajectory stair climbing and descent. In another example, while many of the embodiments were shown and described with reference to a foot-based sensor for determining the foot and leg forces and torques and motor encoders for leg position and orientation, the invention is not limited to this type of control and sensing. In another example, while many of the embodiments were shown and described with respect to application of models and other a priori data set in advance, this is not limitative and the invention can also be applied in cases where the control values during locomotion are calculated completely in real time. Moreover, while invention was shown and described with reference to a legged mobile robot, the invention can not only be applied to other types of mobile robots, but can also be applied to various stationary industrial robots. Furthermore, the invention can also be applied to movable objects other than robots.

What is claimed is:

1. A method of operating a single track legged vehicle having a body and at least three in-line legs aligned one behind the other, the method comprising:

controlling each in-line leg of the single track vehicle to coordinate movement of the in-line legs along a desired single-track trajectory where each in-line leg attaches at its proximal end to a frame of the body of the vehicle arranged substantially parallel to a major axis of the frame and the forward/backward direction of travel of the vehicle, each in-line leg has a foot at its distal end, and the in-line attachment of the legs to the body results in a center of gravity and a center of pressure that are directly in line with the legs when the legs are simply extended straight down from the body, resulting in inherent instability along an axis, the coordinated movement controlled by causing each in-line leg to selectively perform a stance-to-flight phase, a flight phase, a flight-to-stance phase, and a stance phase wherein:

controlling, during the stance-to-flight phase of a corresponding in-line leg, including controlling foot movement that unloads reaction forces and torques between the foot of the corresponding in-line leg and the ground such that the foot of the corresponding in-line leg is lifted off the ground;

controlling, during the flight phase of the corresponding in-line leg, includes controlling leg movement that maintains an upright position of the body and that moves the foot of the corresponding in-line leg in the same general direction and at a generally faster rate as a major direction of motion of the body;

controlling, during the flight-to-stance phase of the corresponding in-line leg, includes controlling foot positioning that places the foot of the corresponding in-line leg on the ground according to the desired single-track trajectory wherein reaction forces and torques are developed between the foot and the ground; and controlling, during the stance phase of the corresponding in-line leg, includes controlling foot force and torque such that foot-to-ground interaction develops reaction forces and torques that are transferred from the foot through the corresponding in-line leg to propel, torque, and stabilize the body in the x, y, z, pitch, roll, and yaw axes; and transitioning each in-line leg between the stance to flight phase, the flight phase, the flight to stance phase and the stance phase to propel and torque the body along three axes according to the desired single-track trajectory.

2. The method of claim 1, further comprising:
receiving sensed data from at least one accelerometer mounted to the vehicle and at least one gyroscope mounted to the vehicle;
utilizing the sensed data to determine velocity, acceleration, attitude and gravitational forces; and
utilizing the determined velocity, acceleration, attitude and gravitational forces in the control of at least one of the flight-to-stance phase, flight phase, stance-to-flight phase and stance phase.

3. The method of claim 1, wherein:
controlling foot movement during the stance-to-flight phase comprises controlling at least one of: foot position, movement, force, torque, extension velocity and acceleration, and retraction velocity and acceleration;
controlling leg movement during a flight phase comprises controlling at least one of: in-line leg movement and foot trajectory;
controlling foot positioning during the flight-to-stance phase comprises controlling at least one of: foot position, movement, force, torque, extension velocity and acceleration, and retraction velocity and acceleration; and
controlling foot force and torque during the stance phase comprises controlling at least one of: foot position, movement, force, torque, extension velocity and acceleration, and refraction velocity and acceleration.

4. The method of claim 1, further comprising:
performing predictive control of the in-line legs to propel and torque the body along three axes according to the desired single-track trajectory by:
measuring frame speed and acceleration vectors, center of mass coordinates, and ground contact duration for each foot;
dynamically adjusting the length, force, and torque of the in-line legs to achieve a set of expected values according to the desired single-track trajectory;
continually determining deviations from the expected values; and
compensating for the deviations to achieve active balance of the legged vehicle.

5. The method of claim 1, further comprising:
decoupling positioning of the in-line legs along a length of the body from positioning of the in-line legs along the width of the body and parallel to the ground; and
controlling stability of balance of the vehicle over time in the roll direction.

6. The method of claim 1, further comprising performing for each in-line leg:
selecting a target walking pattern model from a plurality of walking pattern models, wherein each target walking pattern includes a clock-driven model of the stance and flight phases for each in-line leg;
computing the desired single-track trajectory for the body of the vehicle using at least one of a heuristic algorithm and a simulation algorithm; and
selecting a pattern of footholds from a set of reachable footholds that most closely correspond to the desired single-track trajectory, and which minimize dynamic momentum for lateral and roll axes; and
utilizing dynamic momentum to maintain the desired single-track trajectory during periods of single-leg support and double-leg support.

7. The method of claim 1, wherein controlling each in-line leg of the vehicle further comprises:
controlling each of the at least three in-line legs of the vehicle by continually sensing body attitude and roll angle throughout each of the stance to flight phase, the flight phase, the flight to stance phase and the stance phase.

8. The method of claim 1, wherein controlling each in-line leg of the vehicle comprises:
performing the flight to stance phase for a select in-line leg by:
accelerating the foot of the select in-line leg backward and along the curved single-track trajectory before contact with the ground, until the foot is generally stationary with respect to the ground, and then making contact with the ground to develop any ground reaction forces and torques; and by:
performing the stance to flight phase for a select in-line leg by:
generally maintaining the foot stationary with respect to the ground while the foot is being unloaded of any ground reaction forces and torques;
to perform a desired single-track turn maneuver.

9. The method of claim 1, wherein controlling each in-line leg of the vehicle comprises:
controlling at least one in-line leg so as to position the foot of the controlled in-line leg to a select side of the projected center of gravity on to the ground to develop, during a stance phase, ground reaction forces that are generally normal to the major direction of motion and ground reaction torques in the pitch, roll, and/or yaw axis to maintain stability of balance along a desired single track trajectory.

10. The method of claim 9, wherein controlling each in-line leg of the vehicle comprises:
positioning the landing foot offset from the foot lifting off according to a pre-programmed strategy for stability of balance along the desired single-track trajectory.

11. The method of claim 1, wherein controlling each in-line leg of the vehicle comprises:
controlling the length of the in-line legs during an associated stance phase of each in-line leg so as to be different between feet of the in-line legs positioned on, to the right of, or to the left of the projected center of gravity of the body on to the ground to level the body attitude, within a working range of the in-line legs and their feet.

12. The method of claim 1, wherein controlling each in-line leg of the vehicle comprises:
controlling two of the in-line legs to transition from stance-to-flight and flight-to-stance phase in a generally make before break fashion such that both feet support the body, the landing foot is placed spatially apart from the foot lifting off, for stability of balance in the pitch axis along a desired single track trajectory.

13. The method of claim 1, further comprising:
defining, for each in-line leg, a corresponding spatial volume that limits possible in-line foot placement, each spatial volume constrained based upon pitch and roll movement at a hip joint that joins a corresponding in-line leg to the body, and based upon extension and retraction of the corresponding in-line leg by knee and ankle joints of the in-line leg; and
controlling each in-line leg according to a leg motion model to operate each in-line leg within its defined spatial volume such that pairs of feet corresponding to pairs of in-line legs have sufficient reach and movement range in length, width and height, relative to the body, to be placed in a bipedal stance, with respect to the major axis and major direction of motion and travel, the combined ground reaction forces between two feet during a stance phase so as to impart at least one of:

a torque to rotate the body in the pitch, roll, and/or yaw axis; and a force to propel the body in at least one of the x, y, and z axes.

14. The method of claim 1, further comprising:

defining, for each in-line leg, a corresponding spatial volume that limits possible in-line foot placement, each spatial volume constrained based upon pitch and roll movement at a hip joint that joins a corresponding in-line leg to the body, and based upon extension and retraction of the corresponding in-line leg by knee and ankle joints of the in-line leg; and controlling each in-line leg according to a leg motion model to operate each in-line leg within its defined spatial volume such that three feet corresponding to three in-line legs have sufficient reach and movement range in length, width and height, relative to the body, to be placed in a tripedal stance, with respect to the major axis and major direction of motion and travel, the combined ground reaction forces between three feet during a stance phase so as to impart at least one of:

a torque to rotate the body in the pitch, roll, and/or yaw axis; and a force to propel the body in at least one of the x, y, and z axes.

15. The method of claim 1, further comprising receiving feedback and control signals from an operator interface system, in communication with the control system, wherein the operator interface feedback and control signals provide at least steering angle, throttle and braking control signals to the control system to enable the operator to control stability of balance in the roll axis of the vehicle.

16. The method of claim 1, wherein controlling each in-line leg of the vehicle comprises:

controlling the at least three in-line legs according to an elastic-mechanical and dynamical model to compute foot position of each in-line leg to maintain body stability along a desired single track trajectory.

17. The method of claim 16, wherein controlling each in-line leg of the vehicle comprises:

controlling at least two in-line legs by inducing select ones of roll, pitch and yaw torques between the foot of a corresponding in-line leg and the ground and/or at least two in-line legs by selectively inducing roll, pitch and yaw torques between each foot of the at least two controlled in-line legs and the ground to control a body trajectory along a desired single-track trajectory.

18. The method of claim 16, further comprising:

predicting an elastic deformation of at least one leg when in support with the ground to maintain desired ground reaction forces and torques to control a body trajectory along a desired single-track trajectory.

19. The method of claim 16, wherein the body comprises a segmented frame, the method further comprising:

computing segmented frame joint angles in at least one axis between adjacent ones of the in-line legs to ground undulations and to the curvature of a single track turn maneuver with a minimally narrow profile relative to the major axis of motion; and dynamically adjusting the length, force, and torque of the in-line legs to maintain body stability based upon the computations.

20. The method of claim 16, wherein the body comprises a segmented frame, the method further comprising:

computing elastic energy storage and release components between frame segments and in the in-line legs, wherein the elastic components operate in at least one axis, wherein the elastic components store and release kinetic energy for transfer between body segments and in-line legs; and dynamically adjusting the length, force, and torque of the in-line legs to maintain body stability based upon the computations.

21. The method of claim 16, wherein the body comprises a segmented frame, the method further comprising:

computing dynamic momentum forces and torques developed by moving frame segments and corresponding ones of the in-line legs relative to each other, wherein the components operate in at least one axis; and dynamically adjusting the length, force, and torque of the in-line legs to maintain body stability based upon the computations.

22. The method of claim 16, wherein controlling each in-line leg of the vehicle comprises:

performing the flight phase for a select in-line leg by:

computing dynamic momentum forces and torques developed by moving a in-line leg in flight phase, wherein the components operate in at least one axis; and dynamically adjusting the center of mass of a select one of the in-line legs in the flight phase to maintain body stability by:

sweeping a select in-line leg inward or outward normal to the body and major direction of travel; and reducing or extending at least one of a length of the select in-line leg and a corresponding position of the center of mass of the select in-line leg;

so as to impart a desired torque in the pitch, roll and/or yaw axis to maintain stability of balance along the desired single-track trajectory.

23. The method of claim 1, further comprising:

controlling the single track vehicle to operate autonomously regardless of at least steering angle and throttle control signals to sense and prevent turnover while enabling normal riding techniques in all but out of control situations.

24. The method of claim 1, wherein controlling each in-line leg of the vehicle comprises:

controlling each in-line leg so as to vary the length of each in-line leg with respect to the average body height during a stance phase such that the body is stable in height, roll, and pitch over uneven ground.

25. The method of claim 1, wherein controlling each in-line leg of the vehicle comprises:

controlling the in-line legs so as to incline the body in the pitch axis to lower a front of the body and raise a back of the body when ascending a gradient;

controlling the in-line legs so as to recline in the pitch axis to raise the front of the body and lower the back of the body when descending the gradient; and controlling the in-line legs so as to roll the body in the roll axis when traversing a gradient normal to the major direction of travel;

within the working range of the in-line legs and their feet.

26. The method of claim 1, wherein controlling each in-line leg of the vehicle comprises:

positioning the foot of the forward most in-line leg to control the trajectory of the single-track path by:

placing a second foot corresponding to a second one of the in-line legs in proximity of a first foot corresponding to a first one of the in-line legs;

placing a third foot corresponding to a third one of the in-line legs in proximity of the second foot; and repeating positioning the first foot, placing the second foot, and placing the third foot such that each foot follows a desired single-track trajectory.

\* \* \* \* \*

UNITED STATES PATENT AND TRADEMARK OFFICE
CERTIFICATE OF CORRECTION

PATENT NO. : 8,630,763 B2  
APPLICATION NO. : 13/874848  
DATED : January 14, 2014  
INVENTOR(S) : Goulding It is certified that error appears in the above-identified patent and that said Letters Patent is hereby corrected as shown below:

In the Claims

Column 55, line 31, Claim 3, "and refraction velocity" should read --and retraction velocity--.

Signed and Sealed this
Sixth Day of May, 2014

Michelle K. Lee
*Deputy Director of the United States Patent and Trademark Office*